United States Patent
Van Der Laak et al.

(10) Patent No.: US 8,520,823 B2
(45) Date of Patent: Aug. 27, 2013

(54) MOBILE, PC, AND WEB ENHANCED TELECOMMUNICATIONS ENVIRONMENT

(75) Inventors: Frode Van Der Laak, Oslo (NO); Jan Eirik Sandnes, Oslo (NO)

(73) Assignee: YaaZZ AS, Billingstad (NO)

( * ) Notice: Subject to any disclaimer, the term of this patent is extended or adjusted under 35 U.S.C. 154(b) by 752 days.

(21) Appl. No.: 12/495,486

(22) Filed: Jun. 30, 2009

(65) Prior Publication Data
US 2011/0002452 A1 Jan. 6, 2011

Related U.S. Application Data

(60) Provisional application No. 61/077,106, filed on Jun. 30, 2008.

(51) Int. Cl.
*H04M 3/42* (2006.01)
(52) U.S. Cl.
USPC ............. 379/205.01; 379/114.03; 379/114.13
(58) Field of Classification Search
USPC .......... 379/114.01–128, 158, 202.01–207.01; 455/416
See application file for complete search history.

(56) References Cited

U.S. PATENT DOCUMENTS

| | | | | |
|---|---|---|---|---|
| 4,517,412 A | * | 5/1985 | Newkirk et al. | 379/114.19 |
| 5,619,555 A | * | 4/1997 | Fenton et al. | 379/88.11 |
| 5,631,904 A | * | 5/1997 | Fitser et al. | 370/261 |
| 5,638,434 A | * | 6/1997 | Gottlieb et al. | 379/203.01 |
| 6,023,499 A | * | 2/2000 | Mansey et al. | 379/111 |
| 6,427,008 B1 | * | 7/2002 | Balaz | 379/202.01 |
| 6,704,563 B1 | | 3/2004 | Senn et al. | |
| 6,823,050 B2 | * | 11/2004 | Brown et al. | 379/93.21 |
| 6,850,609 B1 | * | 2/2005 | Schrage | 379/202.01 |
| 6,885,856 B2 | | 4/2005 | Nurcahya | |
| 7,031,700 B1 | * | 4/2006 | Weaver et al. | 455/420 |
| 7,151,824 B1 | * | 12/2006 | Bingaman et al. | 379/114.22 |
| 7,317,791 B2 | * | 1/2008 | Carlson | 379/202.01 |
| 2001/0053213 A1 | | 12/2001 | Truong et al. | |
| 2008/0049921 A1 | | 2/2008 | Davis et al. | |

FOREIGN PATENT DOCUMENTS

JP 2001292138 A 10/2001

OTHER PUBLICATIONS

Intellectual Property Office of Singapore, Serv.IP—A Company of the Austrian Patent Office Under Private Law, Search and Examination Report for Singapore Patent Application No. 201009705-3, issued Jun. 13, 2012, 12 pages.
Dave Roos; How Conferencing Works; http://money.howstuffworks.com/business-communications/how-conferencing-works.htm; downloaded Mar. 28, 2013; 3 pages.

* cited by examiner

*Primary Examiner* — Simon Sing
(74) *Attorney, Agent, or Firm* — Lowe Graham Jones PLLC

(57) ABSTRACT

Methods and systems for providing enhanced telecommunications services are provided. Example embodiments provide a Enhanced Telecommunications System ETS, which provides less expensive calling and other services by initiating telephone requests using data request packets. In one embodiment, the ETS comprises a client communications device with client code, an ETS portal, an API server, one or more PABX servers, and various billing, payment, and accounting systems. Other systems, such as quality assurance and logging systems may also be available. These components cooperate to provide various telecommunications services. This abstract is provided to comply with rules requiring an abstract, and it is submitted with the intention that it will not be used to interpret or limit the scope or meaning of the claims.

20 Claims, 48 Drawing Sheets

Use case model - YaaZZ Portal –
Business Management Tool

MOBILE, PC, AND WEB ENHANCED TELECOMMUNICATIONS ENVIRONMENT

TECHNICAL FIELD

The present disclosure relates to methods and systems for performing telecommunications activities and, in particular, to methods and systems for using Internet capabilities in conjunction with a standard telecommunication network to offer highly accessible mobile, pc, and web telephony.

BACKGROUND

Mobile telecommunications devices, such as cellular telephones, have become increasingly popular worldwide. However, in typical subscription programs, user's cellular plans are associated with a particular one or set of geographic regions. Pricing is determined under such plans typically based upon whether the caller is calling with the designated "plan" region or outside. Typically rates for calls placed to locations outside of the plan region cost substantially more than rates "in plan." In addition, rates for calls placed internationally are similarly determined and for some may even be cost prohibitive.

DETAILED DESCRIPTION

Embodiments described herein provide enhanced computer- and network-based methods and systems for offering enhanced telecommunications services. Example embodiments provide a Enhanced Telecomm System ("ETS"), which enables, among other functions, mobile users to make less expensive phone calls by taking advantage of the lower rates typically available from bulk rate local telephone exchange systems. The ETS essentially provides its own exchange server, to which all ETS clients (PC phones, mobile phones, etc.) request certain services, for example, make a call, call from this number, make a conference call, etc. the ETS exchange server is then responsible for originating the respective phone call locally on behalf of the client user and then connecting the client user to the terminating phone number(s). Thus, the ETS is very beneficial for international customers (subscribers) who would otherwise incur very steep roaming charges when placing international calls. However, that the techniques of the ETS may be useful to create a variety of other telephony products.

Figure 1:
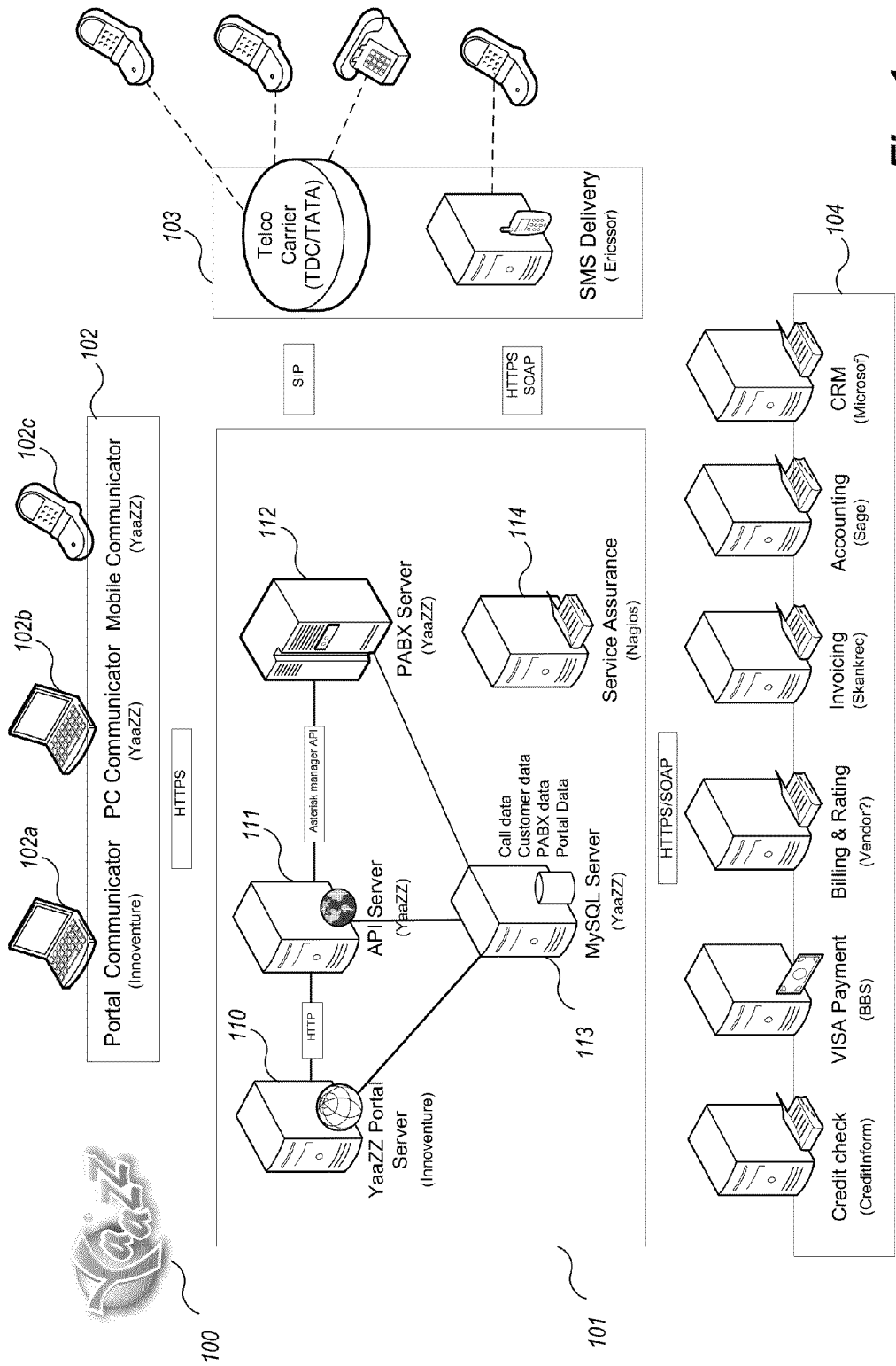
FIG. 1 is an example block diagram of components of an example Enhanced Telecommunications System.

FIG. 1 is an example block diagram of components of an example Enhanced Telecommunications System. In one example embodiment, the Enhanced Telecommunications System comprises one or more functional components/modules that work together to provide enhanced services. For example, an Enhanced Telecommunications System 100 may comprise one or more client communications devices 102 with client code (such as a web communicator 102a, pc communicator 102b, or mobile communicator 102c); an ETS portal 110 for accessing the downloadable clients and for managing accounts; an API server 111, to which the client communications devices communicate with for services; one or more PABX servers 112 that integrate into the standard telecommunications network 103; and various billing, payment, and accounting systems 104. Other systems, such as quality assurance systems may also be available. These components may be implemented in software or hardware or a combination of both.

An example embodiment of one such ETS, called "YaaZZ" is described in detail as follows. The components of YaaZZ and the various 3$^{rd}$ party systems that may be used to implement some of the them are illustrated in FIG. 1. Other components and other 3$^{rd}$ party services, systems, architectures, etc. may be substituted be used in place or in addition to the ones illustrated yet still achieve the functionality desired. The YaaZZ system has been developed for providing international as well as local telecommunications services.

As shown in FIG. 1, the components of YaaZZ 100 as an example ETS work together to provide low cost telecommunications to customers, in both prepaid and postpaid circumstances. Using the Internet, three different clients (communicators) 102 are provided (mobile 102c, PC 102b, and the web 102a) enabling users to make long distance phone calls without incurring long distance roaming charges. In summary, the communicator 102 initiates calls and other telecommunications services through a data request to the API server 111, which uses internal components, such as the PABX server 110, to cause calls (and other services) to occur at a bulk rate previously negotiated between and other carriers 103. In addition, advanced services and user interfaces to the same, such as extended conference call capabilities, are made available through the above architecture.

The main components of an example ETS such as YaaZZ 100 include:

Portal 102a, PC (personal computer) 102b and Mobile Communicators 102c: Three different communicators (YaaZZ clients) 102 for accessing the services that YaaZZ provides.

YaaZZ portal Server 110: (with a transaction handler called ytransd): handles all requests from the Portal communicator.

API server 111: The API server 111 handles requests from the communicators 102 and the portal server 110, and based on business rules requests the PABX Server 112 to setup a call/conference via a telephony, or the SMS delivery carrier (e.g., Ericsson) 103 to deliver a SMS message.

MySQL Server 113: The YaaZZ main database (holds, for example, traffic data, customer data, etc.)

PABX Server 112: An automatic switchboard, that sets up calls by sending a request to a telecommunications carrier such as TATA (a network operator).

Service Assurance 114: A service assurance tool (e.g., Nagios). It can be connected to all internal services for monitoring, alarming, and logging.

Figure 2:
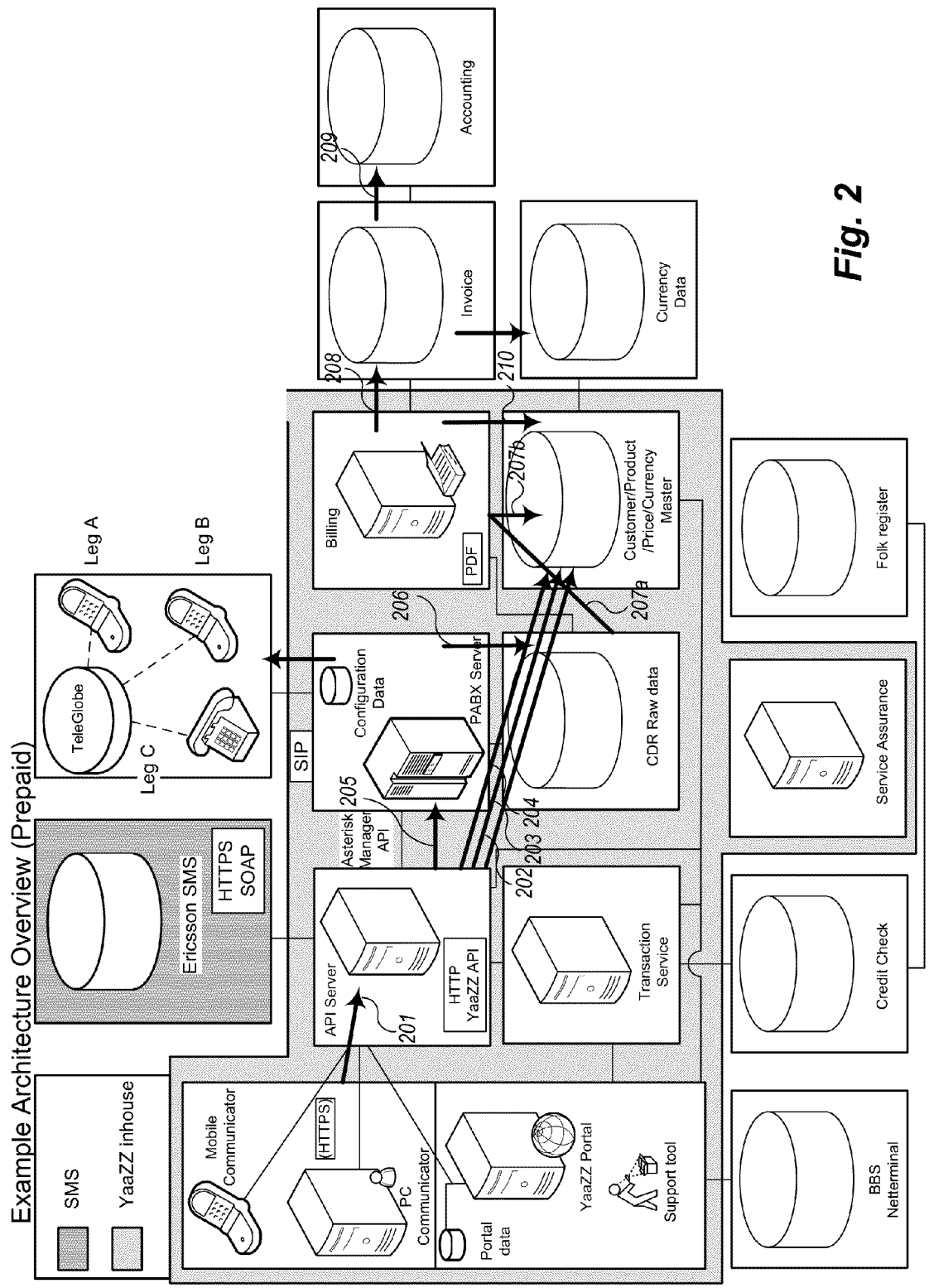
FIG. 2 is an example flow diagram of an overview of how the various components of an example embodiment of an Enhanced Telecommunications System interrelate to provide example telephony services.

FIG. 2 is an example flow diagram of an overview of how the various components of an example embodiment of an Enhanced Telecommunications System interrelate to provide example telephony services. The example illustrated here demonstrates the operation of the ETS architecture to initiate a phone call in a prepaid scenario. As will be discussed further below, phone calls can be handled in a prepaid or postpaid manner. First, in action 201a user requests a call using his preferred communicator software. Second, in action 202 the API Server checks user status against a local balance database. Third, in action 203 the API Server checks rating prices for the call according to the user's subscription type or rebates. Fourth, in action 204 the API server checks the available amount of calling time in accordance to the user's balance and the price of the call. If the user has enough calling time, the ETS continues. Fifth, in action 205 the API Server connects to the PABX server, initializing a call to Leg A and Leg B (and C or more, in the case of a conference call). If the maximum calling time for the user runs out, the user will get notification tones every 10 seconds, and the last 30 seconds. Then, an informational message will be played back before the user in connected (due the user's account being empty). Sixth, in action 206 the PABX triggers commitment of one or more CDR records in (e.g., local) database storage. Seventh, in actions 207a and 207b the billing system reads raw CDR records every nth (e.g., 5$^{th}$) minute to create an accounting CDR and saves it to master storage. Eighth, in action 208 the billing system runs a batch process at a predetermined time (e.g., once a month), generating prepaid usage data to send to one or more invoicing partners. Ninth, in action 209 the one or more invoicing partners transmit invoice data to one or more accounting partners. Tenth, in action 210 the billing system updates customer status information storing in the one or more databases, if the customer does not pay. Other actions using the example architecture of the ETS are of course possible.

Although the techniques of the Enhanced Telephony System and YaaZZ are generally applicable to any type of phone call and telephony messaging system it is possible to apply these techniques to other areas of telephony. Also, although the examples described herein often refer to a mobile call and the Internet, the techniques described herein can also be used by computer systems and other wide area networks other than the Internet, such as closed networking systems. In addition, the concepts and techniques described are applicable to other types of telephone devices even those not yet invented. Hence, the concepts and techniques described are applicable to other telephony and networking architectures.

Also, although certain terms are used primarily herein, other terms could be used interchangeably to yield equivalent embodiments and examples. In addition, terms may have alternate spellings which may or may not be explicitly mentioned, and all such variations of terms are intended to be included.

In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

| Abbreviations | |
|---|---|
| SOAP | Simple Object Access Protocol |
| PABX | Private Automatic Branch eXchange (PABX) is a telephone exchange |
| ASTERISK | A open source/free software implementation of a telephone PABX |
| IVR | Interactive Voice Recognition - Technology that allows a computer to detect voice and touch tones using a normal phone call |
| ACD | Manages incoming calls and handles them based on the number called and an associated database of handling instructions |
| VOIP | Voice over Internet Protocol (VoIP) is a protocol optimized for the transmission of voice |
| SIP | Session Initiation Protocol (VoIP) |
| CDR | Call Data Record. Computer record produced by a telephone exchange containing details of a call that passed through |

-continued

| Abbreviations | |
|---|---|
| Postpaid | Postpaid refers to services where you pay after usage |
| Prepaid | Prepaid refers to services paid for in advance |
| SMS | Protocol for allowing the interchange of short messages between mobile telephone devices |
| MYSQL | Open source database management system |
| CTI | Technology that allows interactions on a telephone and a computer to be integrated or coordinated |
| AGI | Interface with which the Asterisk (PABX) communicates with user-created scripts |
| SYSLOGD | UNIX application used for security auditing |
| DIAL | List of expected number and pattern of |
| PLAN | digits for a telephone number |
| CHANNEL | Connection which brings in a call to the Asterisk PABX |
| NAGIOS | Network monitoring application software |
| TDM | Time Division Multiplexing |
| NTP | Network Time Protocol |

Figure 3:
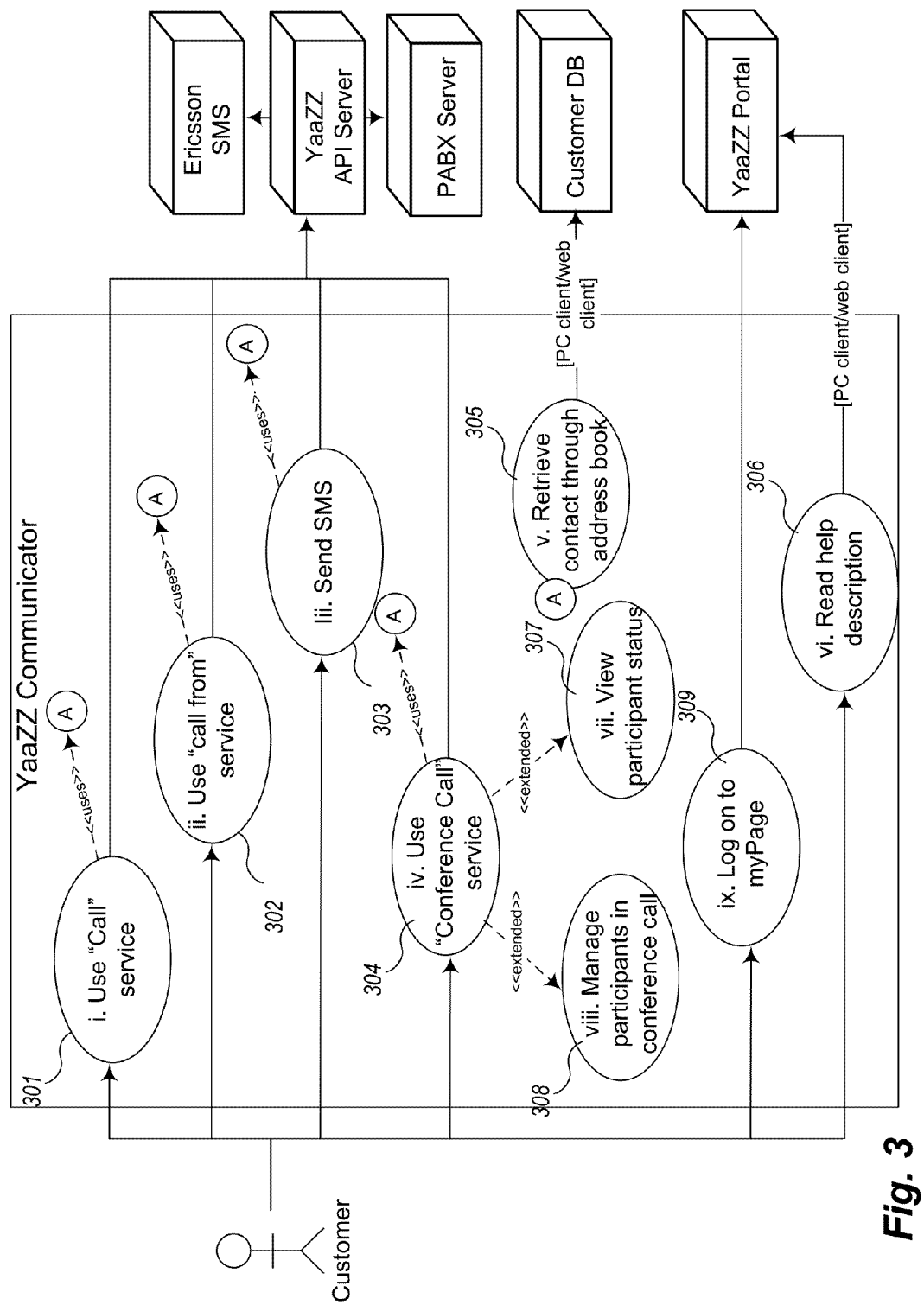
FIG. 3 summarizes the main use cases made available through the various communicators, for example, through mobile, PC, and web communicators.
Figure 4A:
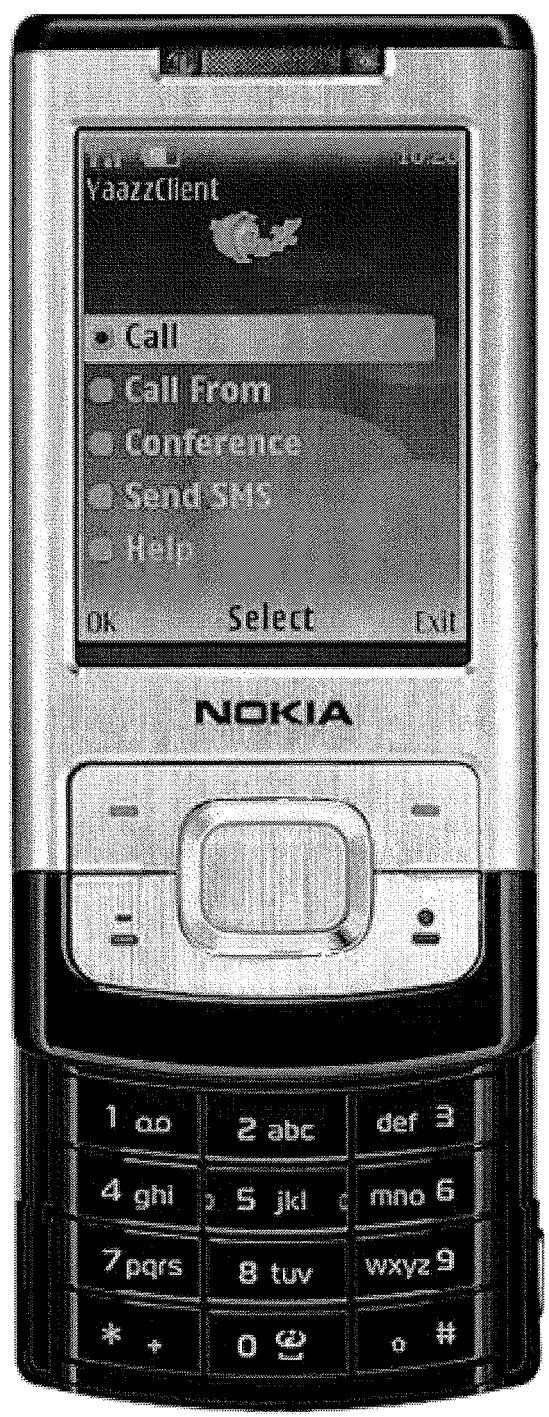
FIGS. 4A-4J illustrate examples of a graphical user interface provided by a YaaZZ Mobile Communicator to provide some of these functions.
Figure 4B:
Figure 4C:
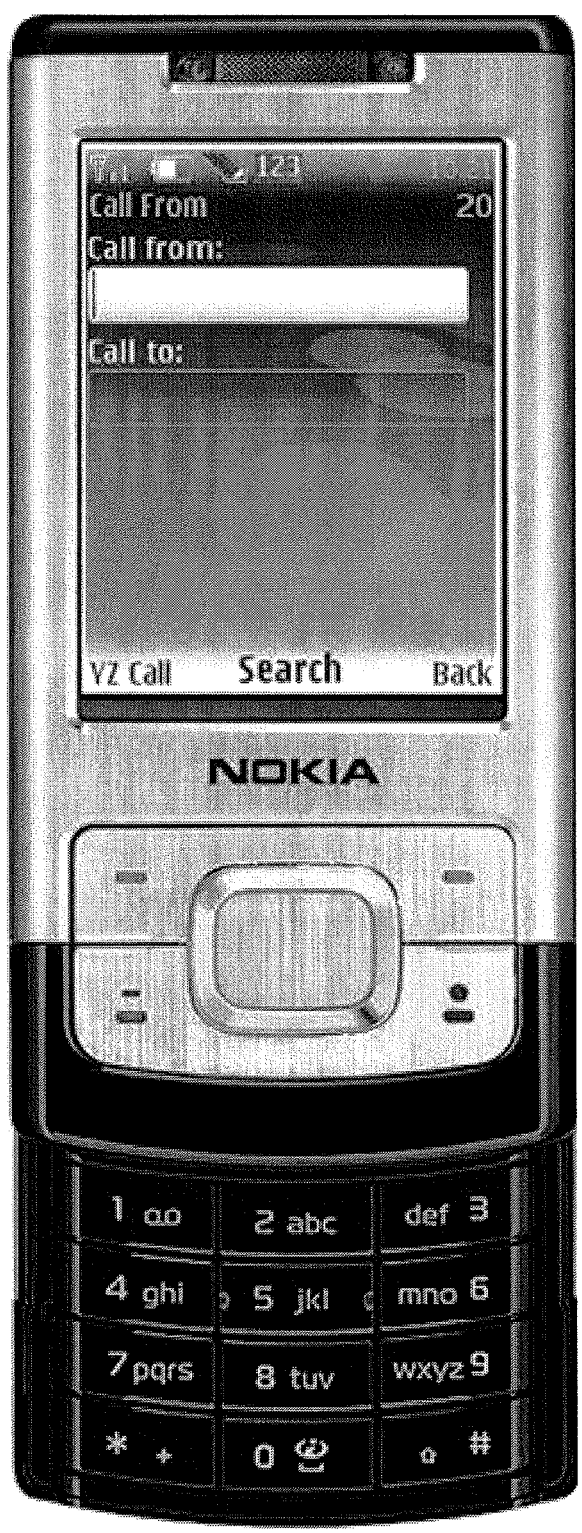
Figure 4D:
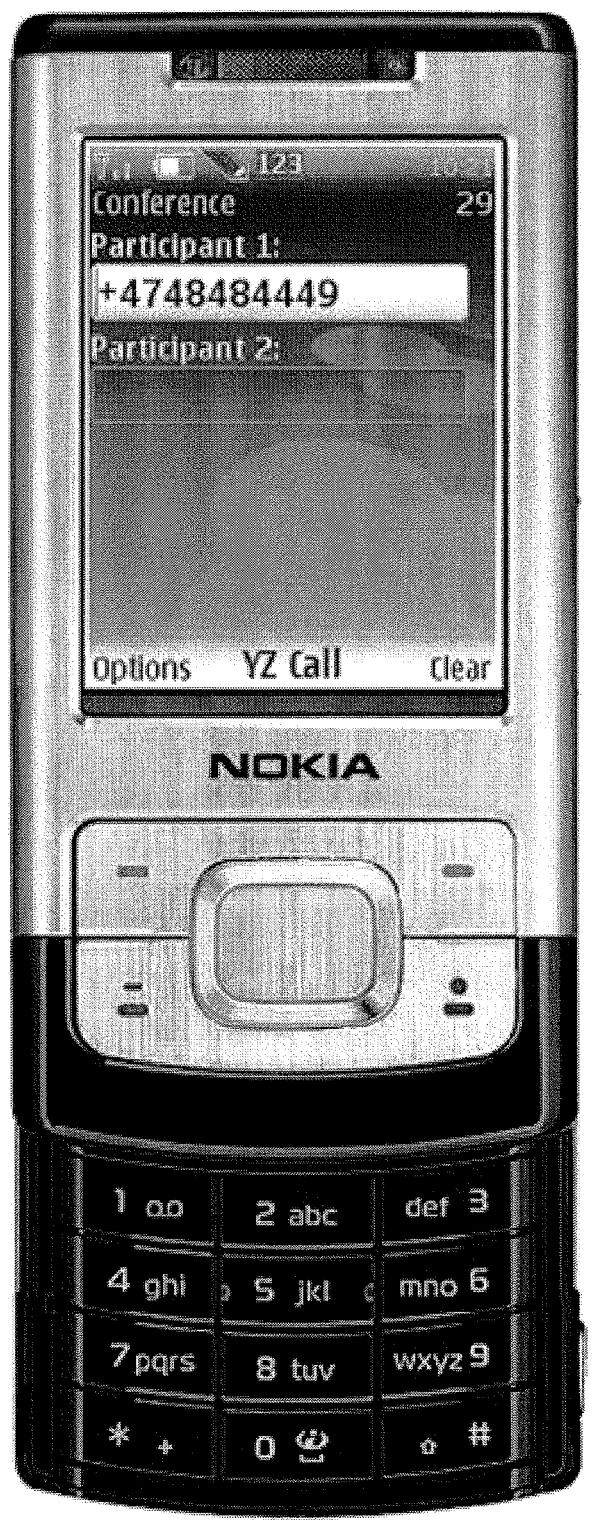
Figure 4E:
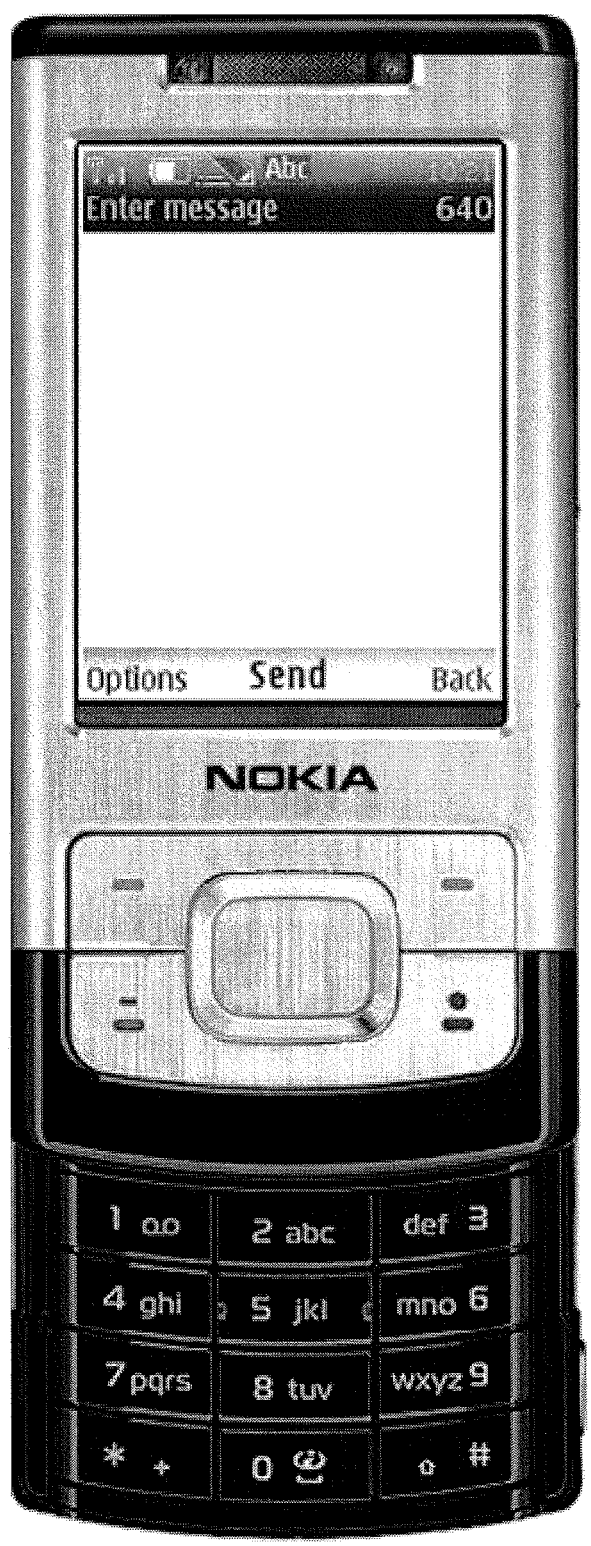
Figure 4F:
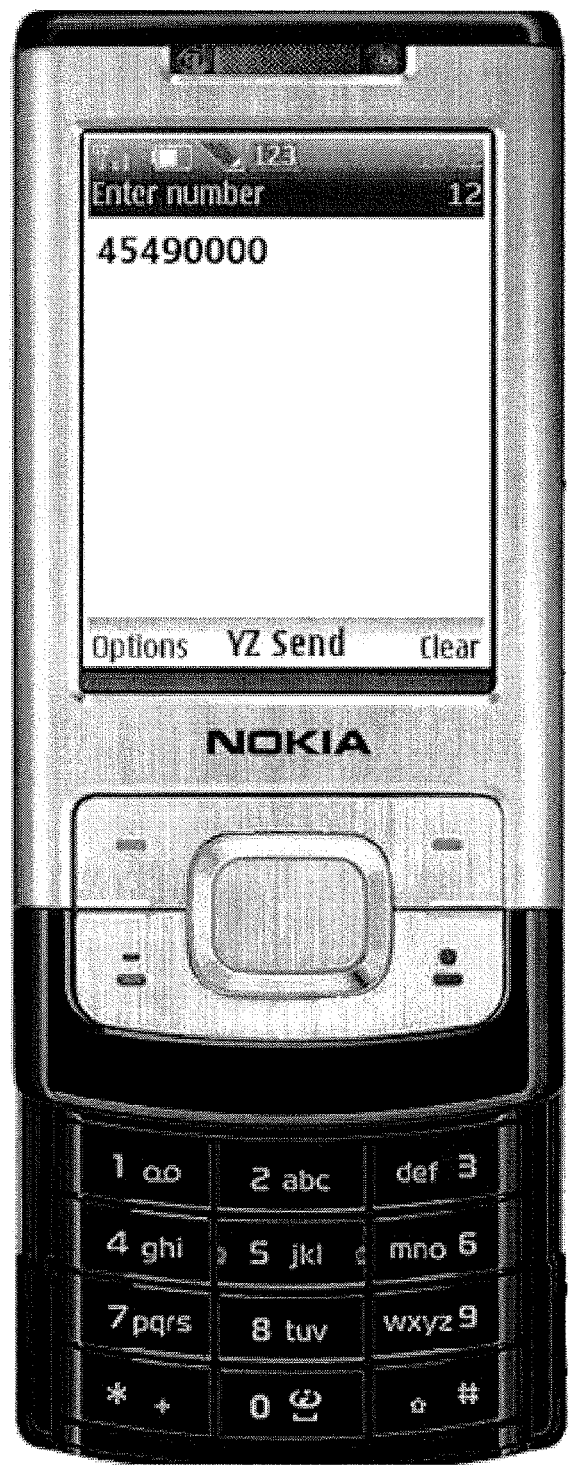
Figure 4G:
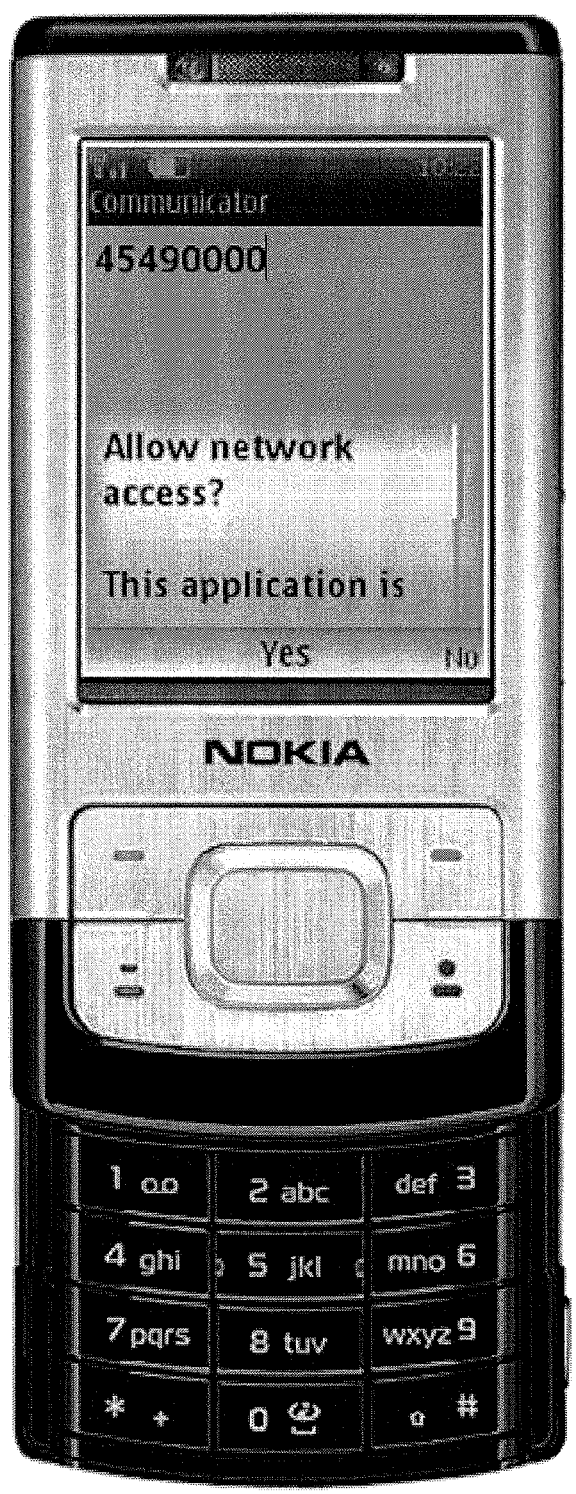
Figure 4H:
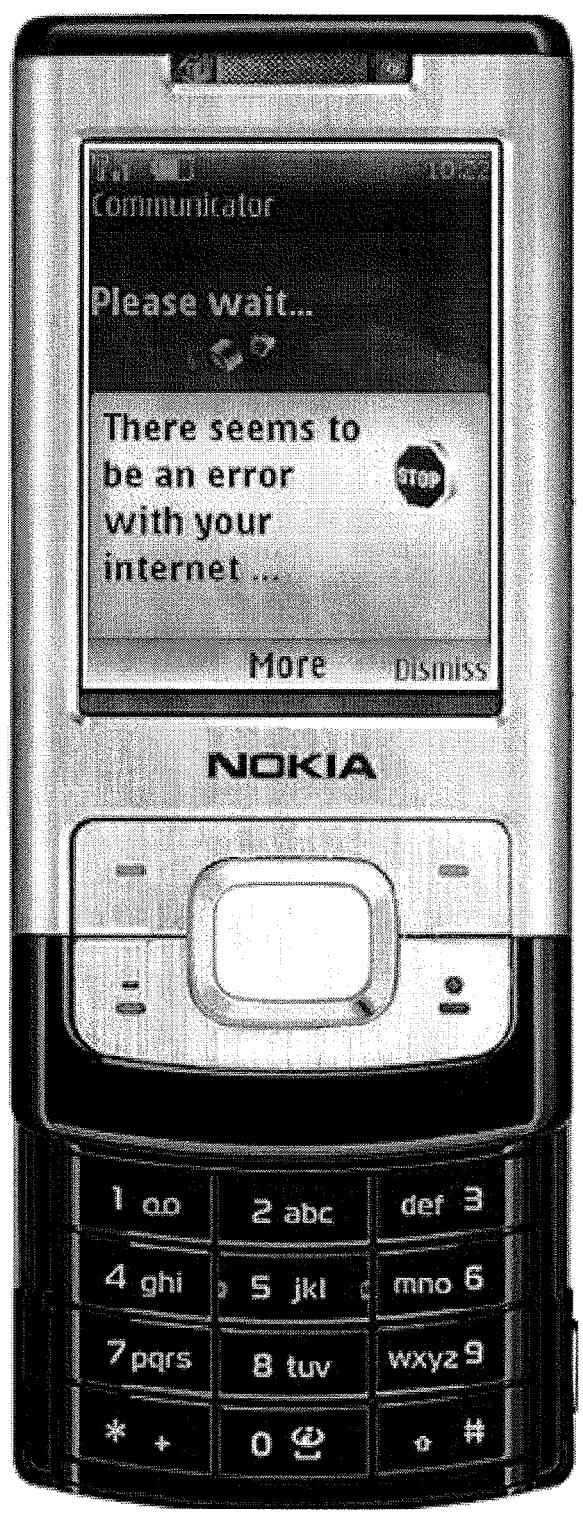
Figure 4I:
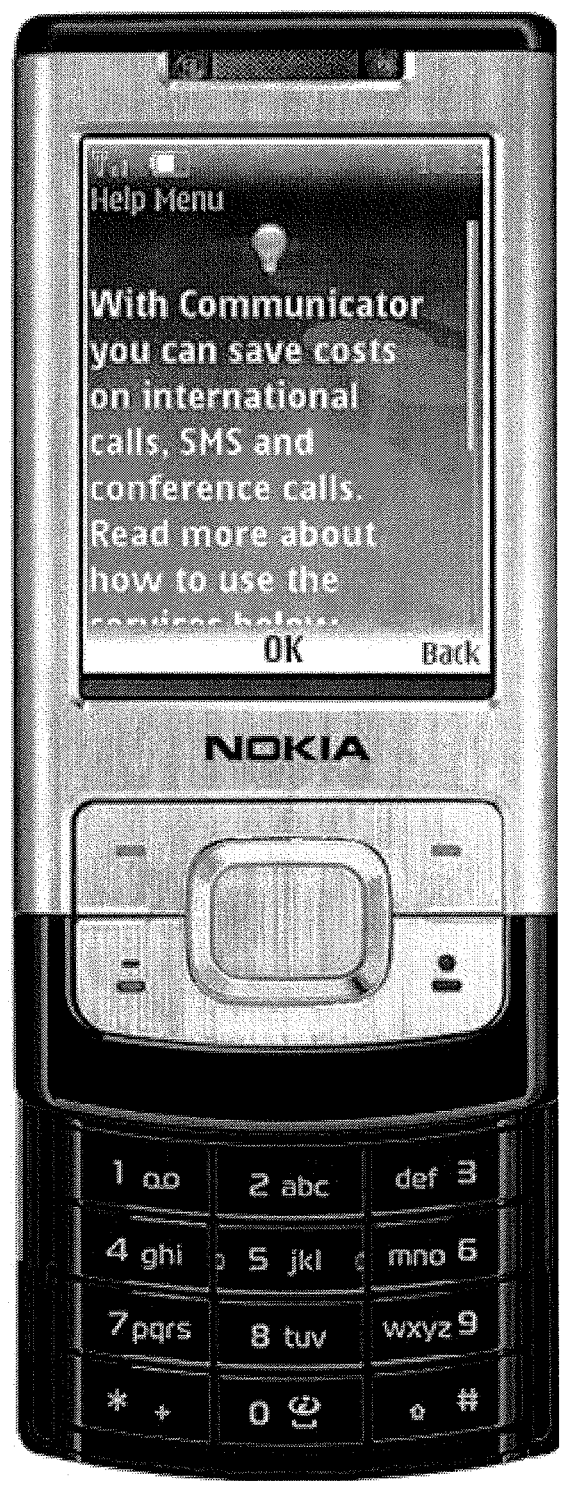
Figure 4J:
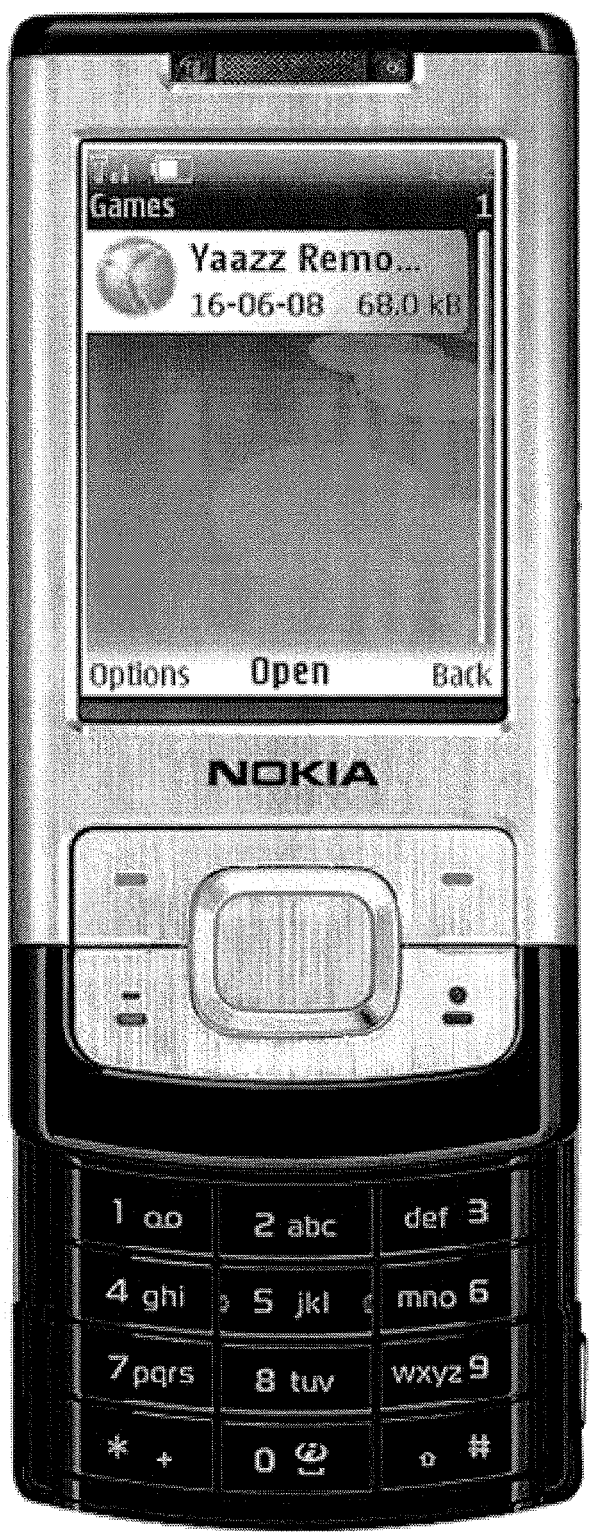
Figure 5A:
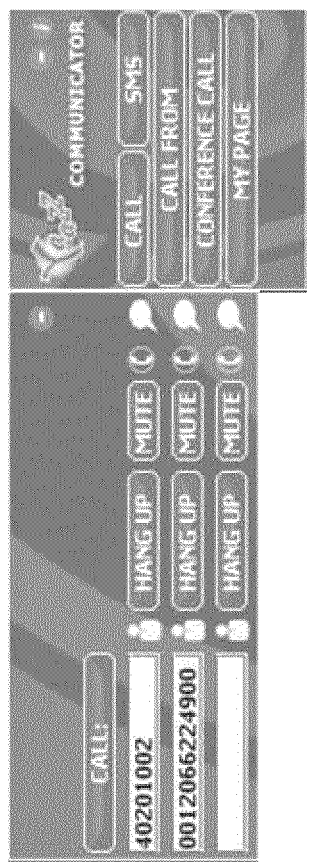
FIGS. 5A and 5B show examples of a graphical interface as provided on a YaaZZ PC Communicator to provide several of these functions.
Figure 5B:
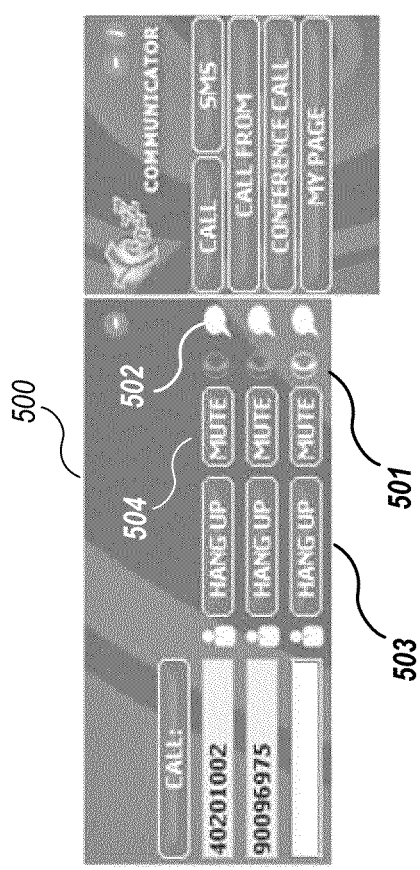
Figure 6A:
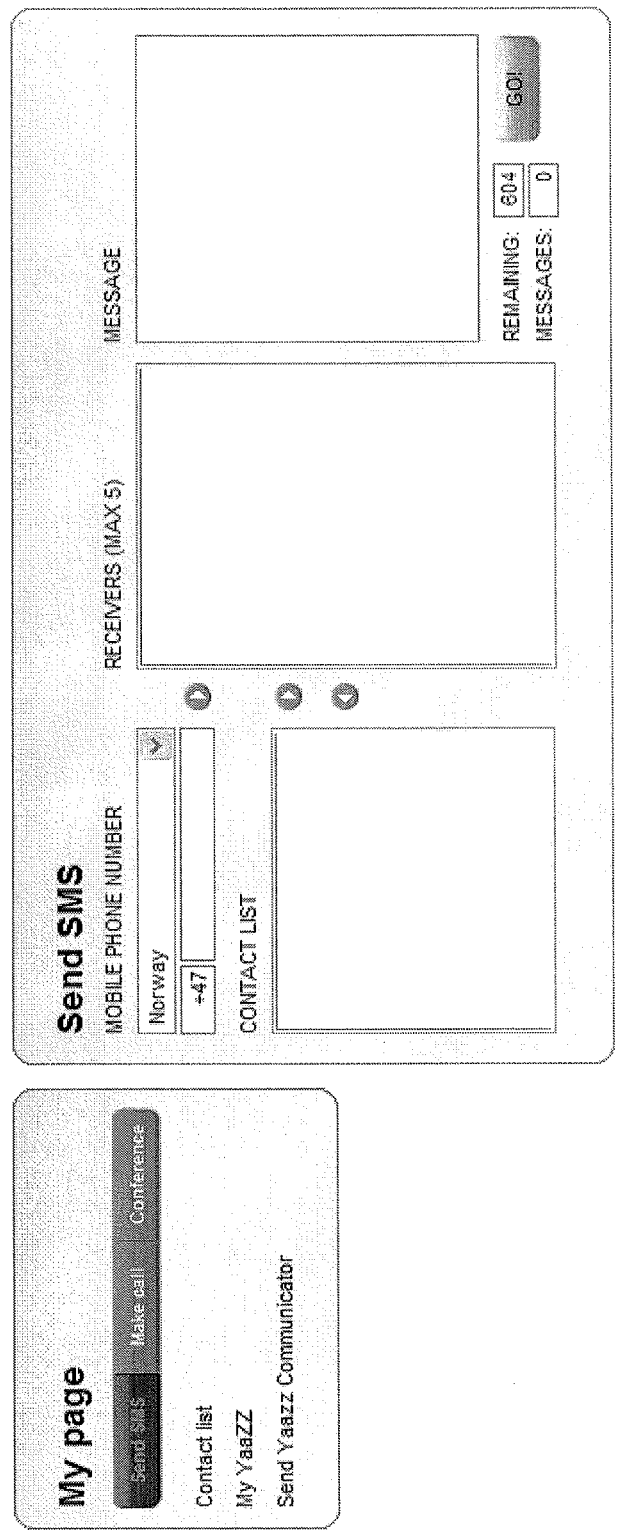
FIGS. 6A-6C show examples of a graphical interface as provided on a web version of the communicator to provide several of these functions.
Figure 6B:
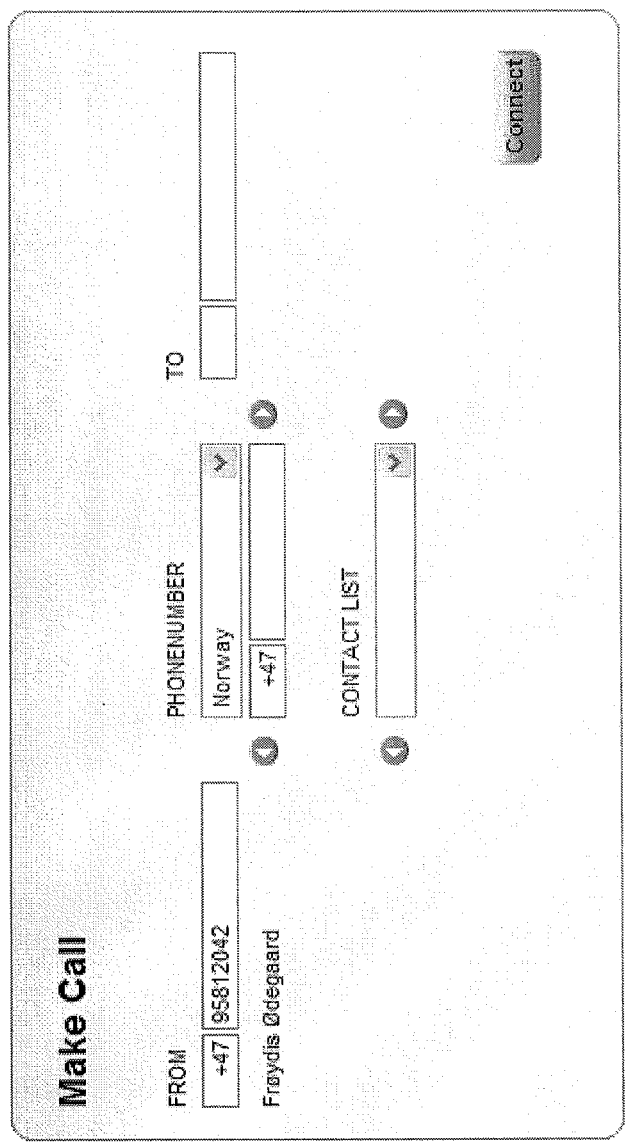
Figure 6B:
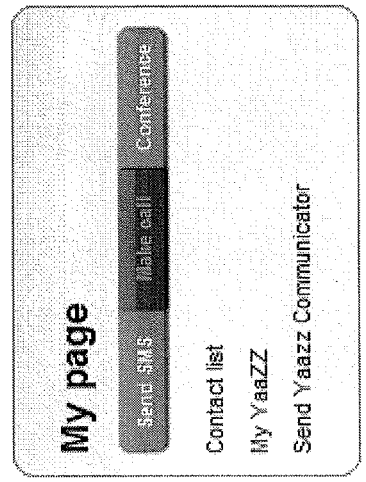
Figure 6C:
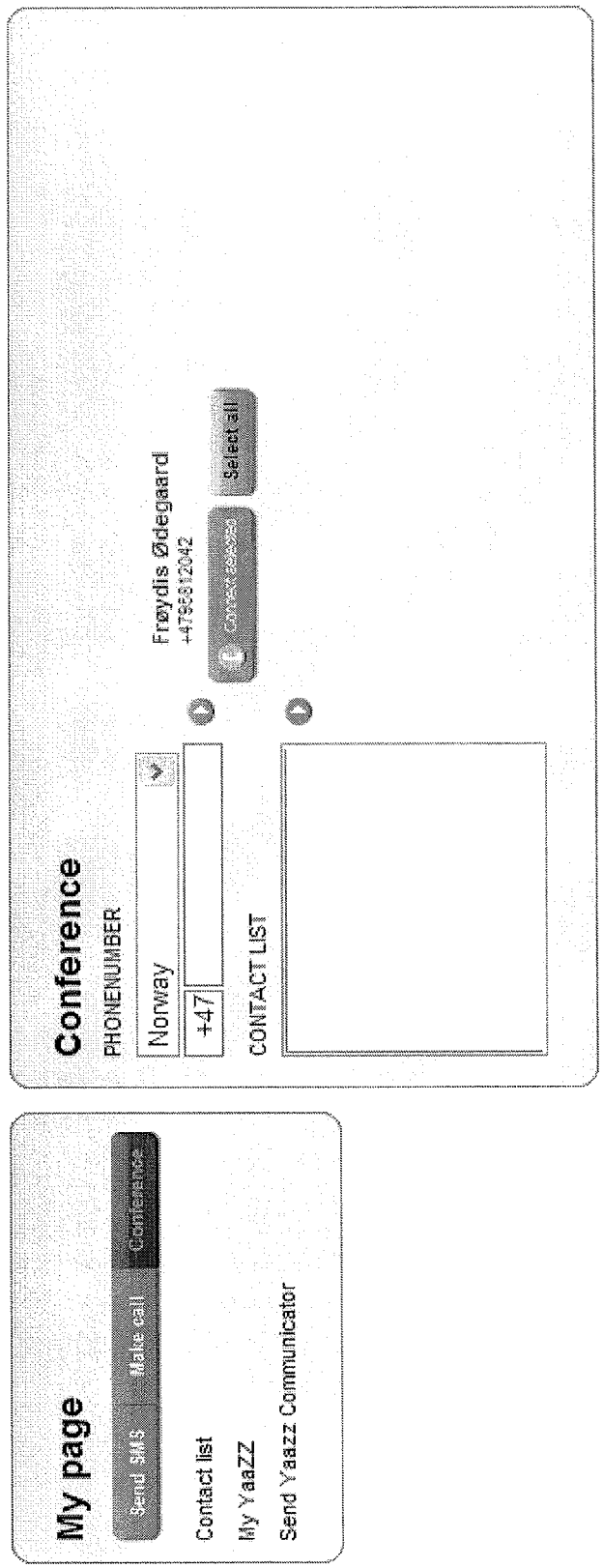
Figure 12A:
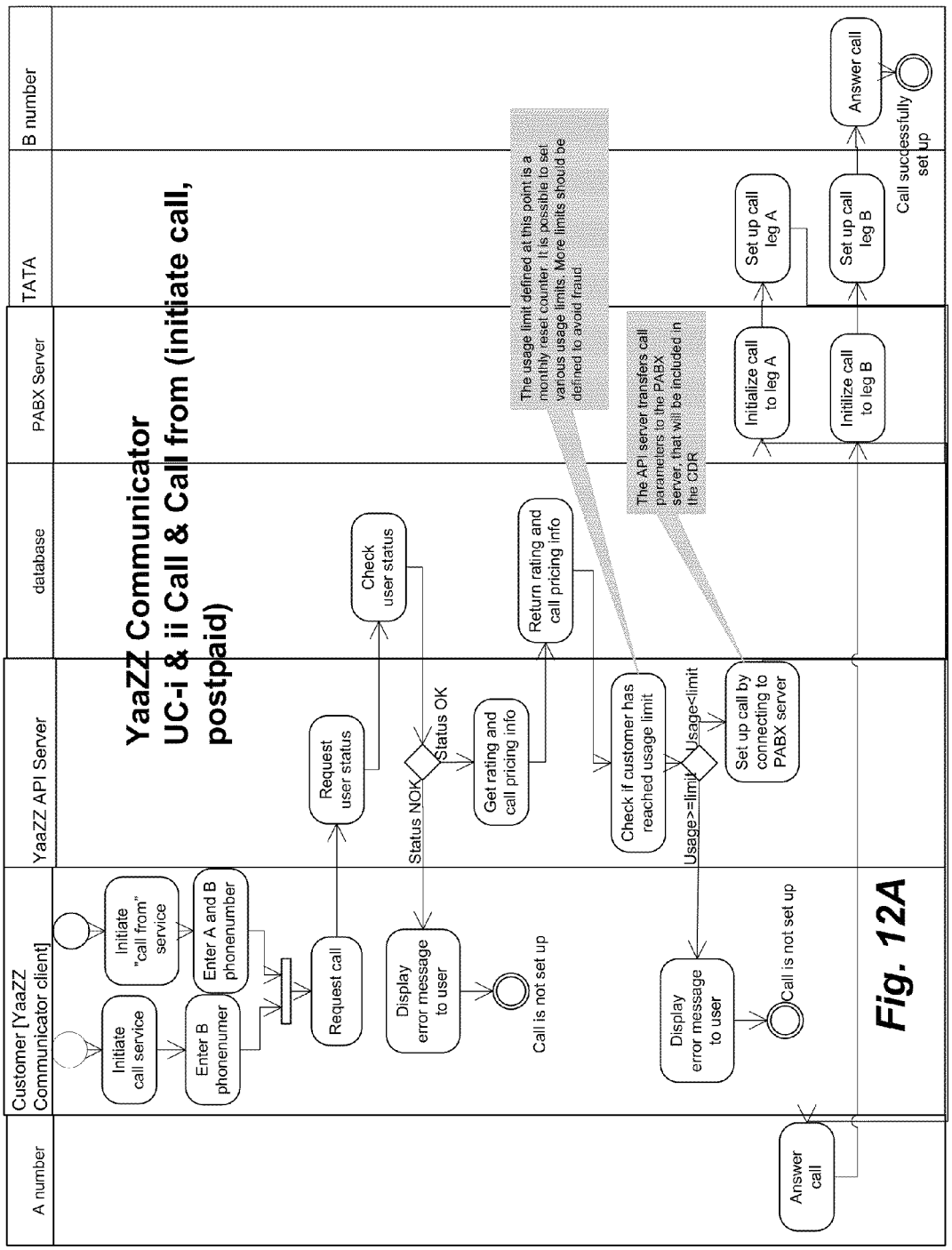
FIGS. 12A-12I are example detailed activity flow diagrams for the various telephony functions provided by a YaaZZ ETS Communicator.
Figure 12B:
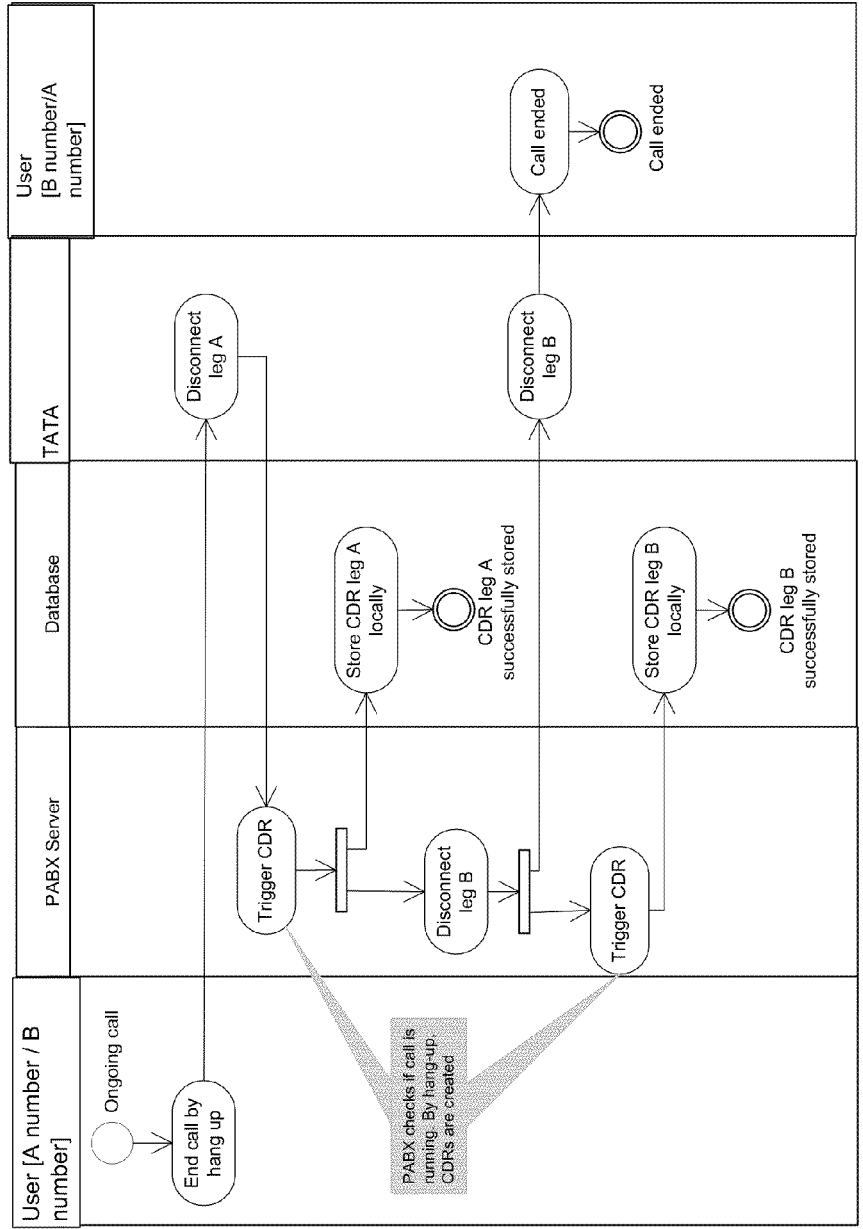
Figure 12C:
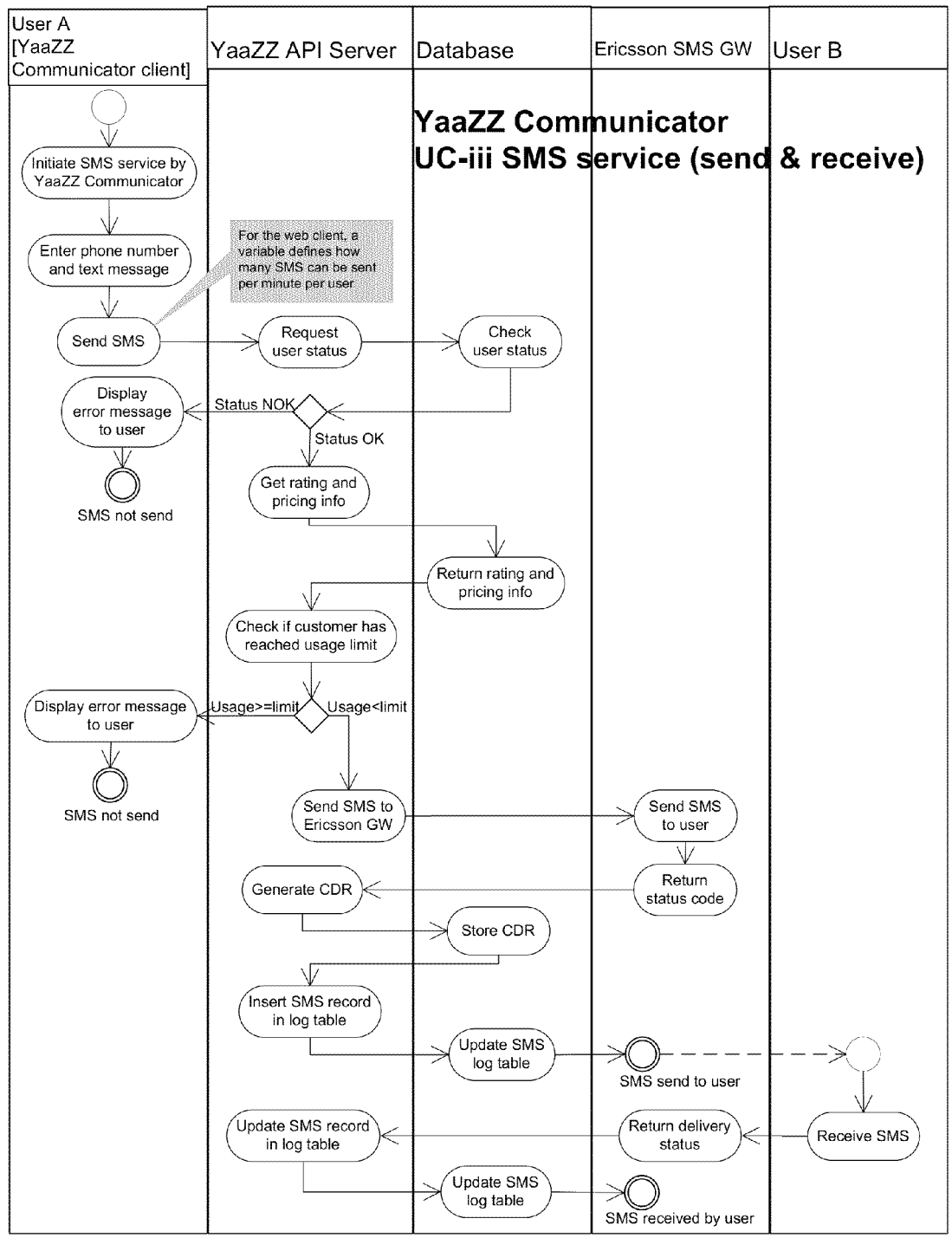
Figure 12D:
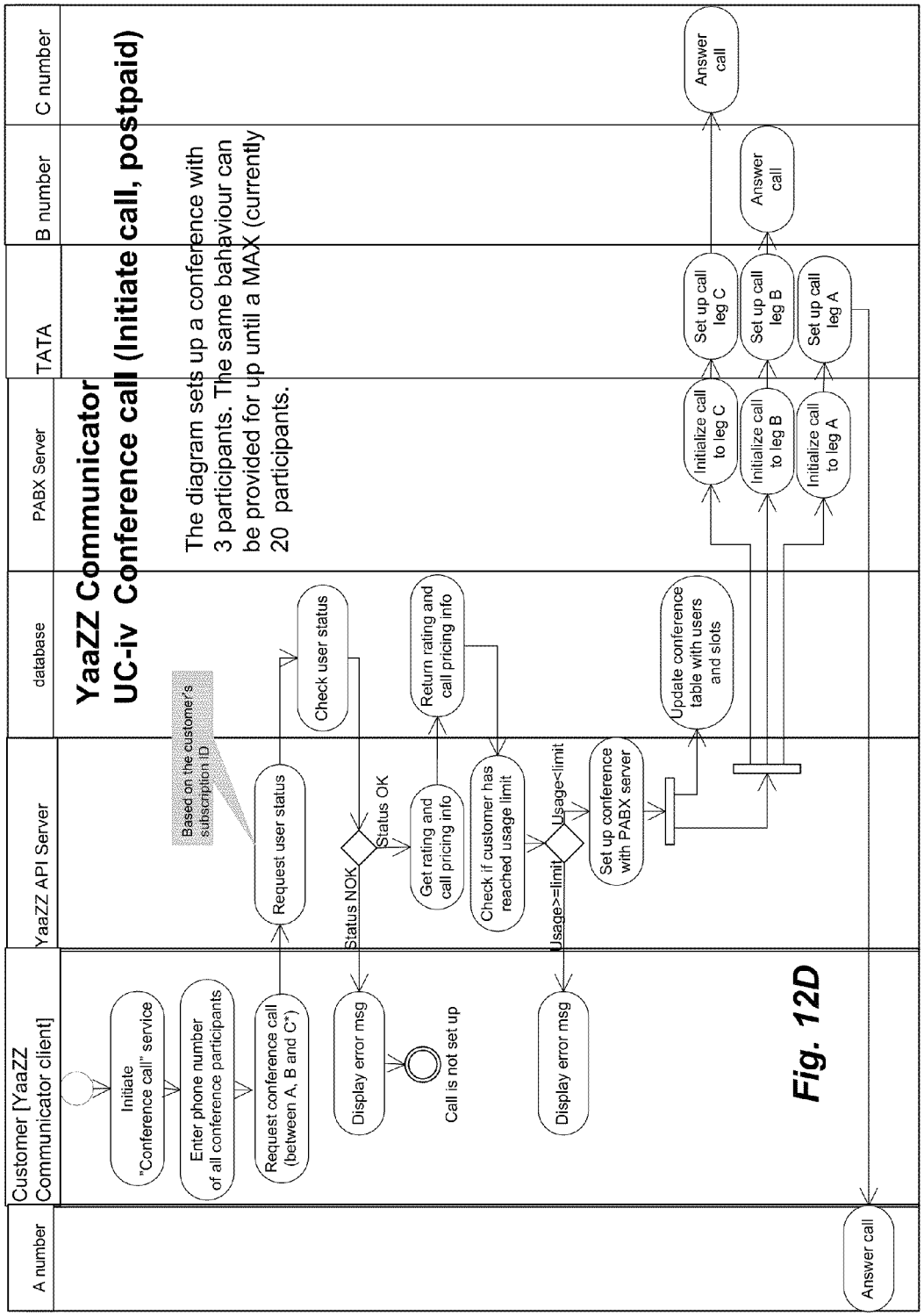
Figure 12E:
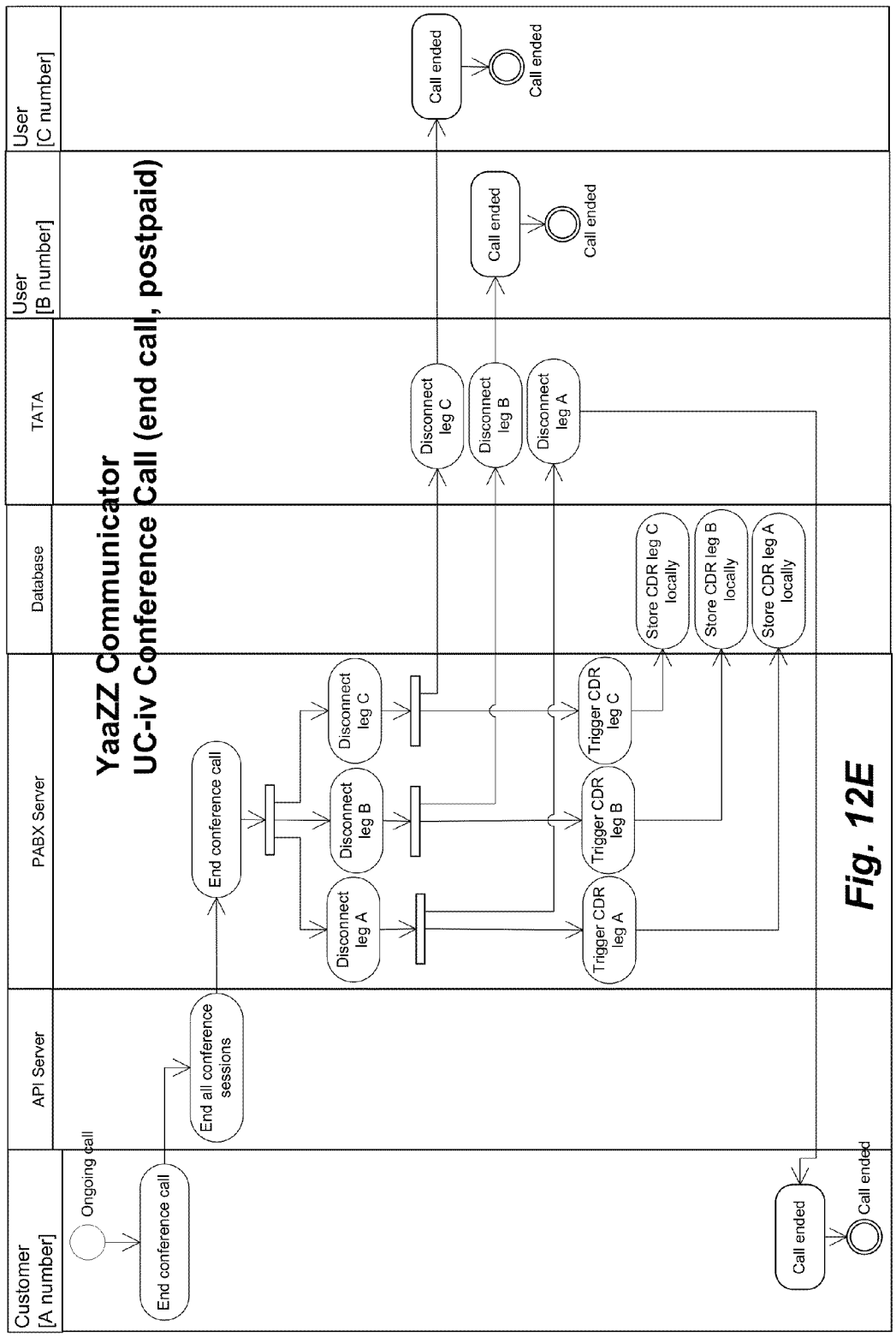
Figure 12F:
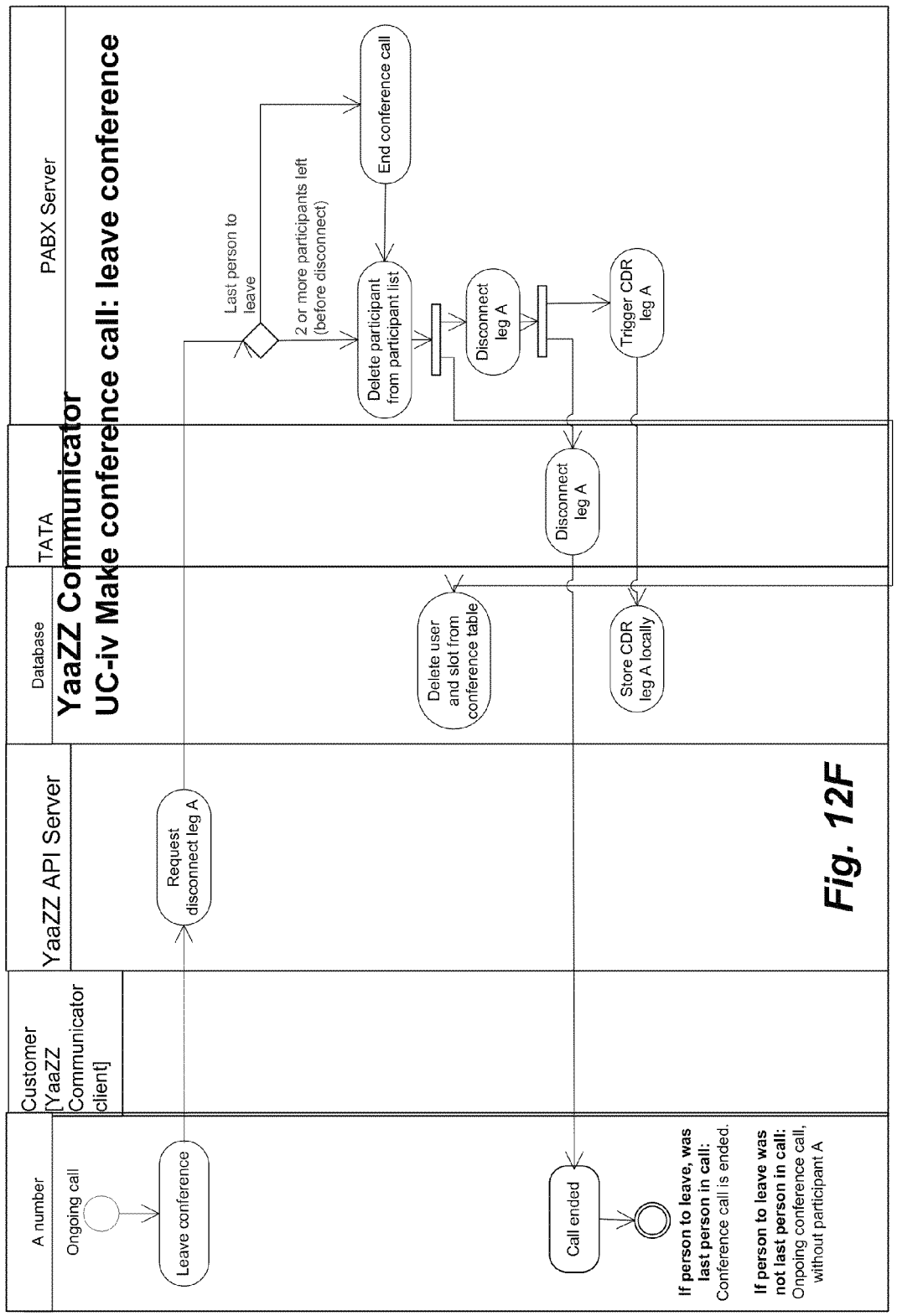
Figure 12G:
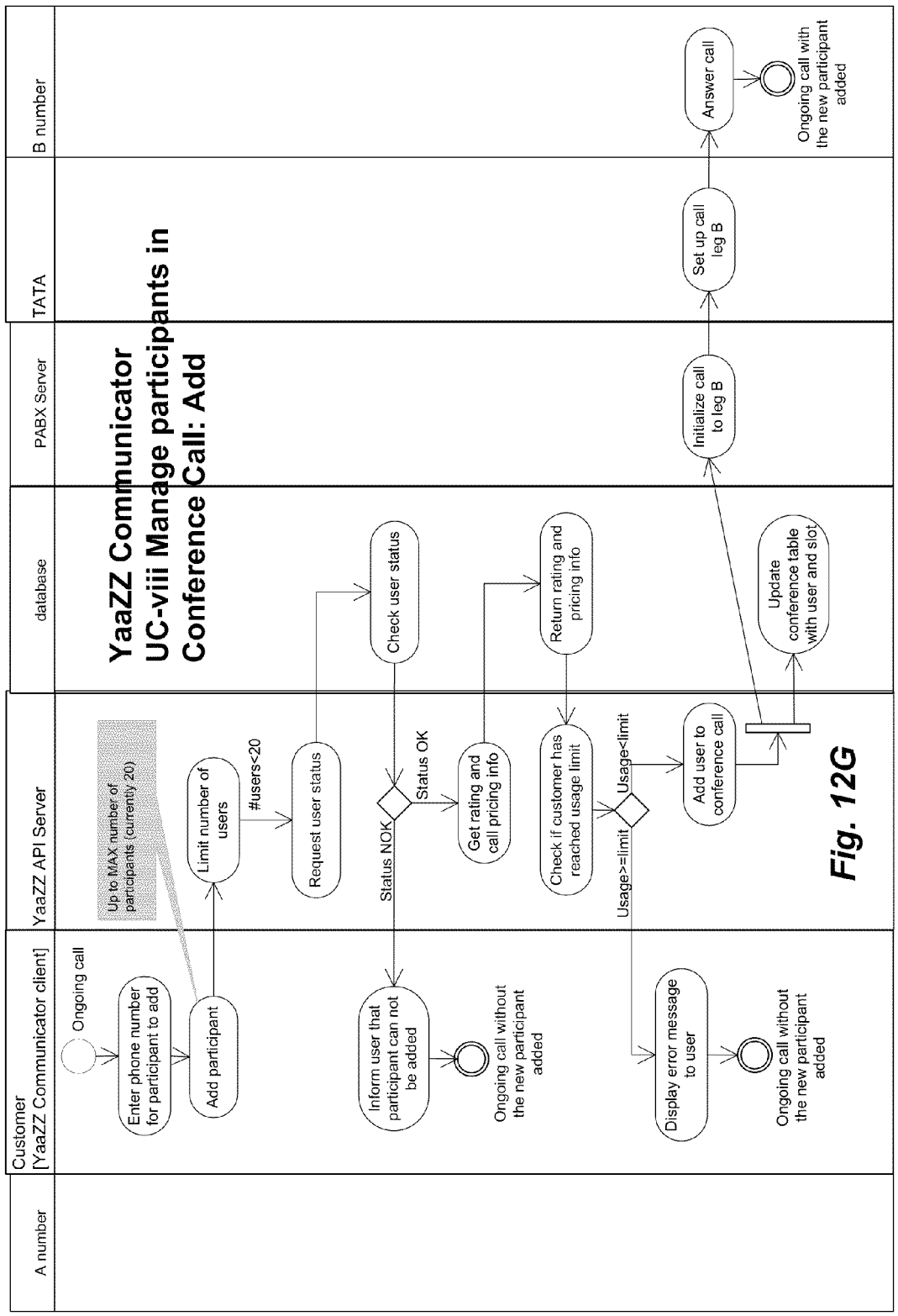
Figure 12H:
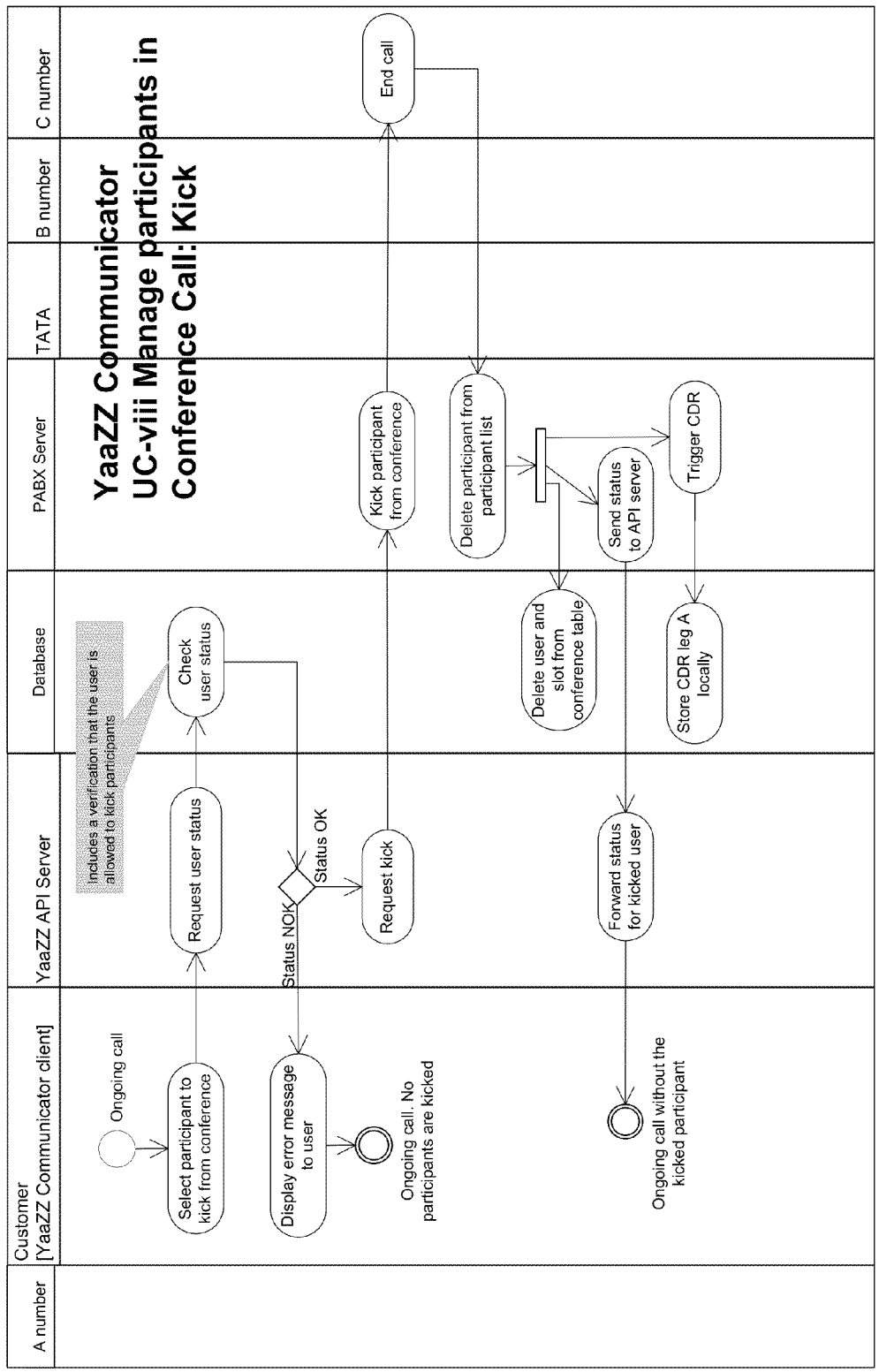
Figure 12I:
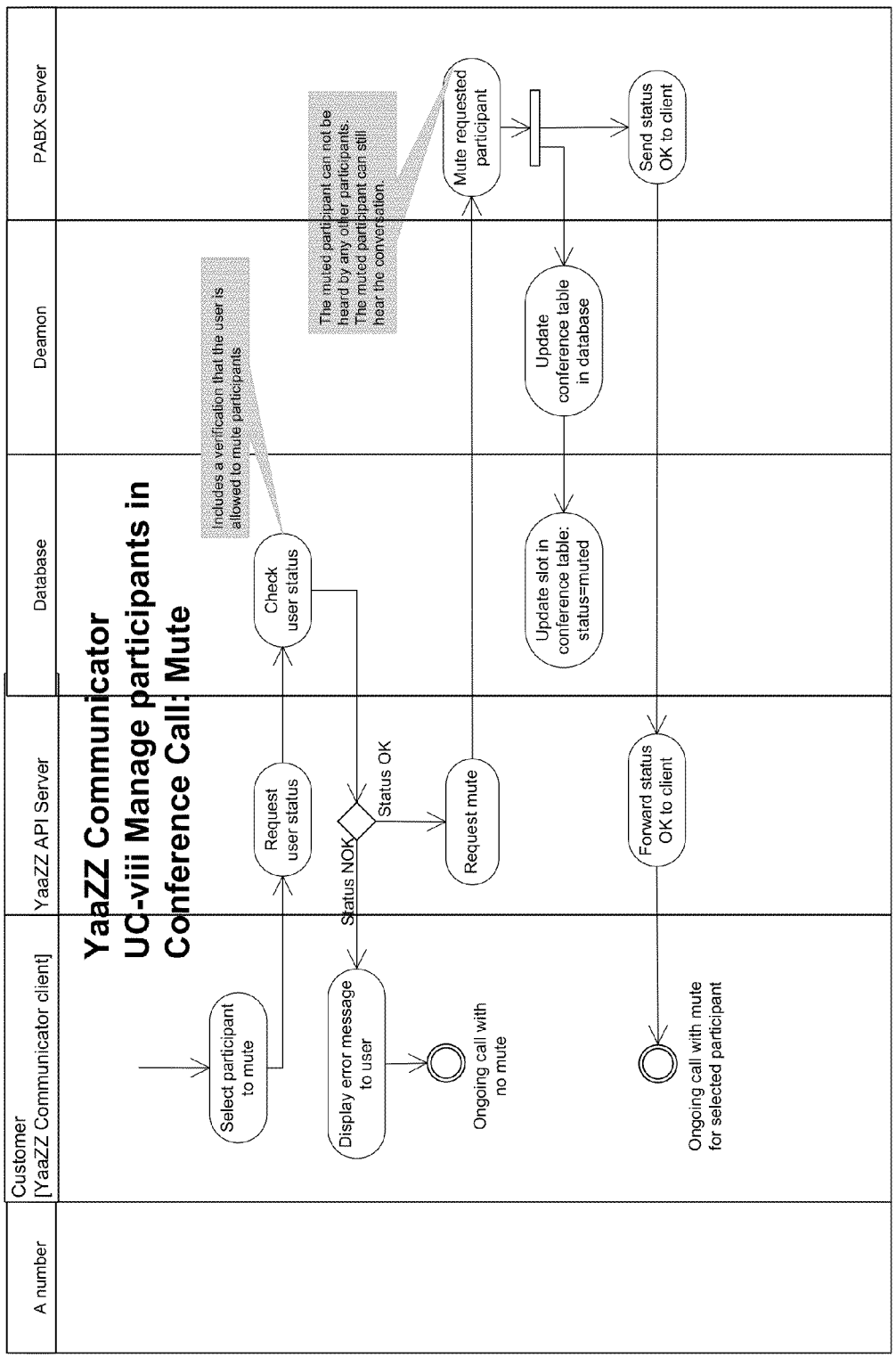
Figure 13A:
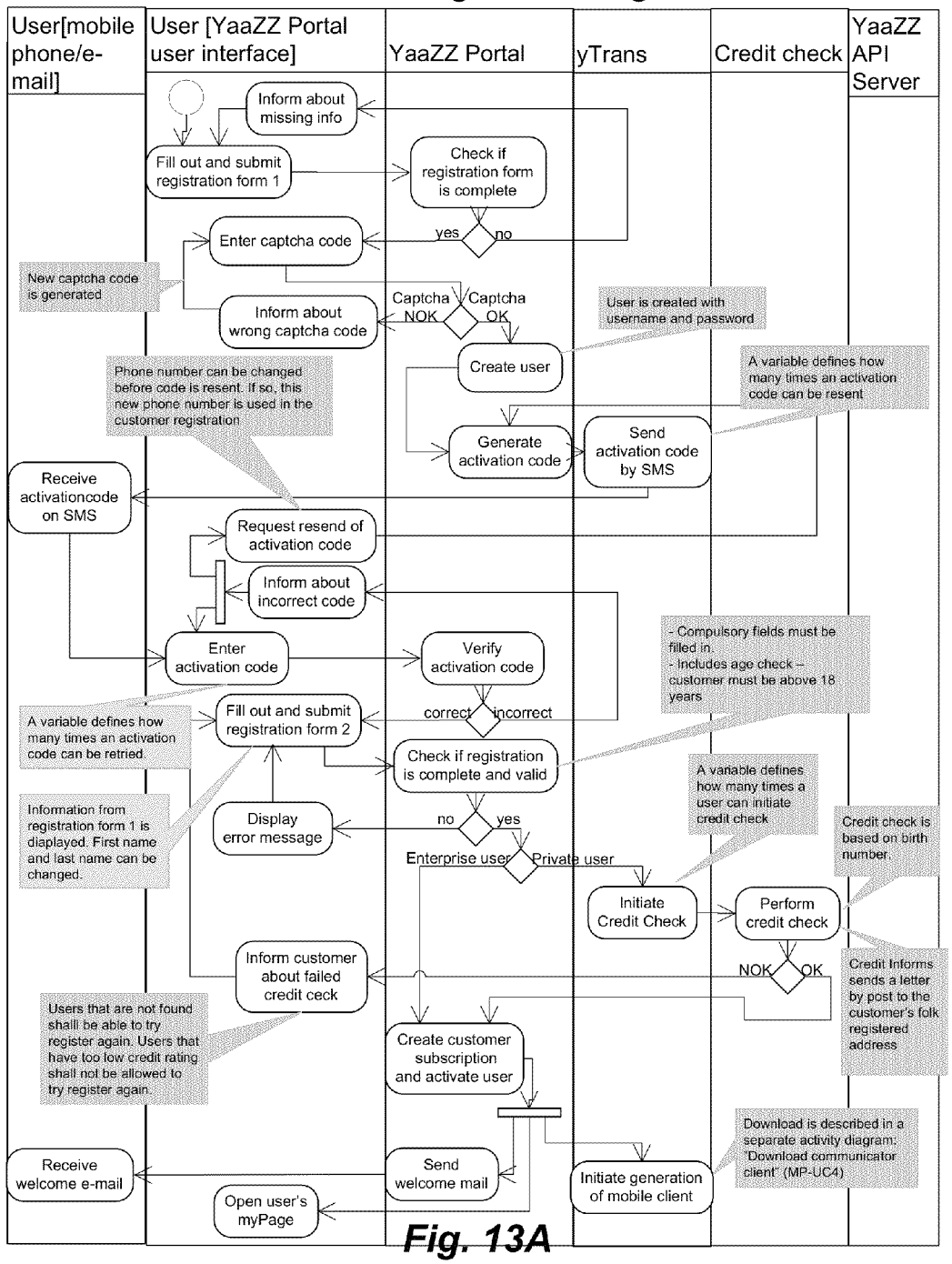
FIGS. 13A-13E are detailed activity flow diagrams for various telephony functions provided by a YaaZZ ETS Portal according to the use case models of FIGS. 11A and 11B.
Figure 13B:
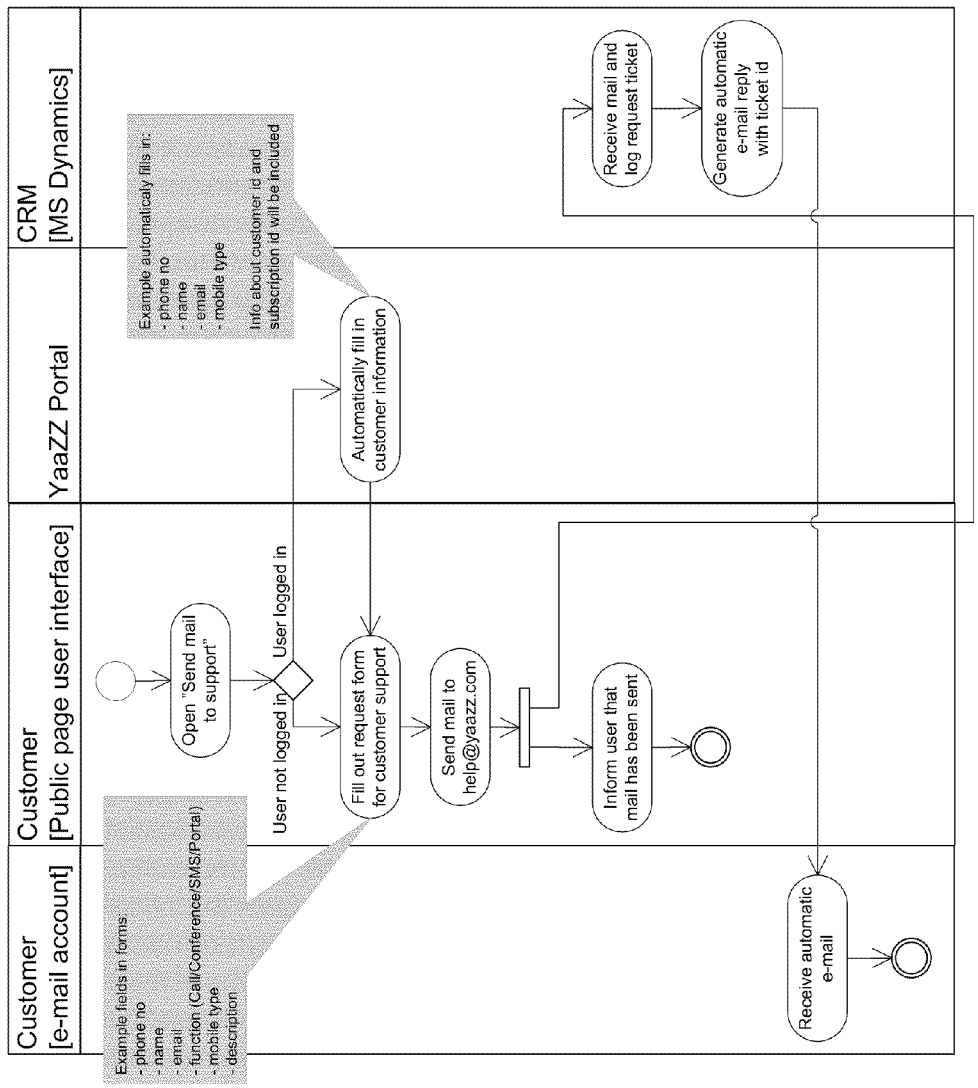
Figure 13C:
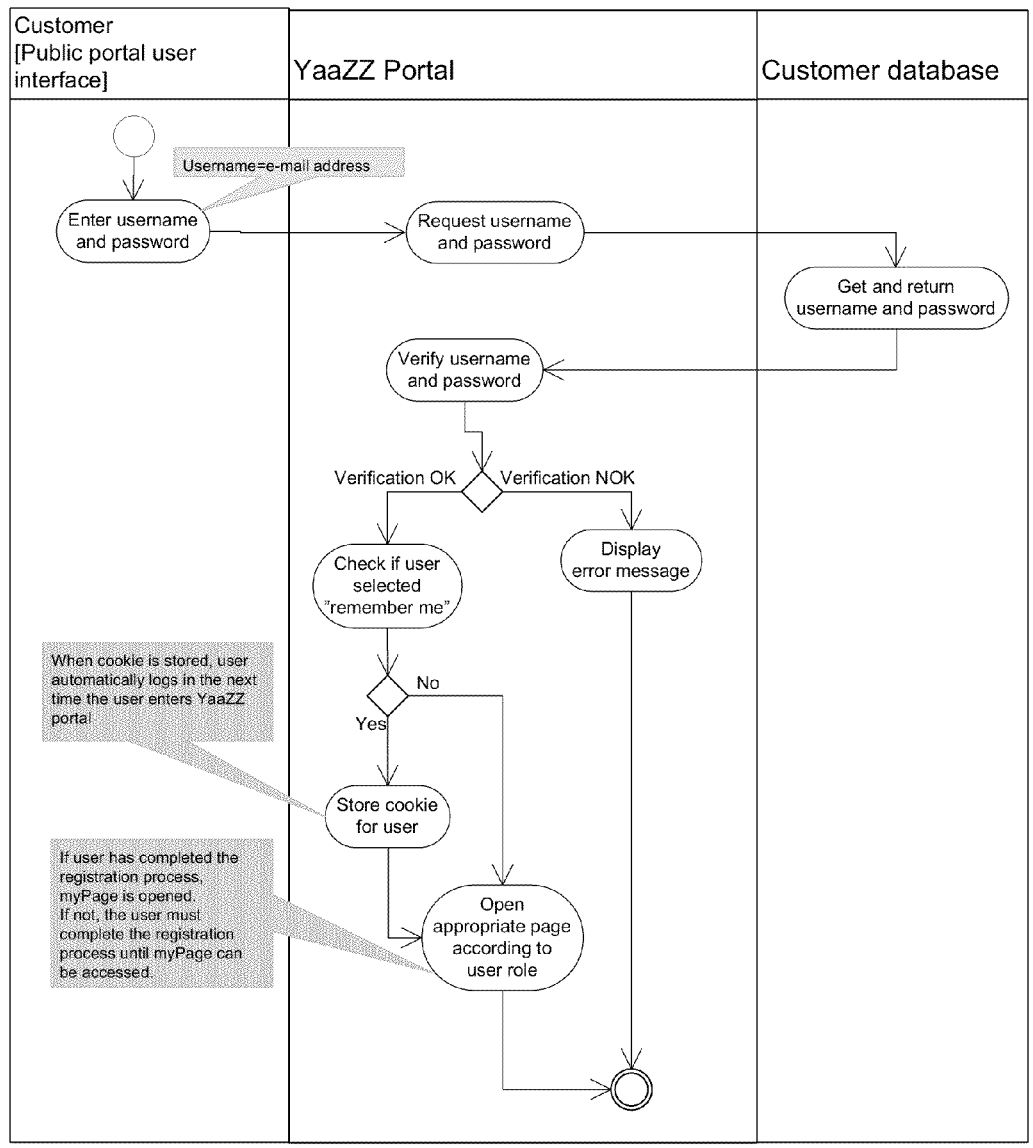
Figure 13D:
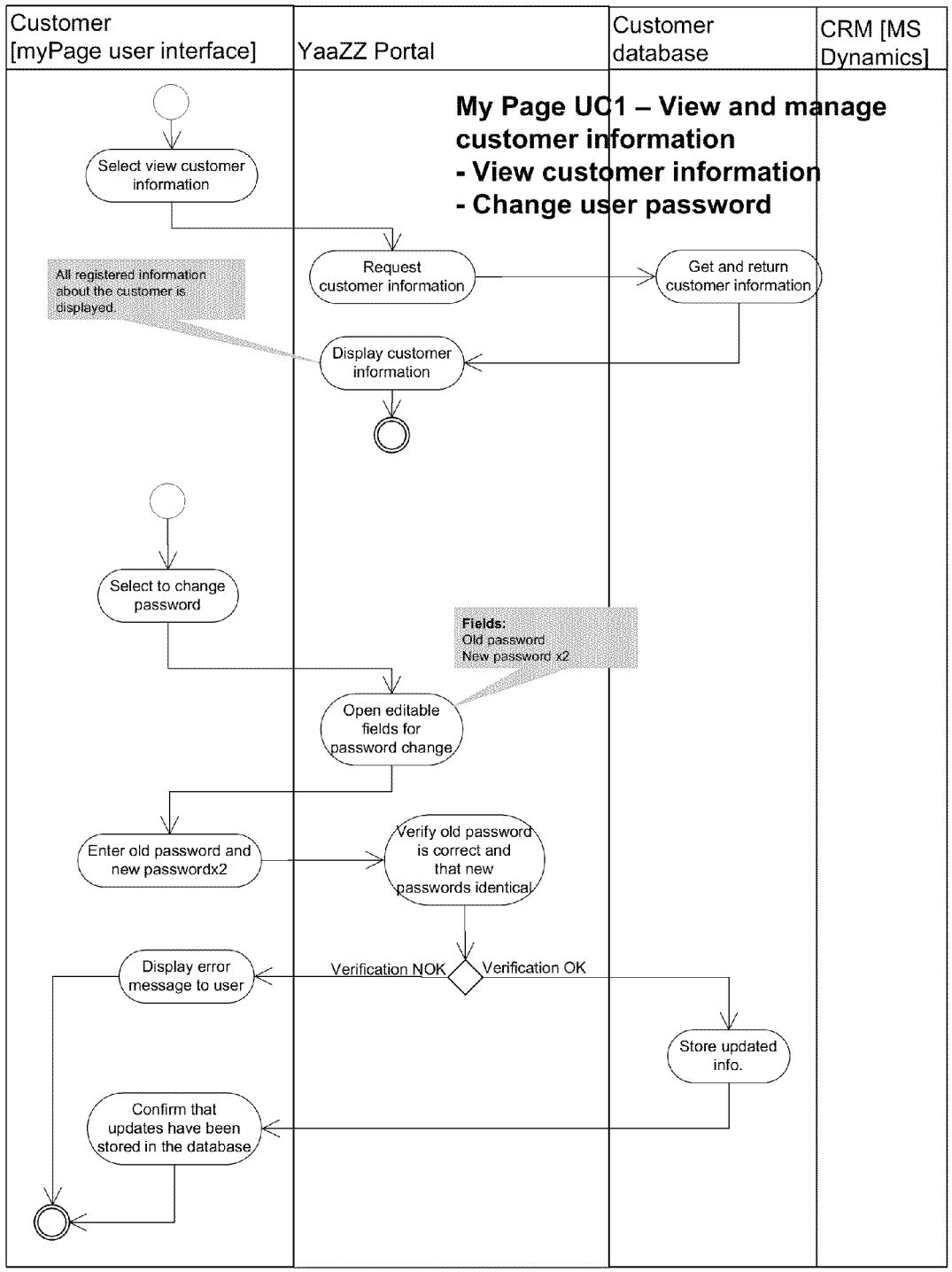
Figure 13E:
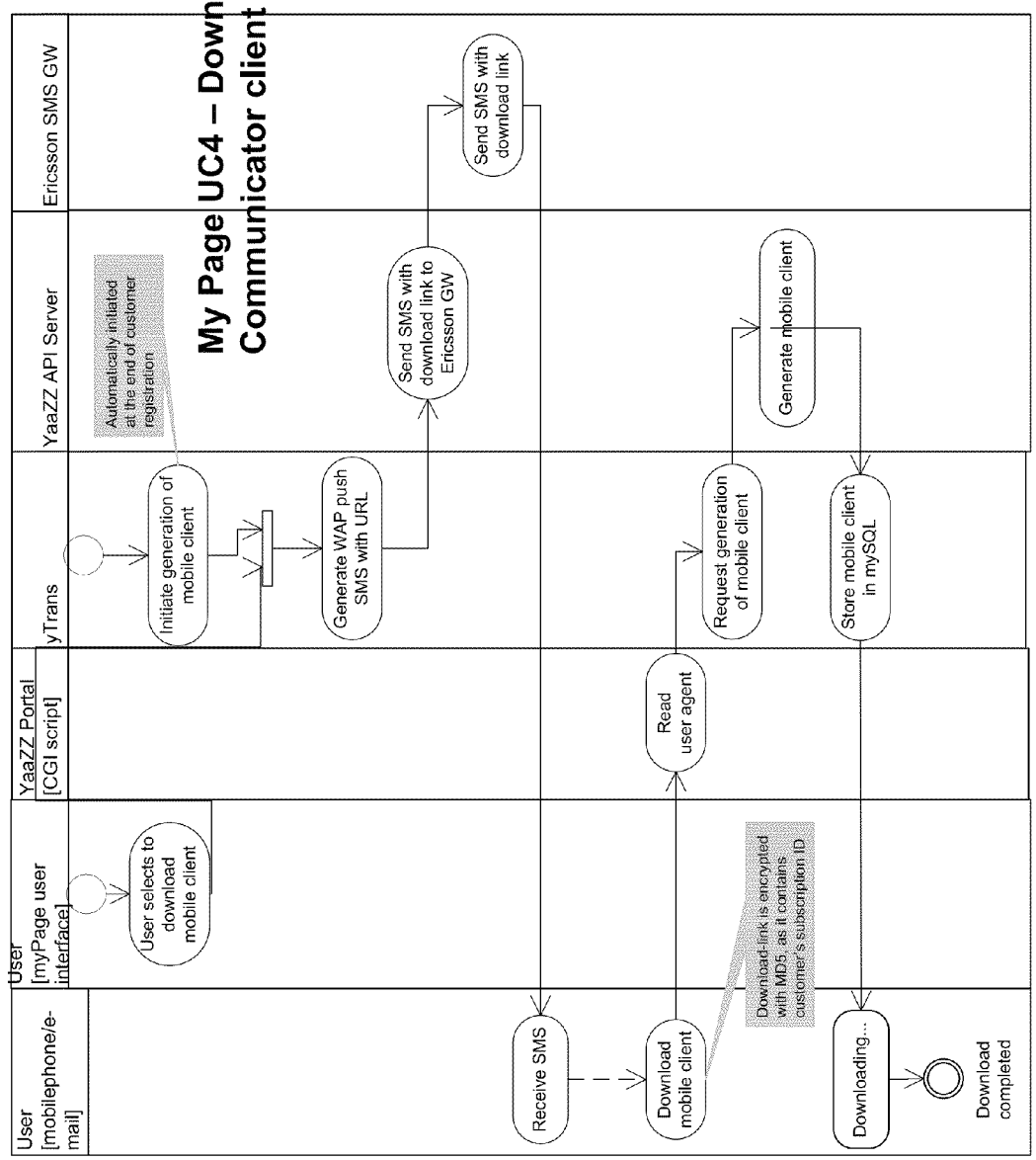

Various telephony functions are made available through embodiments of an ETS. FIG. 3 summarizes the main use cases made available through the various communicators, for example, through mobile, PC, and web communicators. In a current implementation of the YaaZZ embodiment, not all of the functions are available using each client (YaaZZ Communicator). However, it is to be understood that these interfaces may be further developed over time to offer equivalent functionality. A short description of each use case (indicated as an oval in FIG. 3) using a mobile YaaZZ Communicator follows. Erichsson capabilities are used to illustrate SMS function, although other equivalent providers could be substituted to provide SMS capability. Where possible, the descriptions refer to the detail flow charts that describe each function. FIGS. 4A-4J illustrate examples of a graphical user interface provided by a YaaZZ Mobile Communicator to provide some of these functions. FIGS. 5A and 5B show examples of a graphical interface as provided on a YaaZZ PC Communicator to provide several of these functions. FIGS. 6A-6C show examples of a graphical interface as provided on a web version of the communicator to provide several of these functions.

i. Use Call service 301—The call service allows the user to call from his own mobile phone number (i.e., the phone number that is registered at YaaZZ) to any other phone, by entering the phone number that the customer would like to call.
See FIGS. 4A and 4B for an example of a user interface for the "call" service. See also, FIGS. 12A and 12B which illustrate activity (flow) diagrams for "call" (initiate and end call) using a YaaZZ Communicator.

ii. Use Call from service 302—The "call from" service allows the user to place a call between the two phone numbers he enters as the "call from"—number and the "call to"-number. By using this service when abroad, the user can reduce his calling costs by placing a call from a local fixed line or local mobile phone (it is then less expensive to make a phone call from a fixed line or local mobile number than using an abroad SIM card).
See FIGS. 4A and 4C for an example of a user interface for the "call from" service. See also FIGS. 12A and 12B which illustrate activity (flow) diagrams for "call from" (initiate and end call) using a YaaZZ Communicator.

iii. Send SMS 303—The SMS service allows the user to send SMS at a low cost.
See FIGS. 4e-4h for an example of a user interface for the "SMS" service. See also FIG. 12C which illustrates an activity (flow) diagram for "SMS service" using a YaaZZ Communicator.

iv. "Conference call" service 304—The conference service allows the user to have a conference with up to (currently) 20 participants. A different maximum number of participants could be set by the system. The user enters (or selects from an address book or from another source of contact information) the phone number for each of the participants that shall be included in the conference, and sets up the conference call.
FIGS. 12D-12I illustrate activity flow diagrams for conference call capabilities using a YaaZZ Communicator. Example capabilities include initiating a conference call (FIG. 12D), ending one (FIG. 12E), leaving a conference call (FIG. 12F), adding a participant (FIG. 12G), terminating another participant (kick) (FIG. 12H), muting a participant (FIG. 12I), etc. Several graphical user interface (GUI) screen displays are shown in FIGS. 5A and 5B for the conference call service using the PC YaaZZ communicator. FIG. 4D shows a GUI example for a Mobile YaaZZ communicator. FIG. 6C shows a GUI example for a web based YaaZZ communicator.

v. Retrieve contact through address book 305—When using the "Call-", "Call from-", "Send SMS-" and "Conference"-service, the user can retrieve his contacts through an address book instead of entering the phone numbers himself. For the mobile client, this address book is the one that is available on the user's mobile phone. For the PC- and web-clients, the user may have its own contact list, which is available in the YaaZZ Web Portal.

vi. Read help description 306—A help description that describes how to use the main services in the YaaZZ Communicator is available from each of the YaaZZ Communicator clients.

vii. View participant status 307—While in a conference call, the YaaZZ Communicator GUI displays status information for each of the participants in the call, to the call initiator. This status information describes if the participant answers the call, is talking or not, has left the call, etc. For example, in the Communicator interface shown in FIGS. 5A and 5B, the status indicator 501 indicates who is connected to the conference, e.g., the phone icon 501 turns green when the participant is on the call, and the talk balloon 502 can be used to show which participant is talking, e.g., the balloon 502 turns green when talking, red when not talking, etc. Different indicators and different techniques for indicating information other than color, for example, sound, vibrations, etc. may also be incorporated to indicate status information.

viii. Manage participants in conference call 308—While in a conference call, the initiator of the conference call can manage the participants in the conference. This includes functionality, for example:
add new participants to the call. See FIG. 12G for a use case (flow) diagram describing these capabilities.
kick selected participants from the call. See FIG. 12H for a use case (flow) diagram describing the kick capability.
mute selected participants in the call. See FIG. 12I for a use case (flow) diagram describing the mute capability.
Any participant can also leave the conference call. See FIG. 12F for a use case (flow) diagram describing the leave capability.

ix. Log on to myPage 309—The user can log on to his personal page (available through the YaaZZ portal, e.g., portal 110 in FIG. 1) directly from the YaaZZ Communicator, by clicking the YaaZZ logo.
FIG. 13C shows an activity or flow diagram for logging into a user's personal page. FIG. 13D shows example activities that can be performed from a user's personal page such as to view customer information and change the password. FIG. 13E shows that the customer can download the "mobile" client application also from the user's personal page available through the YaaZZ portal.

In addition to the conferencing capabilities demonstrated in FIG. 3, in some embodiments, other conferencing functionality (not shown in the flow diagrams) is also provided. The following functions are provided to additionally enhance conference call capability on potentially all of the ETS Communicators, including mobile, PC, and web communicators.

x. Mark to Comment. This feature allows any of the conference participants to mark a desire to comment. This is especially beneficial in large conference calls where it is hard to get an opportunity to speak. The participant as well as the conference initiator (the lead participant) can set and reset the comment request. It is also possible in some embodiments for the conference PABX server to detect the a member is commenting by means of voice duration detection. In some embodiments, a Mark to Comment indicator is shown so that others can see it too.

xi. Agree/Disagree. During a conference, the agree/disagree feature allows the participants to indicate a level of agreement to what is being said or discussed. In some embodiments, the indication is shown only to the lead participant. In others, it is shown to all or a select set of the participants. In some embodiments, different levels between agreement and disagreement can also be defined, for example, "needs more discussion offline", etc.). Although there are potentially many purposes for such a tool, one purpose is to obtain a feel for consensus among the conference participants.

xii. Voting. This feature gives the lead participant an opportunity to put up a question for a vote. The question may be posed ahead of the call or during the call. When a "vote" is called for, the conference call goes into a voting mode which waits for the participants to indicate their votes to the question. In some embodiments, the results of the vote are displayed in near real time so that others can see. In other embodiments, the votes are tallied by the system and then an end result displayed. Different features can also be implemented such as different modes for ending the vote, naming and saving it, displaying it, etc.

xiii. Hot Conferencing. Some embodiments support a method of interconnecting a conference call with other conferencing systems such as Microsoft's Communicator, Outlook, management, and project applications. Some embodiments support conferencing as a "plug-in" so that a YaaZZ conference call may be set up from within another application automatically filling in contact information, agenda items, etc. From the other direction, from a YaaZZ conference call, using the "Hot Conferencing" feature, the lead participant can integrate other applications for direct use during the conference.

Example YaaZZ Communicator Mobile Client

In one of the example ETS embodiments of YaaZZ, the mobile client is distributed as a software application that can be downloaded from the YaaZZ portal and used on a mobile phone. FIGS. 4A-4J show an example user interface of an example embodiment of the YaaZZ mobile client of an Enhanced Telecomm System.

YaaZZ has currently developed several different versions: 1) a J2ME-MIDP Java application, which most cellular phones support, and 2) a C# application for Windows CE mobiles such as personal information managers (PIMS). A specialized version is planned to be available for (Phone/(Pod Touch. Other specialized platforms, such as Blackberry devices are also supported.

The client uses regular HTTPS protocol to communicate with the YaaZZ API Server. On some cellular phones this means that a device can initiate this communication via WLAN, Bluetooth, Direct Cable, GPRS, EDGE, WiFi, GSM, CDMA, and 3G, depending on the phone's available technologies and J2ME implementation.

Example YaaZZ Communicator PC Client

In one of the example ETS embodiments of YaaZZ, the PC client is distributed as a software application that can be downloaded from the YaaZZ portal and used on a personal computers, for example an Apple MAC or a Window's based PC.

This client has been developed in Java and hence is supported in all systems that have the latest compatible Java Runtime Environment. In an example deployment, the Linux version can come prepackaged for the Debian, Ubuntu and Mandriva operating systems, leaving room for more operating systems.

This client uses secure HTTPS communication with the YaaZZ API Server. The client is shipped with a public root and private client certificate for communication with the YaaZZ Server. It can use any available Internet connection.

Example YaaZZ Communicator Web Client

The YaaZZ Communicator web client is available to a user through the web interface of the YaaZZ Portal (by logging in with username and password). Example screen displays are shown in FIGS. 6A-6C. In other embodiments, the Web client screen displays are programmed to look like the other YaaZZ Communicators (PC and Mobile), for example, those shown in FIGS. 4A-4J and 5A-5B.

An example embodiment of this client is implemented on the YaaZZ Portal (the web interface of YaaZZ), and is coded in Python inside the LimeCMS environment by Innoventure AS. This client will work in all normal web browsers and client side applications capable of XHTML and JavaScript. Other implementations are possible.

The example Web Communicator uses an HTTPS connection to the API Server on the local network. This means that this is a protected API only available behind the firewall of the ETS, where both the portal servers and API servers is located.

Example Telephony Functions

As described in overview with reference to FIGS. 2 and 3, example embodiments of an ETS such as YaaZZ may be used to achieve a variety of telephony functions. FIG. 2 described an overview of how normal telephone calls are accomplished by the components of an ETS, using YaaZZ as an example. FIG. 3 described the basic types of telephony services that are offered through ETS communicator clients such as the mobile, PC, and web communicator client systems of YaaZZ. See, e.g., FIGS. 11A-11D, 12A-12I, and 13A-13E to get a more detailed description of the functionality. Note that example detailed descriptions are presented for the postpaid solution. Similar diagrams may be constructed for the prepaid solution.

Figure 7:
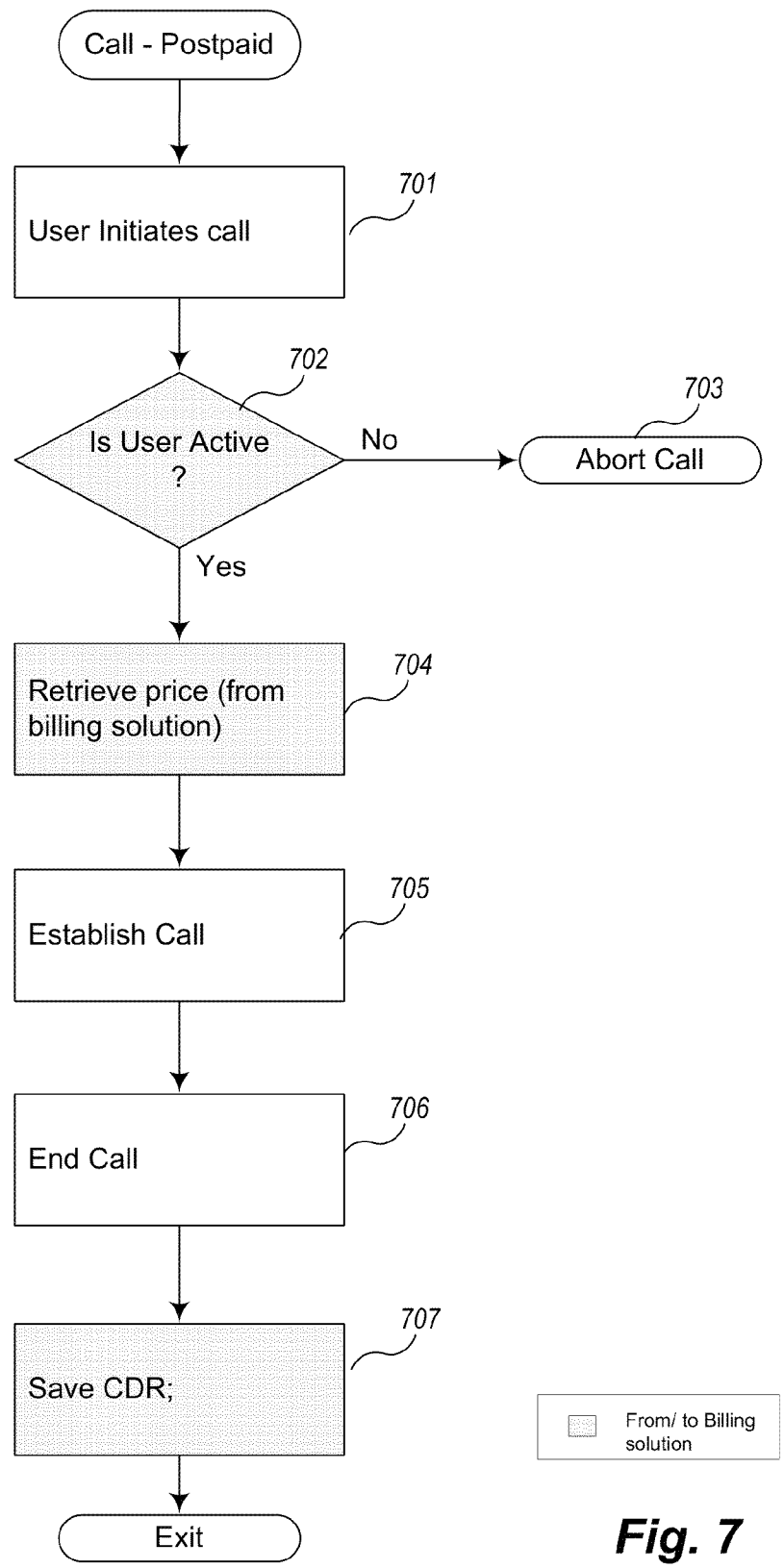
FIG. 7 is an example flow diagram of the basic call flow in a postpaid scenario using an Enhanced Telecommunications System.

FIG. 7 is an example flow diagram of the basic call flow in a postpaid scenario using an Enhanced Telecommunications System. In the postpaid scenario, the customer pays for the telephone call after it has occurred. In the overview of call flow shown in FIG. 7, after the user initiates the call (block 701) the ETS checks to see if the user is active (block 702) and, if not, aborts the call (block 703). Otherwise, the ETS retrieves the price from the billing partner (block 704) and the call is established (block 705), and the user talks until done. When the call is ended (block 706), the Call Data Record (CDR) is updated (block 707) and the routine exits.

Figure 8:
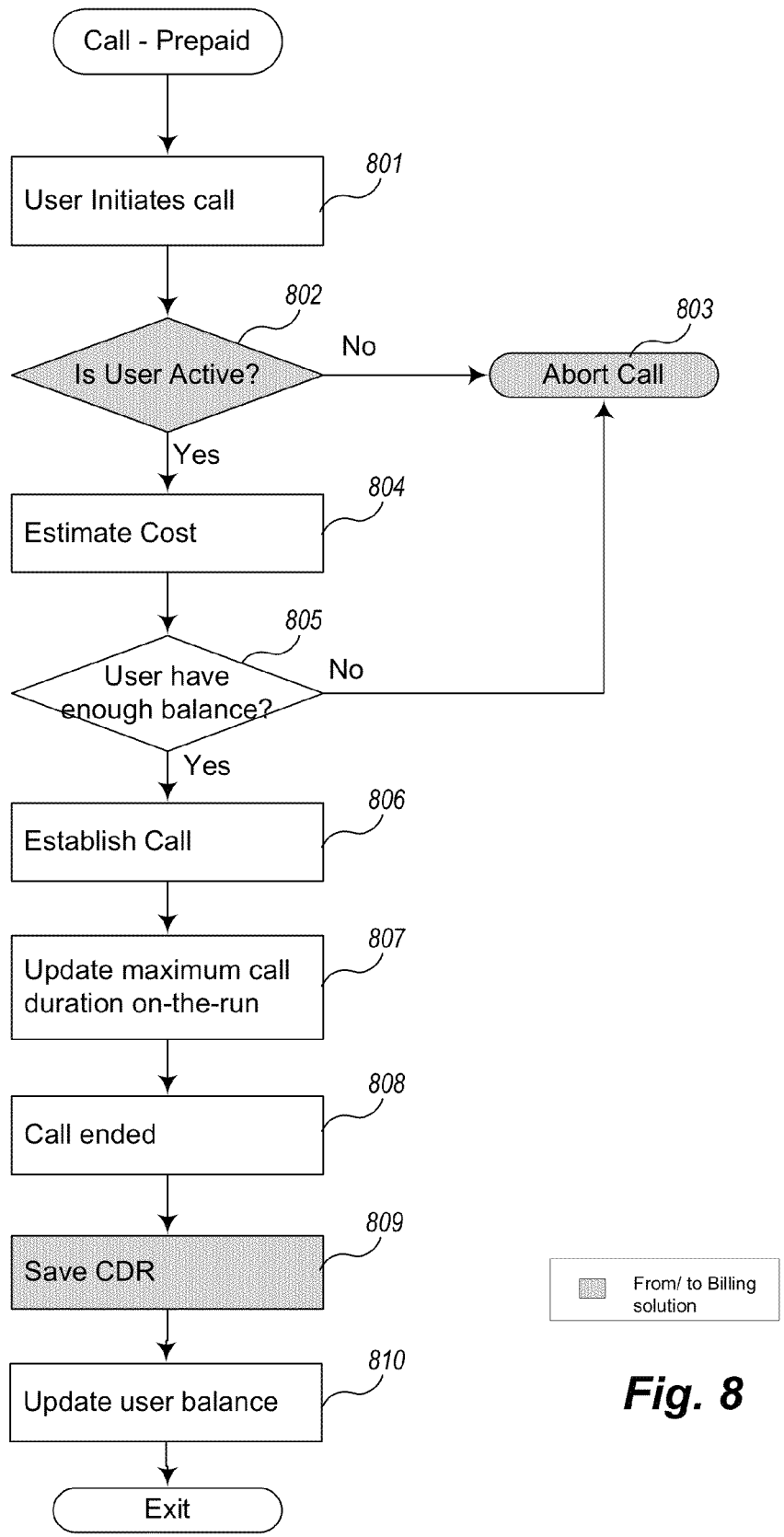
FIG. 8 is an example flow diagram of the basic call flow in a prepaid scenario using an Enhanced Telecommunications System.

FIG. 8 is an example flow diagram of the basic call flow in a prepaid scenario using an Enhanced Telecommunications System. An important part of the prepaid solution is the ability to halt calls at the moment (e.g., second) the end-user has used up his balance, even when one user has several calls going at the same time. An example solution has the following features:
- an isolated local accounting-database consisting of a user reference, and balance amount;
- language specific warning messages played back when reaching low balance; later beeps when only a few seconds left;
- automatic calculation of remaining time when user has several calls up at the same time, or has established a conference call;
- automatic update of remaining time when balance is updated in the portal during calls.

In the overview of call flow shown in FIG. 8, after the user initiates the call (block 801) the ETS checks to see if the user is active (block 802) and, if not, aborts the call (block 803). Other, the ETS estimates the cost (block 804) and checks to see if the user has enough balance (block 805). If not, the call is aborted (block 803). Otherwise, the call is established (block 806), the maximum time the user can talk based upon the balance amount is set (block 807), and the user talks until done. When the call is ended (block 808), the Call Data Record (CDR) is updated (block 809) and the user's balance is also immediately updated (block 810). This helps in case the user has engaged in multiple calls at the same time.

Figure 9:
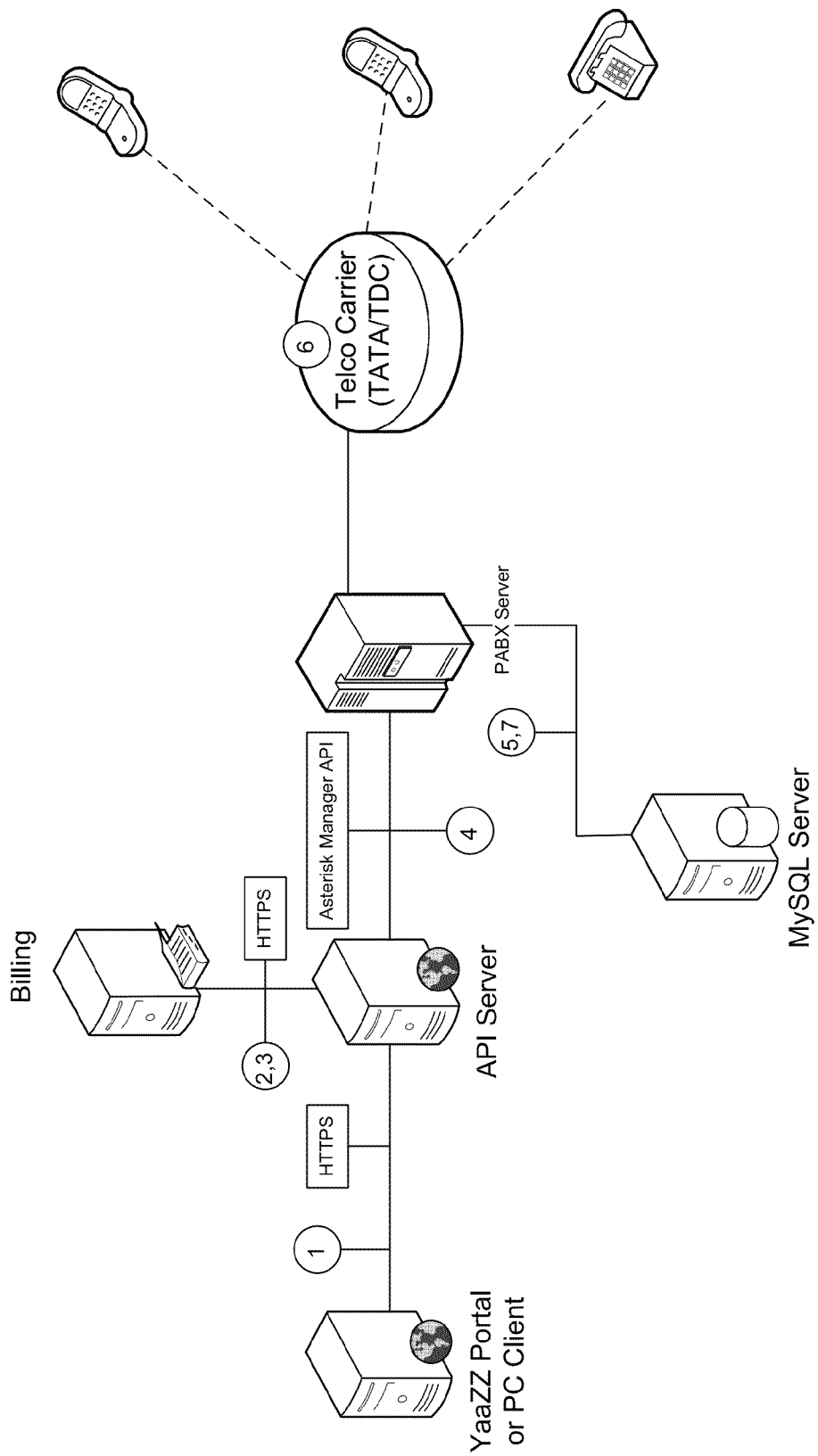
FIG. 9 is an example flow that illustrates further details of the YaaZZ ETS components used for the design of telephony applications in a postpaid scenario.

FIG. 9 is an example flow that illustrates further details of the YaaZZ ETS components used for the design of telephony applications in a postpaid scenario. The design of a typical YaaZZ application consists of the virtual layout shown in the FIG. 9, however the number of physical servers may differ when expanding to support a larger user base. The actions are labeled from 1 to 7 in the Figure and are described as follows:

1. When setting up a call, the user first originates the call using one of the three main YaaZZ Communicators: Mobile client, PC client or Web client. All three versions of the YaaZZ Communicator use the Internet as the medium for establishing a call, and all communication against the API server is typically through HTTPS. (When HTTPS is not available, HTTP with other URL validation schemes may be used.)

2. The server then talks to the billing real-time API, querying for the status of the calling user. If the user has neglected to pay his bills or the user has been forcibly disabled, the call will be dismissed.

3. The server then talks to the billing real-time API querying for the cost of a two legged call, between originator and destination. In the special case of a conference call, it will query the price for each leg of the conference call, retrieving both the setup fee, and per minute cost.

4. The API server then connects to the YaaZZ version of the Asterisk PABX (the YaaZZ PABX Server) using the Asterisk Manager API, to establish a call to originator (calling from number) and destination (calling to number). The PABX Server performs a call back to the "from-number," and when this call is answered, the PABX Server will start calling the to-number. In this way, customers pay YaaZZ price on the call (each leg being initiated by the PABX Server) instead of the calling price of the customer's current mobile subscription (which may include high priced roaming charges).

5. The YaaZZ PABX Server will perform preliminary CDR alterations to identify the current user, and will save the current call pricing information.

6. The YaaZZ PBX Server will connect to the telecomm carrier (e.g., TATA), for example, via SIP. The carrier will then interconnect the calls over the standard telecommunications network, such as PSTN, GSM, CDMA, etc.

7. When the call is ended either manually by the user, or by the timeout, the YaaZZ PABX Server will save the billing time, save the call's total cost to the CDR, and mark the call as ended.

Figure 10:
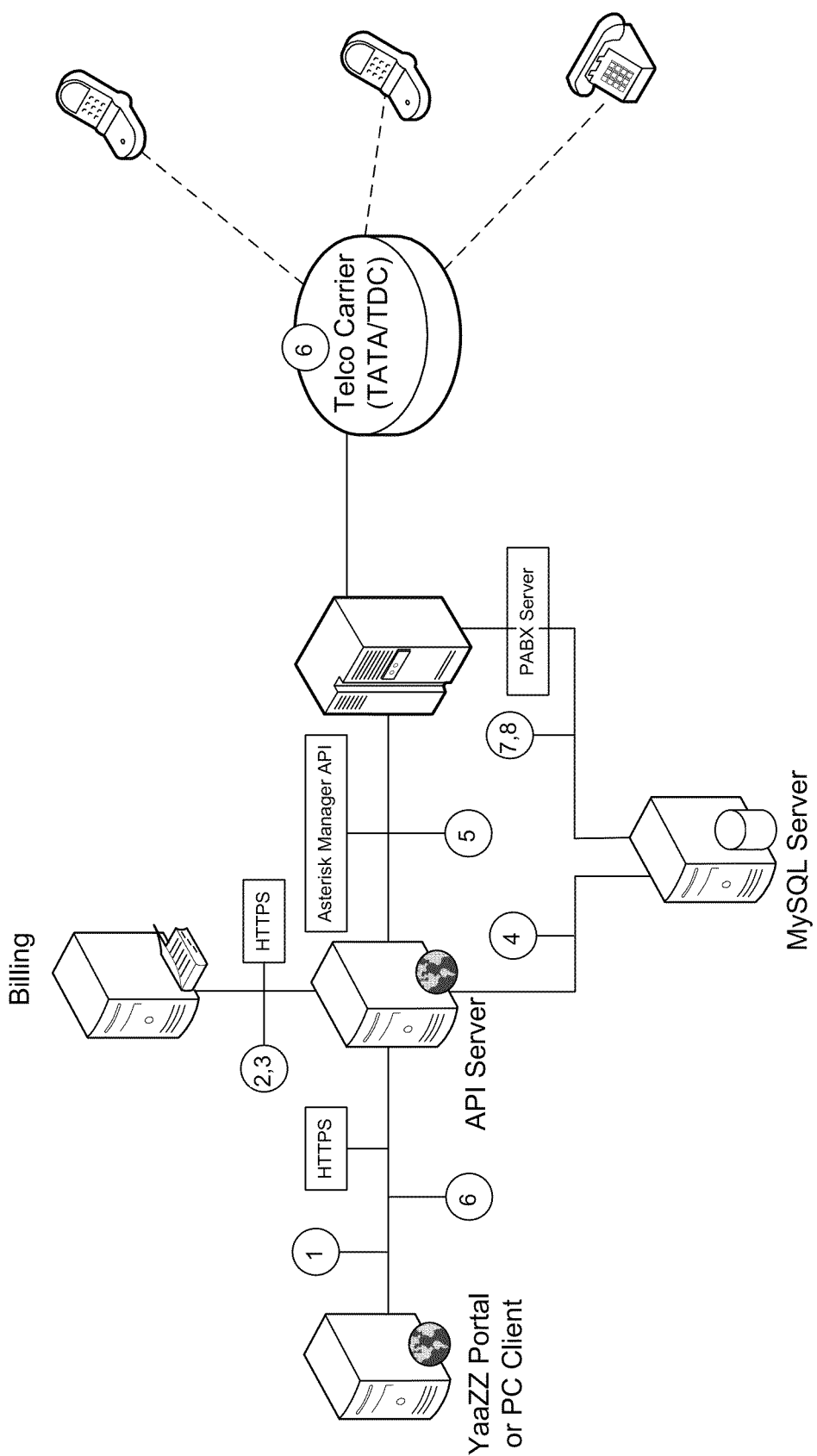
FIG. 10 is an example flow that illustrates further details of the YaaZZ ETS components used for the design of telephony applications in a prepaid scenario.
Figure 11A:
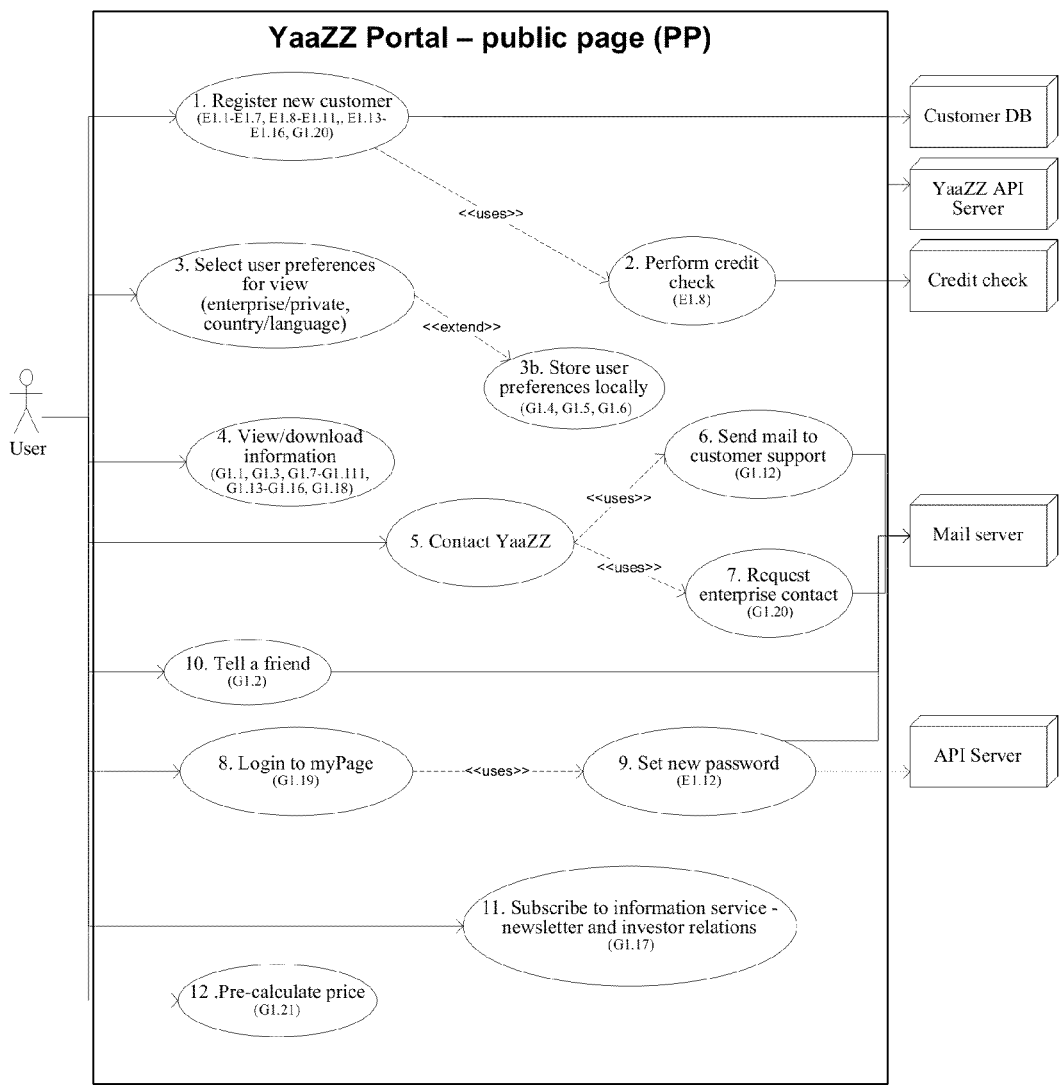
FIGS. 11A-D are example use case models for various telephony functions provided by a YaaZZ ETS Portal.
Figure 11B:
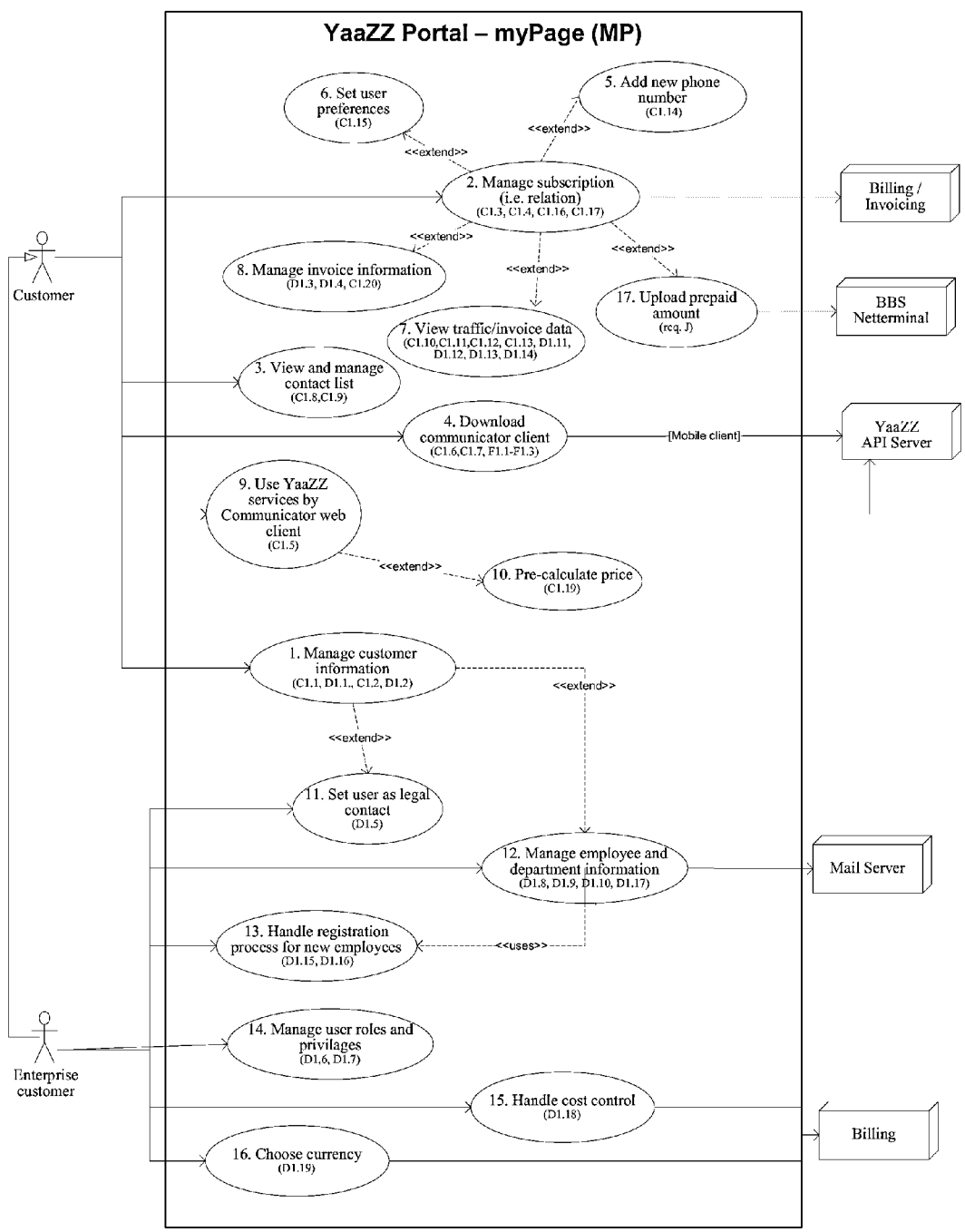
Figure 11C:
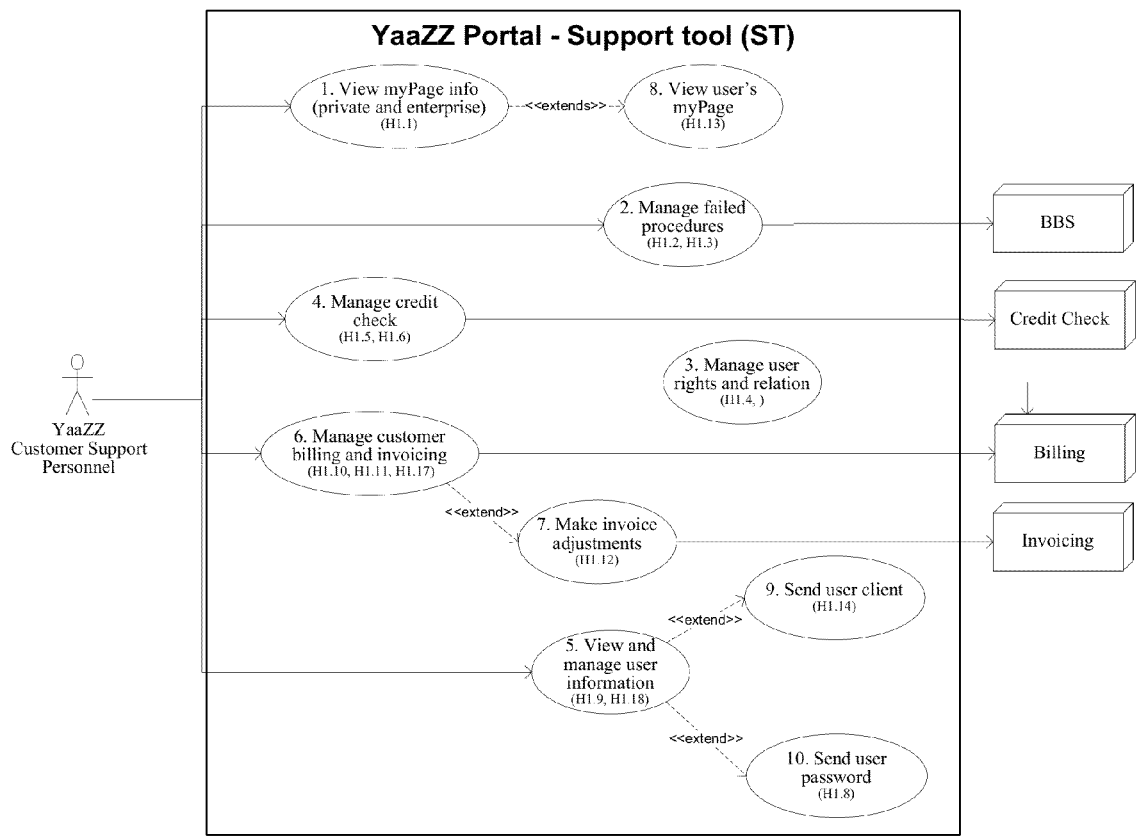
Figure 11D:
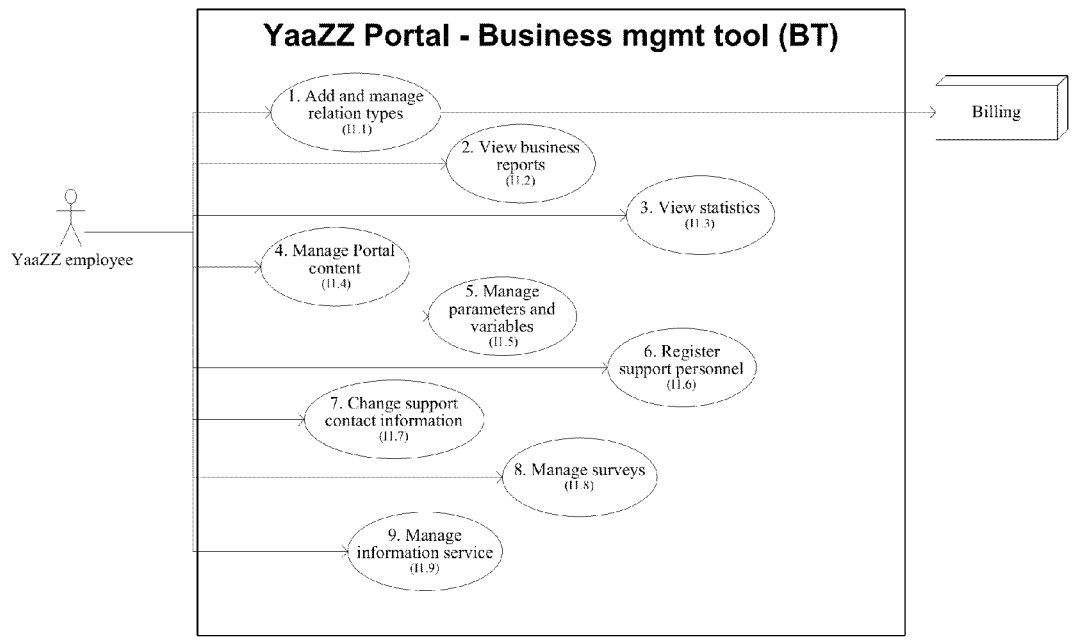

FIG. 10 is an example flow that illustrates further details of the YaaZZ ETS components used for the design of telephony applications in a prepaid scenario. Again, the number of physical servers may differ when expanding to support a larger user base. The actions are labeled from 1 to 8 in FIG. 10 and are described as follows:

1. When setting up a call, the user first originates the call using one of the three main YaaZZ Communicators; Mobile client, PC client or Web client. All three versions of the YaaZZ Communicator use of Internet as medium for establishing a call. All communication against the API server are typically through HTTPS.

2. The server then talks to the billing real-time API, querying for the status of the calling user. If the user has been forcibly deactivated, the call will be dismissed.

3. The server then talks to the billing real-time API querying for the cost of a two legged call, between originator and destination. In the special case of a conference call, it will query the price for each leg of the conference call, retrieving both the setup fee, and per minute cost.

4. The API server then connects to the MySQL server (or whatever server or service is used to manage user/account data, retrieving the balance of the user from the user-balance database). At this time, the amount of available call minutes is calculated, and the call is dismissed unless the amount of available minutes exceeds a lower limit.

5. The API server then connects to the YaaZZ version of the Asterisk PABX (the YaaZZ PABX Server) using the Asterisk Manager API, to establish a call to originator and destination. The PABX Server performs a call back to the "from-number," and when this call is answered, the PABX Server will start calling the to-number. In this way, customers pay YaaZZ price on the call (each leg being initiated by the PABX Server) instead of the calling price of the customer's current mobile subscription (which may include high priced roaming charges). The YaaZZ PABX Server will perform preliminary CDR alterations to identify the current user, and will save the current call pricing information.

6. The YaaZZ PBX Server will connect to the telecomm carrier (e.g., TATA), for example, via SIP. The carrier will then interconnect the calls over the standard telecommunications network, such as PSTN, GSM, CDMA, etc.

7. A background process in the YaaZZ PABX Server will monitor all ongoing calls, recognizing simultaneous calls from the same user. Using the pricing information saved in the currently live CDR, the process combines the cost and compares the current cost of all the user's current calls against the user's current balance. The user balance is fetched with MySQL and cached with Memcached. The result of the determination will define the maximum duration of the calls. When only 2 minute is left, in one embodiment an audible tone will be played every $10^{th}$ second. When there are 5 seconds left, a 5 second long recorded message will play back before disconnecting the call. This message is meant to tell the user why the message is being disconnected, and will be played in the user's own registered language.

8. When the call is ended either manually by the user, or by the timeout; the YaaZZ PABX Server will save the billing time, save the call's total cost to the CDR, and mark the call as ended, and will also update the user's balance with the withdrawal of the total cost.

Example Computing Environment

Figure 14:
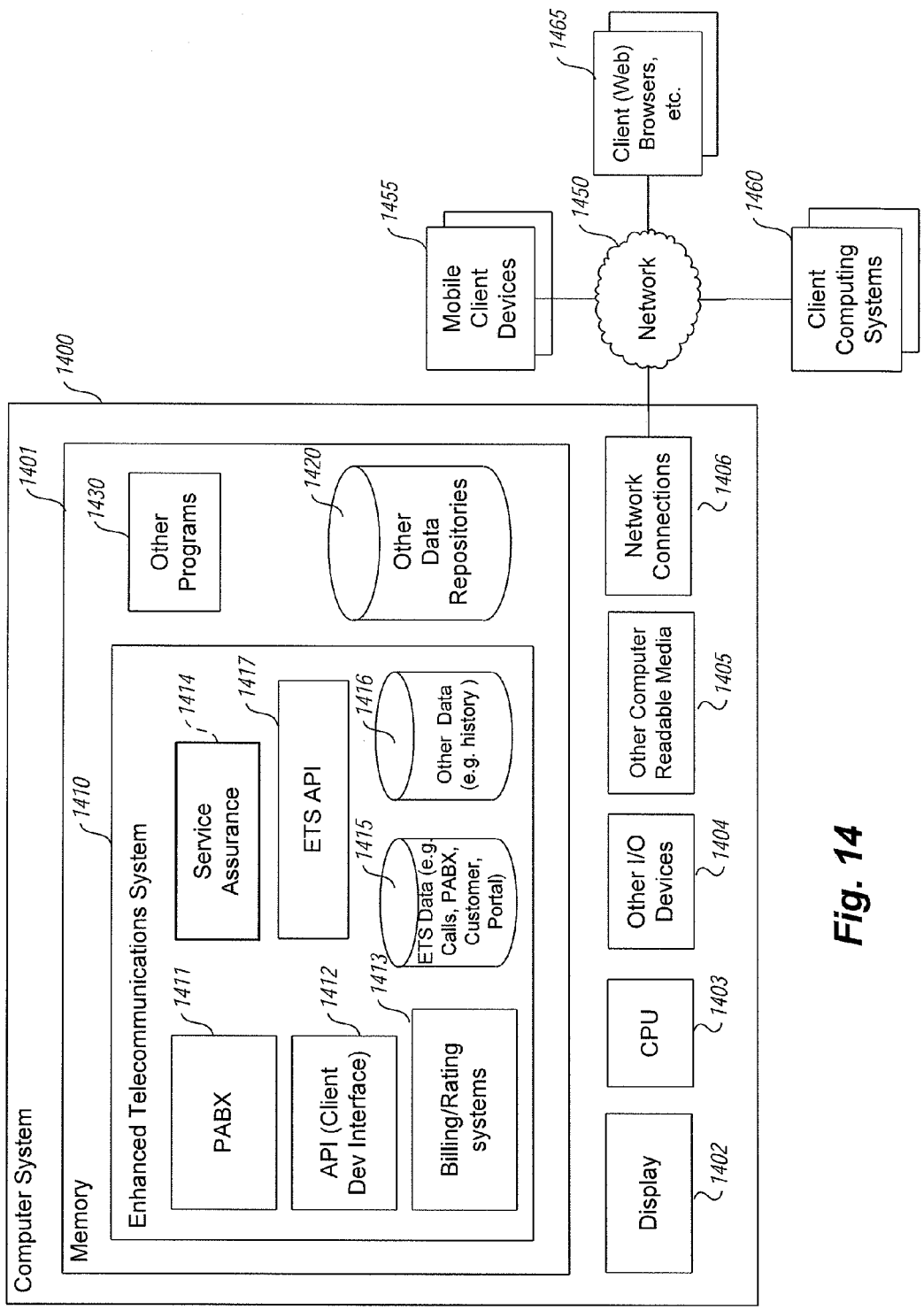
FIG. 14 is an example block diagram of an example computing system that may be used to practice embodiments of the Enhanced Telecommunications System described herein.

FIG. 14 is an example block diagram of an example computing system that may be used to practice embodiments of the Enhanced Telecommunications System described herein. Note that a general purpose or a special purpose computing system suitable instructed may be used to implement an ETS. Further, the ETS may be implemented in software, hardware, firmware, or in some combination to achieve the capabilities described herein.

The computing system 1400 may comprise one or more server and/or client computing systems and may span distributed locations. In addition, each block shown may represent one or more such blocks as appropriate to a specific embodiment or may be combined with other blocks. Moreover, the various blocks of the ETS 1410 may physically reside on one or more machines, which use standard (e.g., TCP/IP) or proprietary inter-process communication mechanisms to communicate with each other.

In the embodiment shown, computer system 1400 comprises a computer memory ("memory") 1401, a display 1402, one or more Central Processing Units ("CPU") 1403, Input/Output devices 1404 (e.g., keyboard, mouse, CRT or LCD display, etc.), other computer-readable media 1405, and one or more network connections 1406. The ETS 1410 is shown residing in memory 1401. In other embodiments, some portion of the contents, some of, or all of the components of the ETS 1410 may be stored on the other computer-readable media 1405 and in some embodiments, transmitted over the other computer-readable media Y05. The components of the Enhanced Telecommunications System 1410 preferably execute on one or more CPUs 1403 and manage the telecommunications services as described herein. Other code or programs 1430 and potentially other data repositories, such as data repository 1406, also reside in the memory 1410, and preferably execute on one or more CPUs 1403. Of note, one or more of the components in FIG. 14 may not be present in any specific implementation. For example, some embodiments embedded in other software many not provide means for user input or display.

In a typical embodiment, the ETS 1410 includes one or more PABX Servers 1411, one or more API Servers 1412, one or more billing/rating engines 1413 and one or more quality assurance components 1414. In at least some embodiments, the billing/rating engine 1413 is provided external to the ETS and is available, potentially, over one or more networks 1450. Other and/or different modules may be implemented. In addition, the ETS may interact via a network 1450 with mobile application or client code 1455, one or more client computing systems 1460, and/or one or more network client code such as one or more web browsers 1465. Also, the ETS data repository 1415 may be provided external to the ETS as well, for example in a accessible over one or more networks 1450.

In an example embodiment, components/modules of the ETS 1410 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an ETS implementation. Also, other steps could be implemented for each flow (use case), and in different orders, and in different routines, yet still achieve the functions of the ETS.

In addition, programming interfaces to the data stored as part of the ETS 1410 (e.g., in the data repositories 1415 and 1416) can be available by standard means such as through C, C++, C#, and Java APIs, such as application programming interface (API) 1417; libraries for accessing files, databases, or other data repositories; through scripting languages such as XML; or through Web servers, FTP servers, or other types of servers providing access to stored data. The data repositories 1415 and 1416 may be implemented as one or more database systems, file systems, or any other method known in the art for storing such information, or any combination of the above, including implementation using distributed computing techniques. In addition, they may be implemented as stored procedures, or methods attached to "objects," although other techniques are equally effective.

Also the example ETS 1410 may be implemented in a distributed environment comprising multiple, even heterogeneous, computer systems and networks. For example, in one embodiment, the PABX servers 1411, the API servers 1412, and the ETS data repository 1415 are all located in physically different computer systems. In another embodiment, various modules of the ETS 1410 are hosted each on a separate server machine and may be remotely located from the tables which are stored in the data repositories 1415 and 1416. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, HTTPS, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of an ETS.

Furthermore, in some embodiments, some or all of the components of the ETS may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection, including wireless-based and wired/cable-based mediums. Some or all of the system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

ETS SMS Gateway

In one embodiment, SMS Gateway services are delivered to YaaZZ by Ericsson, although other providers could be used. Ericsson has SMS Gateways and interconnection in 90% of the world. YaaZZ is able to change CallerID on the SMS to the originating user in all countries except the USA.

In one embodiment, to deliver the Mobile Java client to the J2ME enabled mobiles, the YaaZZ system uses WAP Push messages through Ericsson's Gateway, although these messages could be distributed via alternative means. This simplifies the installation process of the Java client for the user.

Upon initialization of a call, a rating engine will be queried for the price of the call. This price is calculated by looking up both the caller's subscription type and the caller's geographical location. This means that a big company having a lot of subscriptions (physical users), will receive different pricing for their employees, according to what country code their subscriptions adhere to.

After rating, the rebate system will go through each known rebate function to figure out if the user making a call, or sending an SMS, is entitled to rebate. It will traverse through all the rebate possibilities, sum up the total rebate percent level, and compare it to a maximum rebate level, currently 40%.

Figure 15:
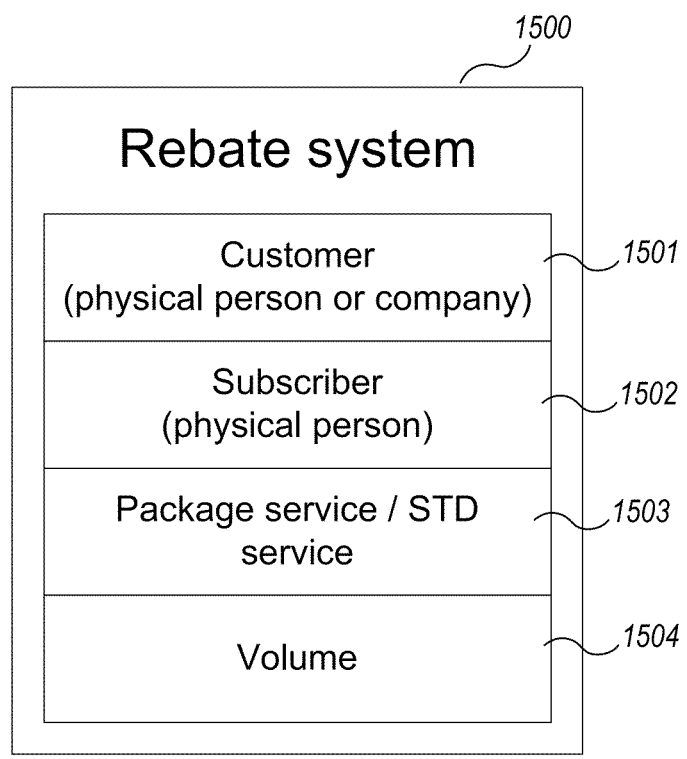
FIG. 15 is an example block diagram of the levels of rebate-customization available in one embodiment.

FIG. 15 is an example block diagram of the levels of rebate-customization available in one embodiment. This can be on a customer level 1501, which will give a whole company rebates on their geographical prices, meaning that all their employees will receive this rebate. If on a subscriber level 1502, the rebate will only affect the physical person who owns a YaaZZ communicator. At the package level 1503, the physical person can also get different rebates according to which service he or she is using, for example SMS, Conference calls, regular calls, or even Voice over IP. Rebates may also be allocated on a volume basis 1504.

Balance information can be stored in the master user balance database, for example, in MySQL. The total balance available can be incremented using a credit card in the YaaZZ Portal. In one embodiment, this functionality is implemented using BBS Netterminal. Each subscriber's balance is automatically decremented at the same moment that the corresponding CDR is being created for an ended call.

ETS Portal

Figure 16:
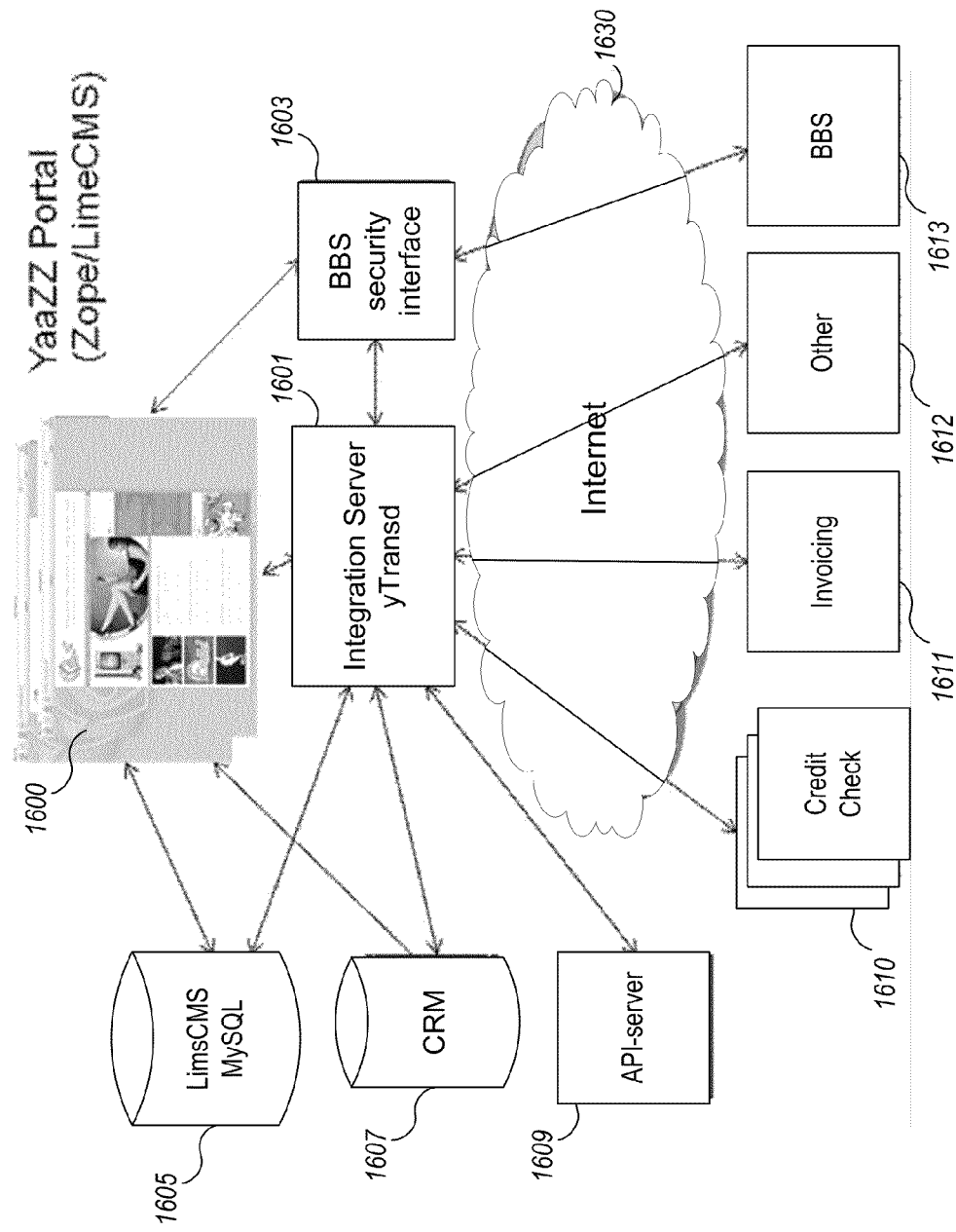
FIG. 16 is an example block diagram of the different components of the ETS system used to implement an example YaaZZ ETS Portal.

FIG. 16 is an example block diagram of the different components of the ETS system used to implement an example YaaZZ ETS Portal. In one embodiment, all internet traffic is encrypted. As shown, almost all information exchange goes via the yTransd 1601, the YaaZZ transaction daemon. The yTransd 1601 is responsible for maintaining the integrity of each transaction performed via the portal 1600.

In one embodiment, the portal system consists of the Zope web server 1600 for presenting dynamic content for rendering web pages, with a content management system (CMS) called LimeCMS developed by Innoventure Net Solutions. The system is programmed in Python. In front there is a web server apache2 and a caching system. There is a back-end transaction daemon (yTransd, the "YaaZZ Transaction Daemon" 1601) that handles transaction and integration between the portal and other systems. The integration server is a Linux server that basically runs a daemon process. All exchange of information is stored as transactions with unique transaction IDs. There are several tables in the database for handling this functionality. They keep information about the transaction, versions of the data for each transaction, logging of history and error messages in several languages, etc. Both LimeCMS and yTransd share the same MySQL database 1405.

Figure 17:
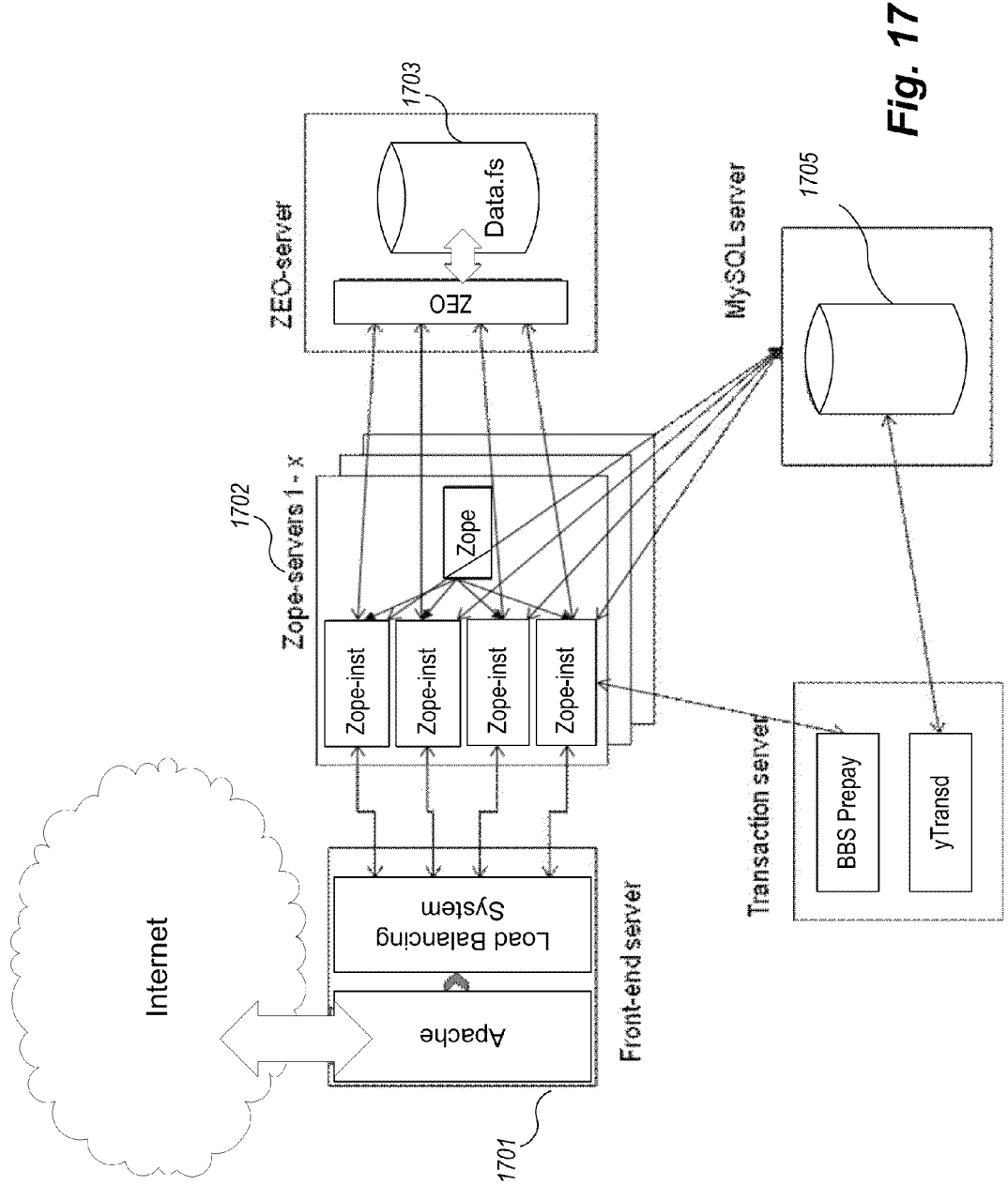
FIG. 17 is an example block diagram of a systems architecture of an example embodiment of the Enhanced Telecommunications System configured to maintain high performance.

FIG. 17 is an example block diagram of a systems architecture of an example embodiment of the Enhanced Telecommunications System configured to maintain high performance. In front, there is a cache and load-balancing system 1701. This system automatically and evenly distributes the load to a Zope server instance 1702 with least load. In this example there is one zope-instance for each CPU-kernel on the server. The number of servers can be expanded as needed. Initially, each instance can handle 8 parallel threads. All Zope-instances share the same installed components within one physical server. They also share one zope-database called data.fs 1703 where the content is stored.

yTransd Transaction Server

The yTransd (YaaZZ transaction daemon) 1601 handles the communication between the ETS Portal and other surrounding systems/components. All actions are logged into the operating system (OS) logging system, including log rotation, which is handled by the OS. The daemon starts automatically when the transaction server starts. All transactions are also archived, and there is a transaction log in the database to provide data for support. yTransd uses SIP to communicate with other components; however, other protocols could be used.

A transaction is stored into two tables in the database (e.g., the mySQL database 1605 and 1705 shown in FIGS. 16 and 17, respectively). One table contains the transaction number and status, the other table contains the transaction data. In most cases the transaction data is stored in 2 rows. One row contains the transmitted data and one for the received data.

Table 1 below shows several examples of the different transactions which may be logged. It is not intended to be a complete list, but rather exemplary.

TABLE 1

| Transaction name | Init from | API |
| --- | --- | --- |
| GenerateClient | yTrans/Portal | YaaZZ |
| addSIPUser | yTrans | YaaZZ |
| callNumber | Portal | YaaZZ |
| changeSIPUser | Portal | YaaZZ |
| deleteSIPUser | Portal | YaaZZ |
| NewCust | Portal | CMS |
| sendSMS | Portal | YaaZZ |

TABLE 1-continued

| Transaction name | Init from | API |
|---|---|---|
| CreditCheck | yTrans | Credit |
| NewSubscr | yTrans | CMS |
| ChangeSubscr | Portal | CMS |
| ChangeCust | Portal | CMS |
| GetCustData | Portal | CMS |
| GetSubscrData | Portal | CMS |
| GetInvoiceData | Portal | Invoice |
| GetInvoiceDetailsData | Portal | Invoice |

A transaction is inserted into the transaction tables either by the Portal or generated from information in the mySQL database from the yTransd as a result of previous transactions. yTransd will handle the transaction according to a transaction status flag.

The following table explains example status codes used in the transaction status flag. The state-column indicates the lifespan of the status.

"Final" is a finished and permanent state.

"Temp" is temporary in nature, and means that yTransd will handle it immediately.

"Action" will need attention by user or operator and will always lead to a "Temp" state.

TABLE 2

| Status | Name | State | Set by | Description |
|---|---|---|---|---|
| 0 | Finished | Final | yTransd | The requested operation was completed successfully. |
| 1 | New | Initial | Portal/ yTransd | Initial value for all transactions. Set when the transaction is initiated by the end user. |
| 2 | Error | Action | yTransd | An error occurred, indicating that the transaction could not be performed. It will have to be handled by the customer or an operator. An error message ID is set in the transaction table. |
| 3 | Cancelled | Final | Portal/ yTransd | This is the final state for transactions that have been cancelled by either the customer or an operator. |
| 4 | Cancelled by user | Temp | Portal | The transaction has been cancelled by the customer. yTransd will read this transaction, perform necessary operations in other systems, and then set the status to Cancelled. |
| 5 | Resubmit | Temp | Portal | When a transaction has failed, the customer or the operator can change the transaction data and resubmit the transaction if it is allowed by the error message. yTransd will then try to perform the operation once more. It can then end as Finished or Error. |
| 6 | external | Temp | yTransd | Transactions with this status are finished by an external system. It is not used at this stage. |
| 7 | | Action | Portal/ yTransd | This stage handles transactions that fail in a manner that is not resolvable. The cause is events that is not defined in the code, and has to be solved by a programmer. |

Figure 18:
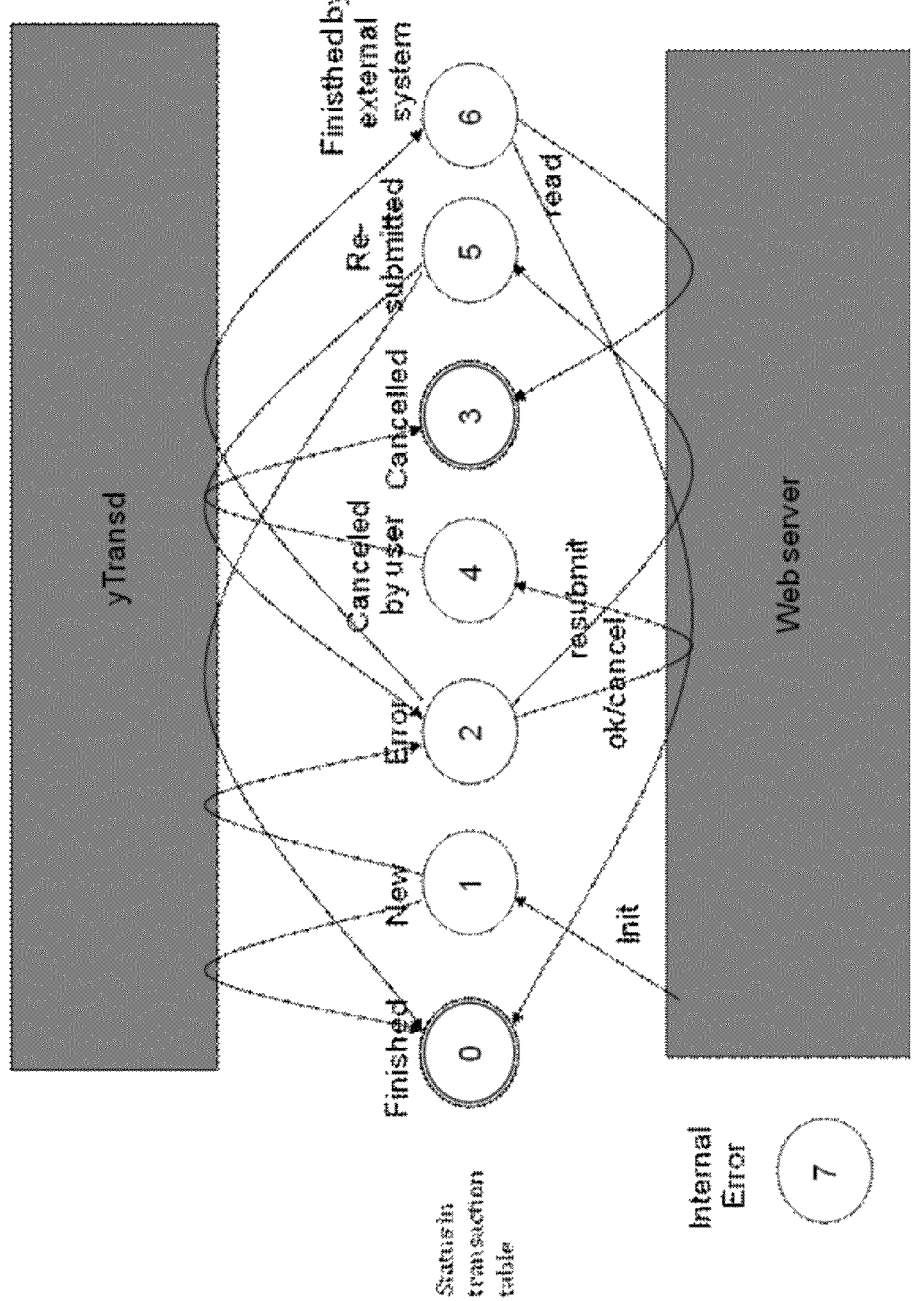
FIG. 18 is a chart showing how different transaction statuses are handled in an example embodiment of a transaction daemon in an Enhanced Telecommunications System.

FIG. 18 is a chart showing how different transaction statuses are handled in an example embodiment of a transaction daemon in an Enhanced Telecommunications System. A transaction starts with the status 1 (New). It will then be handled by the yTransd that will handle the request, and depending on the outcome, will set the status to either 0 (Finished) or 2 (Error). If the status is an error, an error message ID is set for the transaction, and a user or operator will need to handle the situation. For example, this may be done via an OK/Cancel button that leads to status 4 (canceled by user), or a change in the transaction data, in which case the status is set to 5, and resubmitted. The arrows in the chart specify which statuses each operation can lead to.

Each time a transaction is resubmitted a new row is inserted into a transaction data table (stored, for example, in the MySQL database). The original transaction data will be kept for logging, support, debugging and error handling purposes. For each version of transaction data will have a version number. There is also a unique transaction number for each API type.

There is a chance that any transaction will fail due to the complex nature of this system. Each event that can lead to an error has an error code. This error code is set into the transaction table whenever an error occurs. Both the Portal and yTransd will handle the situation based upon the properties of each error code. All error codes are defined in a table in the database. This table contains all message texts for all languages. It also contains information of how the message can be handled by a user and by the yTransd. When an error occurs the portal displays an error message and a set of buttons. This is done by setting an error level for the error message.

In one embodiment, there are 6 different error levels. The status column in Table 3 shows the transaction status for each the error operation.

TABLE 3

| Level | Description | Buttons | Status | Explanation |
|---|---|---|---|---|
| 0 | | | 0 | Everything OK, no message to user. |
| 1 | Info | OK | 0 | For messages where user can not interact. |
| 2 | Check | OK, Cancel, Edit | 0, 4, 5 | When user has to accept, change data or cancel the request. |
| 3 | Correct | Cancel, Edit | 4, 5 | When the system does not accept the transaction, but it is of a nature where it can be edited. |
| 4 | Cancel | Cancel | 4 | When a transaction can only be canceled |
| 5 | Internal error | OK | 7 | When a (temporary) error occurs and the system is not able to handle the transaction. |

Integration and User Requests

The YaaZZ portal is heavily integrated with other systems. This is supported by the transaction daemon yTransd. When a customer wants to perform a task, like sending an SMS message, the portal writes a transaction to the MySQL database. Then the yTransd reads the transaction from the database and connects to the SMS Gateway API. When the transaction is finished, the yTransd writes a status code back to the transaction, and where applicable, the answer for the request. The portal then polls the transaction (for example, using a java script) to wait for the status. If a transaction fails, an error message will be presented to the customer.

User Registration

Since there is an exchange of personal information at the front page and most sub-pages, communication for the whole site is preferably encrypted (https). In a current embodiment, a user needs to register to fulfill some requirements. Other requirements may be added or some requirements subtracted.

1. The customer must pass a credit check.
2. The email-address can't be duplicate.
3. The phone number can't be duplicate.
4. The phone number has to belong to the country/language from the URL. For example, a user can only register a Norwegian phone number on Yaazz.no and can only register Swedish phones from YaaZZ.se. The credit check from yaazz.no will be performed in Norway.

In a current embodiment, there are two usernames, one login name and one system username. The system username consists of 8 numbers or letters randomly generated. The system username is related to a login name. The login name can be changed, and is initially the same as the email-address. In some embodiments, the passwords are stored encrypted. If the password is forgotten, a new password is generated and sent to the customer via SMS or email.

Client Downloads

In one embodiment, for private customers, a mobile client (code) is sent by SMS automatically during registration. For corporate customers it is sent manually or in batches by the corporate manager/administrator. The customer can also request a new mobile client by SMS (when logged in to the portal). A new mobile client is generated and sent by SMS. The download link for the client sent by SMS, can only be used once. The SMS sent is as a SMS PUSH message. When the mobile client is downloaded, the mobile phone make and model is stored for statistical purposes.

The PC client is generated with all of the necessary settings each time it is downloaded. Where it is not possible to detect the OS (Mac, linux, Windows), and where it is necessary to make a choice of OS version, the YaaZZ portal will prompt for the correct client to download. There are no limitations on how many PC clients that can be downloaded to ensure the availability of YaaZZ.

Prepaid Payments

In one embodiment, the YaaZZ prepaid solution consists of services provided by BBS. It consists of programs installed on local server provided by BBS and an API to the BBS Netterminal (net terminal). After installation, a security certificate is generated to ensure that payments only can come from the predefined server.

There are two ways of including Netterminal, either using a standard layout or a custom screen. The standard layout is in the English or Norwegian language only, but does not require a user to store credit card information. The custom screen makes it possible to provide a customer's information in any language, but then the credit card information must be handled locally. The service provides a 3D secure mechanism where available.

In one embodiment, predefined specific subscriptions are available for prepaid customers. All customers' balances are stored in a separate accounting database. When a user logs in to the YaaZZ Portal, the remaining balance for the user's subscription will be shown (for example, at the right menu between the Logout button and the rest of the menu). The currency of the amount displayed is the currency connected to the language of the site.

VAT (taxes) is not part of the portal, and will be handled in the rating/billing system.

Figure 19:
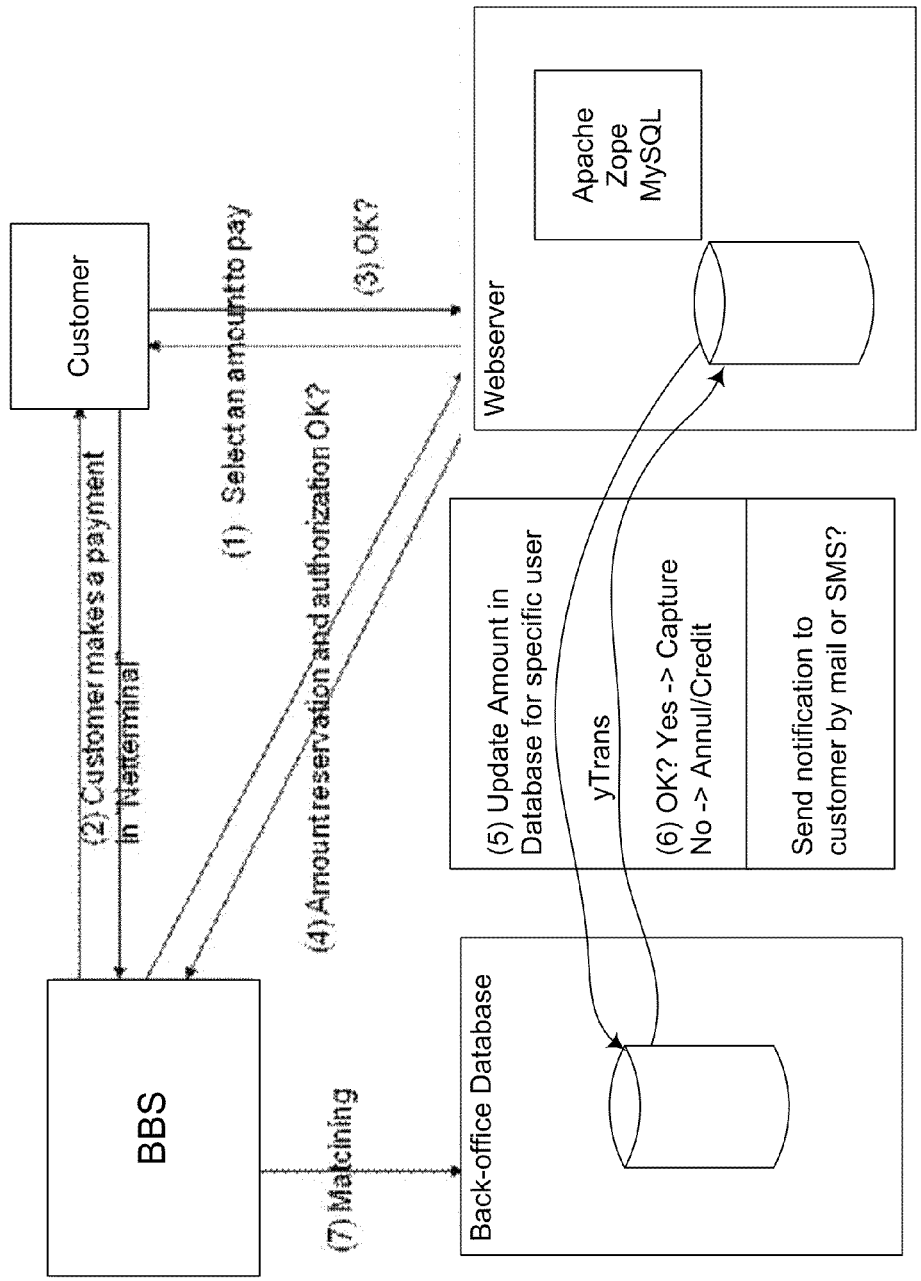
FIG. 19 is a block diagram of an overview of the steps involved in a customer payment to the customer's YaaZZ ETS account.

FIG. 19 is a block diagram of an overview of the steps involved in a customer payment to the customer's YaaZZ ETS account. The steps are as follows:

1. The customer chooses an amount to fill (limited by min, max and total max set by variables). The portal creates an internal transaction and provides a reference number and a transaction ID.
2. Customer enters bank card information in the Netterminal.
3. Customer press OK and is redirected back to the portal. If the transaction is canceled or fails, the transaction is aborted.
4. If OK, the card information is authorized and the amount is now reserved on the customer's account. If it fails, the transaction is aborted.
5. yTransd updates the amount on the customer's account in the back office. If the transaction fail, the transaction is rolled back and the reservation cancelled.
6. The reserved amount is now captured at BBS. If it fails, all related transactions are rolled back, including the amount in the back office.
7. The customer is informed of successful payment.

In case of failure at any stage in this process, all transactions will be rolled back. All steps in a transaction are logged. If the system by any chance should fail to roll back, the support/administration system may be used to rectify the error. All transactions are searchable by a standard customer search in the support system, but also by reference number. A list of all transactions is also provided, filtered by country and time span.

The support/administration system also provides the ability to credit the total amount or parts of the amount paid within a transaction (by reference number). This can only be paid back to the originated account. This can't be misused by support personnel as only BBS has the reference to the account number.

In some embodiments, when the customer is terminating the subscription, the customer balance is checked, and an automatic refund is executed. This is a system setting for each country number prefix and may be changed at any time.

This same functionality may be used to pay invoices for post-pay customers.

Scalability and Performance

The PABX platform can be scaled by physically adding more PABX servers to the server farm. The API servers can then be configured to make use of the newly added PABX servers by specifying whether a new PABX server should be a conference server, or a regular PABX server. This is a seamless update, where the load balancer reads the configuration data from disk for each request. In one embodiment, this information is cached by the operating system's file cache.

The Web- and API Server platform can be scaled by physically adding more web servers to the server farm, and then updating the load balancer with new configuration on-the-fly. Other components may be scaled in similar manners.

API Server

This section describes an example embodiment of the YaaZZ internal API Server, used by the various YaaZZ clients to interoperate with the PABX servers with customer-authentication.

The YaaZZ internal API server interconnects the externally developed components with the internal components, using several internally developed APIs. Internal components controlled by these APIs are call, call from, conference, SMS and load balancing.

Figures 20, 21:
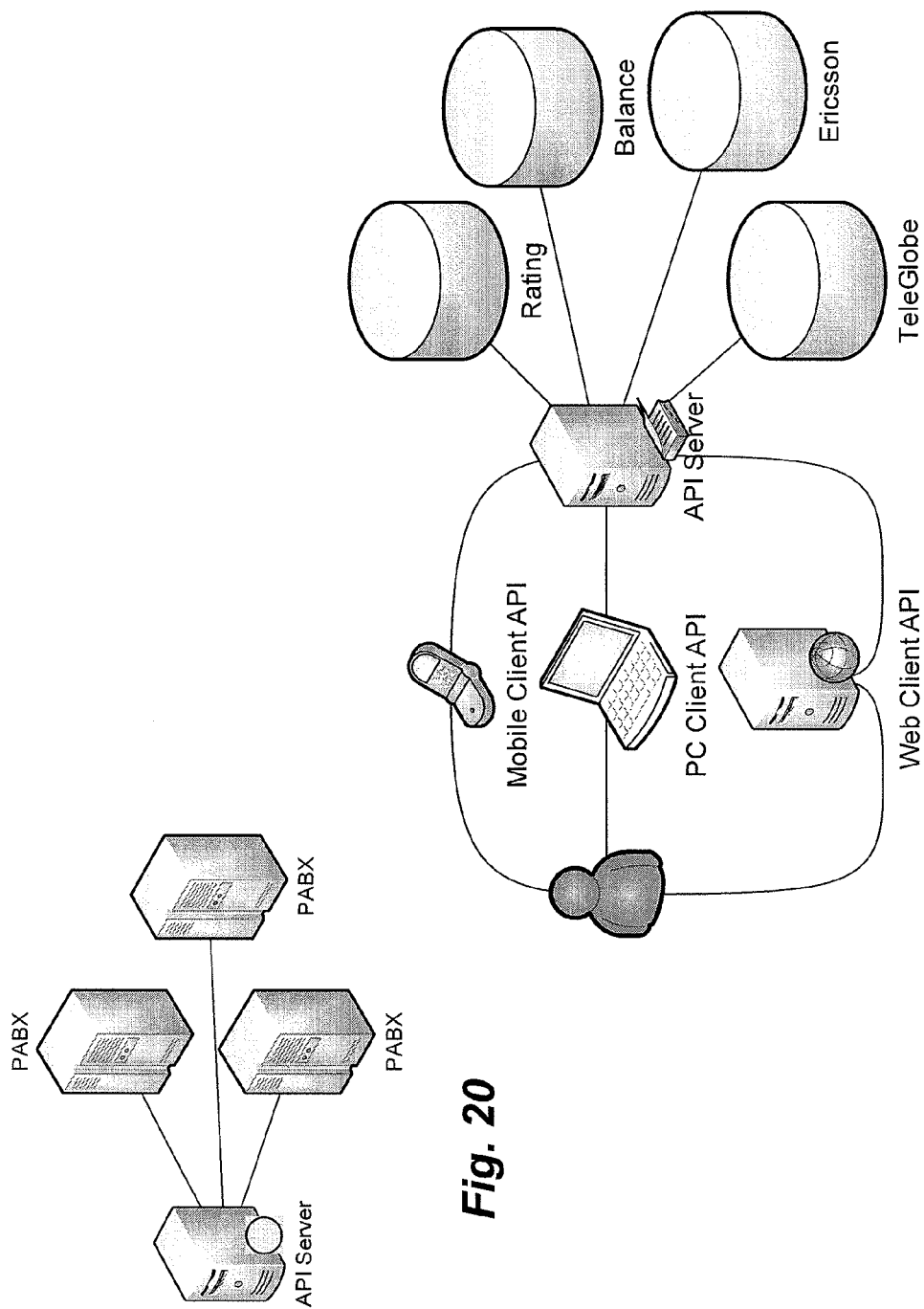
FIG. 20 is an example block diagram of an example API server connected to one or more PABX server computing systems to allow for load balancing.
FIG. 21 is an example block diagram of the different application programming interfaces of an Enhanced Telecommunications System used to communicate with the various external systems.

Whenever a regular or conference call is made, the YaaZZ API server (the API server) will balance the usage of each available PABX server. It will also choose which PABX to use based upon whether it is a regular call or a conference call. FIG. 20 is an example block diagram of an example API server connected to one or more PABX server computing systems to allow for load balancing.

FIG. 21 is an example block diagram of the different application programming interfaces of an Enhanced Telecommunications System used to communicate with the various external systems. The API server hosts 3 main Application Programming Interfaces (APIs): the Mobile Client API 1901, the PC Client API 1902, and the Web Client API 1903.

The API Server implements the following functions/functionality, available potentially on all YaaZZ clients:

callNumber, which allows a user to call a designated number startConferenceCall, which allows a user to call 1 or more parties in a conference call simply by specifying the 1 or more phone numbers. An example embodiment currently supports up to a maximum of 20 callers getConferenceStatus, which retrieves information about a conference call.

The status of each conference participant can be obtained, such as who is talking, who is muted, who has comments, etc.

muteConferenceUser, which allows the initiator of the conference call to mute a selected participant in the call kickConferenceUser, which allows the initiator of the conference to terminate another user's participation in the conference call addConferenceUser, which allows the initiator of the conference to add another participant to the conference call at any time, including after the conference has already been initiated or is in progress stopConferenceCall, which terminates the entire conference call sendSMS, which allows a user to send a quick message to another user via SMS protocol Of course, other functions may be made available as part of one or more of the API in the future. Although each function is not implemented in the initial release of each client API of the example embodiment of the YaaZZ product, it is contemplated that all three clients will offer all of the functionality in a similar fashion.

The PC (&MAC) client API uses HTTPS with a fixed YaaZZ certificate. This means that the client will only operate if both the server and the client have the right certificates. Authentication is by userID, passcode and obfuscation. The mobile client API uses HTTPS. The authentication is by userID, passcode and obfuscation. The Web Client API uses HTTPS with a fixed YaaZZ certificate. This means that the client will only operate if both the server and the client have the right certificates. Authentication is by userID, passcode and obfuscation.

The billing callback API (setSubscriptionStatus) will be used to update the status of the customer in the user database. This API is used by a billing system.

In an example embodiment, the API server is written in the scripting language PHP. The total platform used consists of Linux, Apache and PHP 5. Each API server can run on its own, and multiple API servers can be run in parallel to provide redundancy. The different YaaZZ Communicator clients connect to a cluster of API servers, and by means of load balancing on a number of active API servers, redundancy is achieved. Other methods for creating redundant capabilities are supported.

PABX Server

The PABX Server uses Open Source code—Asterisk—to implement its functionality. This section discusses the capabilities of Asterisk that are incorporated and the changes made thereto.

Asterisk is an Open Source hybrid TDM (time division multiplexing) and packet voice PABX (telephone exchange) and IVR (interactive voice recognition) platform with ACD functionality. Its name comes from the asterisk symbol, *, which in UNIX (including Linux) and DOS environments represents a wildcard, matching any filename. Similarly, the Asterisk PABX is designed to interface any piece of telephony hardware or software with any telephony application, seamlessly and consistently.

Traditionally, telephony products are designed to meet a specific technical need in a network. However, many applications of using telephony share a great deal of technology. Asterisk takes advantage of this synergy to create a single environment that can be molded to fit any particular application, or collection of applications, as the user sees fit. Asterisk is licensed and distributed under the GNU General Public License (GPL). Asterisk is designed to allow new interfaces and technologies to be added easily.

Asterisk Modules Deployed

Figure 22:
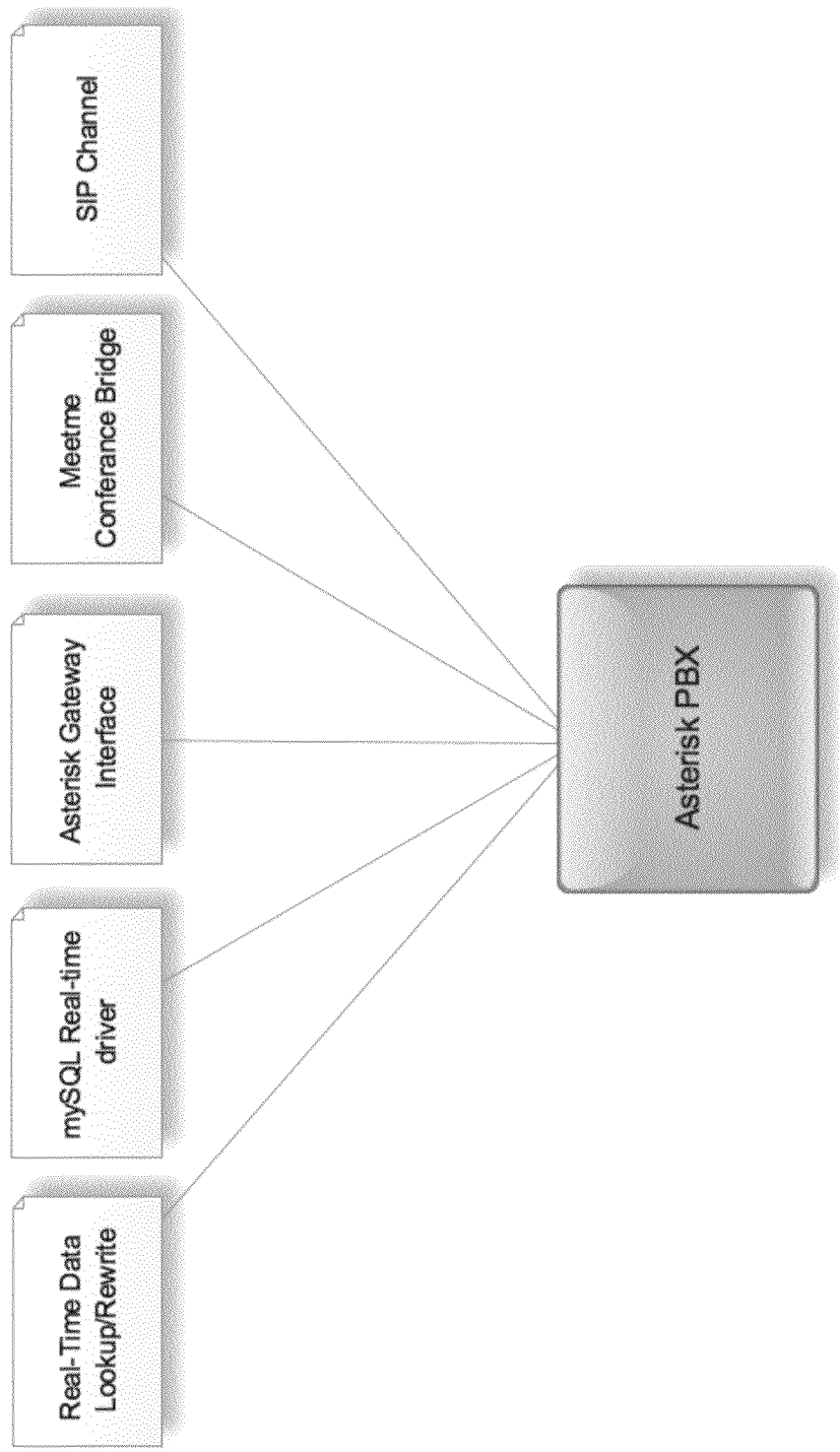
FIG. 22 is an example block diagram of the modules of an Asterisk PABX deployed in an example Enhanced Telecommunications System embodiment.

FIG. 22 is an example block diagram of the modules of an Asterisk PABX deployed in an example Enhanced Telecommunications System embodiment. The following describes modules that are specifically activated in the deployed Asterisk configuration in order to obtain required functionality in the PABX Server for use with example embodiments of the YaaZZ system.

a Real-time Data lookup/rewrite (app_realtime.so)

Asterisk Real Time allows storage of users/peers and other configuration data in database such as MySQL. This way, there is no need to perform manual configuration reload for the modified entries to take effect. With the introduction of Asterisk Real Time it is possible to add/remove users or make call flow changes by entering data into appropriate database table(s). Once configured, the Asterisk Real Time engine will perform database lookup(s) on a per call basis allowing for run time configuration changes.

MySQL Real-time Configuration driver (app_mysql.so)

Asterisk generates a CDR (Call Detail Record) for each call. By default, records are stored in a comma-separated value file created in /var/log/asterisk/cdr-csv. With use of the cdr_addon_mysql, the CDRs are stored in a mySQL-database.

Meetme conference bridge (app_meetme.so)

The Asterisk system features simple conferencing functionality. This enables multiple callers to attend a phone conference and converse with all other callers in the conference. The Asterisk simple conference functionality allows users to increase/decrease their speaking volume and listening volume (independently of each other and other users).

Asterisk Gateway Interface (agi_res.so)

The Asterisk Gateway Interface is an interface for adding functionality to Asterisk using many different programming languages. Perl, PHP, C, Pascal, Bourne Shell.

SIP Channel Module (chan_sip.so)

The SIP channel module enables Asterisk to communicate via VoIP (Voice Over IP), with SIP telephones and exchanges. In the case of YaaZZ, the system uses SIP for communicating with the Teleglobe exchange.

Asterisk Call Function

The Dial function is a so-called "Application" in Asterisk terms. This application can connect two channels, where a channel consists of a driver name and a destination. An example of an address is SIP/1881, which would try to use the SIP driver to call the number "1881". The Dial application connects the current channel reading the command with the specified channel. If an error occurs, the dial application exits and lets the next line in the configuration (dial plan) execute. This way the system can support fail-safe function dialing via another driver/channel.

YaaZZ Use of Asterisk

Postpaid Calls

In the postpaid system, for the voice system in YaaZZ (one to one calling) the basic calling engine in Asterisk and the standard SIP module are used. The calls are handled by YaaZZ, which also handles all of the network load. In other embodiments, the implementing system may let the carrier or another system handle the network load instead of YaaZZ.

Prepaid Calls

Different from postpaid calling, prepaid calls are monitored live by the YaaZZ PABX system to ensure that the call does not exceed the user's prepaid balance, even though the user might use several services at the same time.

SMS

SMS handling is performed by the YaaZZ API Server (see above). See this section also for a description of CDR handling for SMS CDRs.

Conferencing

To implement YaaZZ conferencing, YaaZZ uses the Asterisk SIP module. The conference call is hosted by YaaZZ, but uses the telco carrier (TATA/TDC) via the SIP protocol to cause the call to be originated using the PSTN/GSM (or other) network.

This is all handled using the MeetMe module in Asterisk. MeetMe is the Asterisk engine that joins calls to make a conference. MeetMe has lots of functionality, but YaaZZ is only using standard conference calling functionality from the Asterisk engine to implement its conferencing system. The additional conferencing features supported by YaaZZ are implemented using YaaZZ code.

Instead of the normal way of making the user manually call in to a conference, the YaaZZ system utilizes the YaaZZ API server to set up the conference calls from the PABX to the user's phone. This supports potentially cheaper conference calling, as the user is charged the PABX origination fee instead of the (roaming) charges that may be otherwise incurred if the user's (mobile) phone originated the call.

With the help of Asterisk Manager API, the YaaZZ API Server keeps track of the current state of each user in the conference call. This is then reflected to the users' client applications, on the portal, mobile, or pc client.

Call Data Records (CDRs)

All of the CDRs are in time zone GMT+1. YaaZZ uses a NTP (Network Time Protocol) client on the servers to ensure the YaaZZ clock stays accurate.

Voice will generate two CDRs—one for Caller and one for Callee. These CDRs are joined in the rating engine (which figures out costs and routing), by comparing the JoinID on each leg, thereby avoid rating a call twice. An Example is shown in Table 4.

TABLE 4

| 1. Caller Num | 1. Callee Num |
| 2. Start time | 2. Start time |
| 3. Billseconds | 3. Billseconds |
| 4. Unique ID | 4. Unique ID |
| 5. Subscriber ID | 5. Subsciber ID |
| 6. JoinID | 6. JoinID |

Conference calls will generate one CDR per attendee/participant in the conference call. When sent to the rating system/billing solution, every CDR containing Conference ID will be rated and joined. There are multiple CDRs for a conference call, one for each active participant. Each leg (referenced by a CDR containing the Conference ID) is sent to a rating engine to be priced before the leg is connected to the conference call. When sent to the rating system, each CDR containing the Conference ID is then joined in order to track a single cost for the conference call. See Table 5 below.

TABLE 5

| 1. Callee Num |
| 2. Start time |
| 3. Billseconds |
| 4. Conference ID |
| 5. Subsciber ID |

Asterisk Manager Interface (AMI)

The Asterisk Manager Interface allows a client program to connect to an Asterisk instance and issue commands or read PABX events over a TCP/IP stream. Integrators find this particularly useful when trying to track the state of a telephony client inside Asterisk, and directing that client based on custom (and possibly dynamic) rules.

A simple "key: value" line-based protocol is utilized for communication between the connecting client and the Asterisk PABX. Lines are terminated using CRLF (carriage return, line feed). For the sake of discussion below, the term "packet" is used to describe a set of "key: value" lines that are terminated by an extra carriage return.

The asterisk manager interface is the standard API in asterisk used to communicate between the YaaZZ API Server and Asterisk. YaaZZ uses this interface to perform origination of a call from a mobile and a PC YaaZZ communicator.

The protocol (as used by YaaZZ) has the following characteristics:

Before issuing commands to Asterisk, one must establish a manager session. Packets may be transmitted in either direction at any time after authentication (authentication is performed initially).

The first line of a packet will have a key of "Action" when sent from the client, but "Event" or "Response" when sent from Asterisk to the client.

The order of lines within a packet is insignificant, so one may use one's favorite programming language's native unordered dictionary type to efficiently store a single packet.

CRLF is used to delimit each line and a blank line (two CRLFs in a row) indicates the end of the command, which Asterisk is now expects to process.

Example System Configuration

The operating system used by example embodiments of YaaZZ is Ubuntu. All of the PABX servers are running Asterisk software version 1.4. The servers are IBM Blades with Intel Quad Core 3 ghz CPUS and 4 GB of memory. The configuration files of PABX Servers and YaaZZ Conference PABX servers are different. Common for both installations is that the servers are configured automatically on startup and when migrating new releases.

Currently, Perl is the programming language used to develop the prepaid system in YaaZZ and is also used for some of the AGI scripts which retrieve information about customers when a customer is originating a call, etc. PHP is used for the conference monitoring system. The programming language "C" is mainly used to modify existent core modules in Asterisk PABX.

YaaZZ Internal PABX

The current architecture includes a separate PABX server to handle calls relating to customer support, invoicing, administration, etc. This PABX server is a stand-alone system from the Voice/Conference platform of YaaZZ, but is integrated with the billing/rating platform, customer database, and the prepaid databases to retrieve information which may be useful and/or needed.

Security and Reliability

To have a secure connection for transferring SIP data between Asterisk and Teleglobe, a local connection with TATA (using a secure tunneling technique) is used. Preferably, one of more failover copies of the PABX hardware setup are available to take over if the system goes down.

Logging and Monitoring

In one example implementation, the alarms and PABX monitoring are controlled by a Nagios server. Every six months, Asterisk logs may be purged, as some implementations require this due to local laws. Monitoring Asterisk PABX Servers and reports on system setup may also be available.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/077,106 entitled "MOBILE, PC, AND WEB ENHANCED TELECOMMUNICATIONS ENVIRONMENT," filed Jun. 30, 2008, is incorporated herein by reference, in its entirety.

From the foregoing it will be appreciated that, although specific embodiments have been described herein for purposes of illustration, various modifications may be made without deviating from the spirit and scope of the invention. For example, the methods and systems for performing telecommunications services discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computing system for administering telecommunications conference calls at a reduced cost, the computing system communicatively connected to one or more client devices and communicatively connected to a Private Automatic Branch eXchange (PABX) server computing system having a physical location, comprising:
    receiving from at least one client device of the communicatively connected client devices an indication of a plurality of telephone numbers of participant legs for a desired conference call;
    on behalf of the at least one client device, using the PABX server computing system connected to a telephone exchange network through a telecommunications carrier, initiating the desired conference call for the plurality of telephone numbers of participant legs, using the telephone exchange network, with a billing rate computed as if the PABX server computing system originated the conference call instead of the at least one client device and charging each participant call leg as if the conference call leg originated from the physical location of the PABX server computing system instead of from the location of the at least one client device, thereby providing lower costs for the desired conference call than if the conference call had been originated by the at least one client device, wherein the billing rate for the conference call is computed by combining Call Data Records produced by the PABX server computing system for each conference call leg;
    tracking billing information for the conference call based upon the computed billing rate; and
    providing an interface to the client device to allow the client device to control the initiated conference call.

2. The method of claim 1 wherein the interface provided to the client device enables an originator of the conference call to mute a participant, to kick off a participant, to end the conference call, or to add a participant while the conference call is ongoing.

3. The method of claim 1 wherein the client device is a wireless telephonic device.

4. The method of claim 1 wherein the client device is a wired telephonic device.

5. The method of claim 1 wherein the client device is a personal computer-implemented telephone device.

6. The method of claim 1 wherein the receiving from the at least one client device the indication of the plurality of telephone numbers of participant legs allows a user of the client device to specify all participants at once.

7. The method of claim 1 wherein the interface provided to the client device provides indications of when a participant is speaking or is muted.

8. The method of claim 7 wherein the interface provided to the client device provides indication of when a participant is muted.

9. The method of claim 1 wherein the interface provided to the client device enables a participant within the initiated conference call to, at least one of, indicate a desire to comment, agree or disagree with a comment, vote on a question, or integrate with other conferencing systems.

10. The method of claim 1 wherein the computing system is an Application Programming Interface (API) server that connects via one or more data packets with a client communications device.

11. The method of claim 10 wherein the client communications device is at least one of a mobile phone application, a personal computing system phone application, or a web browser telecommunications application.

12. The method of claim 1 provided as a plug-in from another application in the computing system.

13. A non-transitory computer-readable medium containing contents that, when executed, control a computer processor to perform a method comprising:
receiving from at least one client device an indication of a plurality of telephone numbers of participant legs for a desired conference call;
on behalf of the at least one client device, using a Private Automatic Branch eXchange (PABX) server computing system having an associated physical location and connected to a telephone exchange network through a telecommunications carrier, initiating the desired conference call for the plurality of telephone numbers of participant legs using the telephone exchange network, with a billing rate computed as if the PABX server computing system originated the conference call instead of the at least one client device and charging each participant call leg as if the conference call leg originated from the physical location associated with the PABX server computing system instead of from the location of the at least one client device, thereby providing lower costs for the desired conference call than if the conference call had been originated by the at least one client device, wherein the billing rate for the conference call is computed by combining Call Data Records produced by the PABX server computing system for each conference call leg;
tracking billing information for the conference call based upon the computed billing rate; and
providing an interface to the client device to allow the client device to control the initiated conference call.

14. The computer-readable medium of claim 13 wherein the interface provided to the client device enables an originator of the conference call to mute a participant, to kick off a participant, to end the conference call, or to add a participant while the conference call is ongoing.

15. The computer-readable medium of claim 13 wherein the client device is a wireless telephonic device.

16. The computer-readable medium of claim 13 wherein the client device is a wired telephonic device.

17. A telecommunications system comprising:
a memory;
an Applications Programming Interface (API) server for receiving indications of a plurality of telephone numbers of participant legs for a desired conference call from an interface executing on one of one or more client devices;
a Private Automatic Branch eXchange (PABX) server configured to initiate the desired conference call for the plurality of telephone numbers of participant legs using a telephone exchange network connected through a telecommunications carrier, with a billing rate computed as if the PABX server originated the conference call instead of the at least one client device and charging each participant call leg as if the conference call leg originated from a physical location associated with the PABX server instead of from the location of the one of one or more client devices, thereby providing lower costs for the desired conference call than if the conference call had been originated by the one of one or more client devices, wherein the billing rate for the conference call is computed by combining Call Data Records produced by the PABX server computing system for each conference call leg; and
a billing component for tracking billing information for the conference call based upon the computed billing rate.

18. The telecommunications system of claim 17 wherein the interface provides indications of when a participant is speaking or is muted.

19. The telecommunications system of claim 17 wherein the interface executing on one of the one or more client devices enables a participant within the initiated conference call to, at least one of, indicate a desire to comment, agree or disagree with a comment, vote on a question, or integrate with other conferencing systems.

20. The telecommunications system of claim 17 wherein the one of one or more client devices is a mobile phone.

* * * * *